US012380848B2

(12) United States Patent
Gu et al.

(10) Patent No.: US 12,380,848 B2
(45) **Date of Patent: *Aug. 5, 2025**

(54) DISPLAY DEVICE AND PIXEL CIRCUIT THEREOF

(71) Applicant: Viewtrix Technology Co., Ltd., Shenzhen (CN)

(72) Inventors: Jing Gu, Shenzhen (CN); Po-Yi Shih, Shenzhen (CN)

(73) Assignee: VIEWTRIX TECHNOLOGY CO., LTD., Shenzhen (CN)

( * ) Notice: Subject to any disclaimer, the term of this patent is extended or adjusted under 35 U.S.C. 154(b) by 99 days.

This patent is subject to a terminal disclaimer.

(21) Appl. No.: 18/387,925

(22) Filed: Nov. 8, 2023

(65) Prior Publication Data

US 2024/0071308 A1 Feb. 29, 2024

Related U.S. Application Data

(63) Continuation of application No. 15/286,732, filed on Oct. 6, 2016, now Pat. No. 11,854,477, which is a (Continued)

(51) Int. Cl.
*G09G 3/3233* (2016.01)
*G09G 3/20* (2006.01)
(Continued)

(52) U.S. Cl.
CPC ......... *G09G 3/3233* (2013.01); *G09G 3/2022* (2013.01); *G09G 3/3266* (2013.01); (Continued)

(58) Field of Classification Search
CPC ... G09G 2300/0443; G09G 2300/0814; G09G 2300/0842; G09G 2300/0861;
(Continued)

(56) References Cited

U.S. PATENT DOCUMENTS 6,317,127 B1 11/2001 Daily et al.
6,621,499 B1 9/2003 Callway
(Continued)

FOREIGN PATENT DOCUMENTS

CN 1617205 A 5/2005
CN 1622181 A 6/2005
(Continued)

OTHER PUBLICATIONS

Ono et al., Shared Pixel Compensation Circuit for AM-OLED Displays, Mar. 20, 2012 (4 pages).
(Continued)

*Primary Examiner* — Michael J Jansen, II
(74) *Attorney, Agent, or Firm* — Bayes PLLC

(57) ABSTRACT

A pixel circuit includes a capacitor, a light emitting control transistor, a driving transistor, and multiple light emitting transistors. The light emitting control transistor includes a gate electrode coupled to a light emitting control signal, a source electrode coupled to a supply voltage, and a drain electrode. The driving transistor includes a gate electrode coupled to the capacitor, a source electrode coupled to the drain electrode of the light emitting control transistor, and a drain electrode. Each light emitting transistor includes a gate electrode coupled to a respective light emitting signal, a source electrode coupled to the drain electrode of the driving transistor, and a drain electrode coupled to a respective light emitting element. Each light emitting signal turns on the respective light emitting transistor during a respective light emitting period within a frame period to cause the respective light emitting element to emit a light. The light emitting control signal turns on the light emitting control transistor during each light emitting period within the frame period.

20 Claims, 60 Drawing Sheets

Related U.S. Application Data continuation of application No. PCT/CN2016/070839, filed on Jan. 13, 2016.

(51) Int. Cl.

| | |
|---|---|
| ***G09G 3/3266*** | (2016.01) |
| ***G09G 3/3291*** | (2016.01) |
| ***G09G 3/36*** | (2006.01) |
| ***G09G 5/00*** | (2006.01) |
| ***G09G 5/395*** | (2006.01) |

(52) U.S. Cl.

CPC ......... *G09G 3/3291* (2013.01); *G09G 3/3648* (2013.01); *G09G 5/005* (2013.01); *G09G 5/395* (2013.01); *G09G 2300/0443* (2013.01); *G09G 2300/0804* (2013.01); *G09G 2300/0814* (2013.01); *G09G 2300/0819* (2013.01); *G09G 2300/0842* (2013.01); *G09G 2300/0861* (2013.01); *G09G 2310/0216* (2013.01); *G09G 2310/0262* (2013.01); *G09G 2310/0286* (2013.01); *G09G 2310/0297* (2013.01); *G09G 2310/067* (2013.01); *G09G 2310/08* (2013.01); *G09G 2320/0233* (2013.01); *G09G 2320/045* (2013.01); *G09G 2330/028* (2013.01); *G09G 2360/02* (2013.01); *G09G 2360/123* (2013.01); *G09G 2370/04* (2013.01)

(58) Field of Classification Search

CPC ... G09G 2310/0262; G09G 2310/0286; G09G 2310/08; G09G 2320/0233; G09G 2330/028; G09G 3/3233; G09G 3/3266; G09G 3/3291

See application file for complete search history.

(56) References Cited

U.S. PATENT DOCUMENTS

| | | | | |
|---|---|---|---|---|
| 6,919,681 | B2 | 7/2005 | Cok et al. | |
| 7,256,775 | B2 | 8/2007 | Eom | |
| 7,535,447 | B2 | 5/2009 | Kwak et al. | |
| 7,542,019 | B2 | 7/2009 | Park et al. | |
| 7,561,124 | B2 | 7/2009 | Kwak et al. | |
| 7,656,369 | B2 * | 2/2010 | Chung | G09G 3/3233 345/82 |
| 7,755,585 | B2 | 7/2010 | Kim | |
| 7,880,698 | B2 | 2/2011 | Park et al. | |
| 7,936,322 | B2 | 5/2011 | Chung et al. | |
| 7,978,156 | B2 | 7/2011 | Kim | |
| 8,018,405 | B2 * | 9/2011 | Kwak | G09G 3/3291 345/82 |
| 8,031,140 | B2 * | 10/2011 | Kwak | G09G 3/2022 345/204 |
| 8,040,302 | B2 * | 10/2011 | Shin | G09G 3/3233 345/82 |
| 8,076,674 | B2 | 12/2011 | Kwak | |
| 8,111,224 | B2 | 2/2012 | Park et al. | |
| 8,237,637 | B2 | 8/2012 | Chung | |
| 8,289,234 | B2 | 10/2012 | Kim | |
| 8,330,685 | B2 | 12/2012 | Park et al. | |
| 8,462,180 | B2 * | 6/2013 | Weitbruch | G09G 3/2011 345/589 |
| 8,816,998 | B2 | 8/2014 | Pyon et al. | |
| 8,872,736 | B2 * | 10/2014 | Shin | G09G 3/3266 345/80 |
| 9,165,526 | B2 | 10/2015 | Gu et al. | |
| 9,311,895 | B2 | 4/2016 | Ohara et al. | |
| 9,318,039 | B2 * | 4/2016 | Park | G09G 3/3208 |
| 9,349,314 | B2 | 5/2016 | Park | |
| 9,368,061 | B2 * | 6/2016 | Kim | G09G 3/3225 |
| 9,368,079 | B2 * | 6/2016 | Chen | G09G 3/3614 |
| 9,390,666 | B2 * | 7/2016 | Oh | G09G 3/2025 |
| 9,412,300 | B2 | 8/2016 | Wang et al. | |
| 9,412,307 | B2 * | 8/2016 | Kwon | G09G 3/3266 |
| 9,501,970 | B2 * | 11/2016 | Park | G09G 3/3266 |
| 9,754,535 | B2 | 9/2017 | Ohara et al. | |
| 9,842,542 | B2 | 12/2017 | Duean et al. | |
| 9,959,801 | B2 | 5/2018 | Ohara et al. | |
| 10,074,313 | B2 | 9/2018 | Nishikawa et al. | |
| 10,242,624 | B2 | 3/2019 | Chen et al. | |
| 2004/0217694 | A1 | 11/2004 | Cok et al. | |
| 2005/0062707 | A1 | 3/2005 | Yamashita et al. | |
| 2005/0104817 | A1 * | 5/2005 | Kwak | G09G 3/2022 345/76 |
| 2005/0104875 | A1 | 5/2005 | Kwak et al. | |
| 2005/0116656 | A1 * | 6/2005 | Shin | G09G 3/3233 315/169.3 |
| 2005/0140604 | A1 | 6/2005 | Shin | |
| 2005/0259095 | A1 | 11/2005 | Kwak | |
| 2005/0264496 | A1 | 12/2005 | Shin | |
| 2005/0285827 | A1 * | 12/2005 | Eom | G09G 3/3266 345/76 |
| 2006/0044245 | A1 | 3/2006 | Park et al. | |
| 2006/0103322 | A1 * | 5/2006 | Chung | G09G 3/3233 315/169.3 |
| 2006/0125734 | A1 | 6/2006 | Cok et al. | |
| 2006/0125807 | A1 | 6/2006 | Park et al. | |
| 2006/0132668 | A1 | 6/2006 | Park et al. | |
| 2006/0139257 | A1 | 6/2006 | Kwak et al. | |
| 2006/0186822 | A1 | 8/2006 | Park | |
| 2007/0001711 | A1 | 1/2007 | Kwak | |
| 2007/0040770 | A1 | 2/2007 | Kim | |
| 2007/0040772 | A1 | 2/2007 | Kim | |
| 2007/0103405 | A1 * | 5/2007 | Kwak | G09G 3/3291 345/76 |
| 2007/0103406 | A1 | 5/2007 | Kim | |
| 2008/0150846 | A1 | 6/2008 | Chung | |
| 2009/0002280 | A1 | 1/2009 | Kim et al. | |
| 2009/0039355 | A1 | 2/2009 | Kwak | |
| 2009/0309902 | A1 * | 12/2009 | Weitbruch | G09G 3/2011 345/690 |
| 2010/0220086 | A1 * | 9/2010 | Chung | G09G 3/3233 345/76 |
| 2010/0283776 | A1 * | 11/2010 | Park | G09G 3/3266 345/82 |
| 2011/0025678 | A1 | 2/2011 | Chung | |
| 2012/0313903 | A1 * | 12/2012 | Pyon | G09G 3/3275 345/82 |
| 2013/0069854 | A1 | 3/2013 | Park et al. | |
| 2013/0222442 | A1 * | 8/2013 | Gu | G09G 3/2003 345/694 |
| 2014/0132573 | A1 | 5/2014 | Lin et al. | |
| 2015/0002560 | A1 * | 1/2015 | Kwon | G09G 3/3266 345/691 |
| 2015/0022508 | A1 | 1/2015 | Kim et al. | |
| 2015/0091952 | A1 | 4/2015 | Wu et al. | |
| 2015/0187334 | A1 * | 7/2015 | Oh | G09G 3/3614 345/204 |
| 2015/0235588 | A1 * | 8/2015 | Park | G09G 3/2022 345/694 |
| 2015/0317952 | A1 | 11/2015 | Ohara et al. | |
| 2015/0356919 | A1 * | 12/2015 | Wang | G09G 3/3266 345/82 |
| 2015/0356935 | A1 * | 12/2015 | Chen | G09G 3/3614 345/96 |
| 2016/0012774 | A1 * | 1/2016 | Ohara | G09G 3/3225 345/694 |
| 2016/0210892 | A1 * | 7/2016 | Ohara | G09G 3/2022 |
| 2016/0307510 | A1 | 10/2016 | Duan et al. | |
| 2017/0047010 | A1 * | 2/2017 | Chen | G09G 3/3233 |
| 2017/0186373 | A1 | 6/2017 | Nishikawa et al. | |

FOREIGN PATENT DOCUMENTS

| | | | |
|---|---|---|---|
| CN | 1741113 | A | 3/2006 |
| CN | 1776794 | A | 5/2006 |
| CN | 1801298 | A | 7/2006 |
| CN | 100397463 | C | 6/2008 |
| CN | 101484929 | A | 7/2009 |
| CN | 102254532 | A | 11/2011 |

(56) References Cited

FOREIGN PATENT DOCUMENTS

| | | | |
|---|---|---|---|
| CN | 20214317 | U | 2/2012 |
| CN | 104157240 | A | 11/2014 |
| CN | 104183223 | A | 12/2014 |
| CN | 104252835 | A | 12/2014 |
| CN | 104517559 | A | 4/2015 |
| CN | 104751758 | A | 7/2015 |
| CN | 104752468 | A | 7/2015 |
| CN | 105225650 | A | 1/2016 |

OTHER PUBLICATIONS

International Search Report and Written Opinion directed to related International Patent Application No. PCT/CN2016/070839, mailed Oct. 12, 2016; (13 pages).

English language abstract of Chinese Patent Application No. CN20141350507, (1 Page).

International Search Report and Written Opinion directed to related International Patent Application No. PCT/CN2016/103315, dated Feb. 4, 2017 (8 pages).

English-language Abstract of Chinese Patent Publication No. CN 104183223 A.

English-language Abstract of Chinese Patent Publication No. CN 102254532 A.

Supplemental Search Report issued in parallel European Patent Application No. 16761004.7, Apr. 26, 2019 ( (13 Pages).

Supplemental European Search Report issued in corresponding European Application No. EP 16 88 4718, mailed Jul. 24, 2019, (16 Pages).

Lee, D.D. et al., “A Universal Controller Architect for Active-Matrix LCDs”, SID International Symposium Digest of Papers; Boston, May 17-22, 1992; [SID International Symposium Digest of Papers], Playa Del Rey, SID, Js, vol. 23, May 17, 1992 (May 17, 1992), pp. 605-608, XP0004.

Communication Pursuant to Article 94(3) EPC issued in corresponding European Application No. 16 761 004.7, mailed on Apr. 1, 2021, (17 Pages).

Second Office Action in corresponding Chinese Application No. 201680078871.2 dated Jul. 8, 2021 (21 pages).

* cited by examiner

100

504

FIG. 16
1 Frame
Frame 1
Frame 1-1
Frame 1-2
EM
EM1-1
EM2-1
S1-0(Frame1-1)
S1-1(Frame1-1)
S2-0(Frame1-2)
S2-1(Frame1-2)

502

404

2700

404

4400

DISPLAY DEVICE AND PIXEL CIRCUIT THEREOF

CROSS REFERENCE TO RELATED APPLICATIONS

This application is a continuation of U.S. application Ser. No. 15/286,732, filed on Oct. 6, 2016, entitled "DISPLAY DEVICE AND PIXEL CIRCUIT THEREOF," which is a continuation of International Application No. PCT/CN2016/070839, filed on Jan. 13, 2016, entitled "DISPLAY DEVICE AND PIXEL CIRCUIT THEREOF," both of which are hereby incorporated by reference in their entireties.

BACKGROUND

The disclosure relates generally to displays, and more particularly, to display devices and pixel circuit thereof.

Organic light emitting diode (OLED), a self-light-emitting device, is emerging as a next-generation display because it does not require a backlight and has a high contrast, wide-viewing angle, fast response, and low power consumption. An active-array organic light emitting diode (AMOLED) display includes an active array of OLEDs generating light (luminescence) upon electrical activation that has been deposited or integrated onto a thin film transistor (TFT) array, which functions as a series of switches to control the current flowing to each individual light emitting element (subpixel). Typically, this continuous current flow is controlled by a pixel circuit having at least two TFTs at each light emitting element to control emitting of light, with one TFT (a switching transistor) to start and stop the charging of a storage capacitor and the second TFT (a driving transistor) to provide a supply voltage at the level needed to create a constant current to the OLED, thereby eliminating the need for the very high currents required for passive-array OLED operation.

In addition, a compensation circuit is usually needed for the pixel circuit for AMOLED because the brightness of the OLED changes very sensitive to the changes of currents. The driving transistor of each pixel circuit of an AMOLED display can have a different threshold voltage Vth from each other, which causes deterioration in the uniformity of brightness of display panels. Further, the IR-drop occurs with the supply voltage Vdd passing through each pixel circuit, so the brightness of the OLED gets poorer in the lower part of the display panel, which requires compensation as well. Various compensation circuit designs have been proposed and applied in known AMOLED displays, which all include extra transistors in addition to the switching and driving transistors. For example, FIGS. 47A-47B depict a circuit diagram and a timing diagram, respectively, of a known pixel circuit 4700 with a compensation circuit for driving an AMOLED display. The pixel circuit 4700 in FIG. 47A is one of the direct-charging type of pixel circuits in which the data signal is directly applied to the driving transistor when the switching transistor is turned on during the charging period. In FIG. 47A, in addition to the storage capacitor 4402, the switching transistor 4704, and the driving transistor 4706 for providing the driving current to the OLED 4708, five more transistors 4710, 4712, 4714, 4716, 4718 form a compensation circuit to improve the uniformity of brightness of the AMOLED display. That is, seven transistors and one capacitor (7T1C) are used in the exemplary direct-charging type of pixel circuit 4700 of FIG. 47A for driving one OLED 4708.

Other known pixel circuits for an AMOLED display, e.g., 5T1C, 5T2C or 6T1C pixel circuits, also require a relatively large number of transistors. For example, FIGS. 48A-48B depict a circuit diagram and a timing diagram, respectively, of a known pixel circuit 4800 with a compensation circuit for driving an AMOLED display. The pixel circuit 4800 in FIG. 48A is one of the coupling types of pixel circuits in which the data signal is coupled to the driving transistor via a capacitor during the charging period. In FIG. 48A, the data signal is coupled, via the storage capacitor 4802 when the switching transistor 4804 is turned on, to the gate electrode of the driving transistor 4806. In addition, five more transistors 4810, 4812, 4814, 4816, 4818 form a compensation circuit to improve the uniformity of brightness of the AMOLED display. That is, seven transistors and one capacitor (7T1C) are used in the exemplary direct-charging type of pixel circuit 4800 of FIG. 48A for driving one OLED 4808.

In another example, FIGS. 49A-49B depict a circuit diagram and a timing diagram, respectively, of a known pixel circuit 4900 with a compensation circuit for driving an AMOLED display. The pixel circuit 4900 in FIG. 49A is another one of the coupling types of pixel circuits in which the data signal is coupled to the driving transistor via a capacitor during the charging period. In FIG. 49A, the data signal is coupled, via a coupling capacitor 4902 when the switching transistor 4904 is turned on, to the gate electrode of the driving transistor 4906. In addition to the storage capacitor 4908, coupling capacitor 4902, switching transistor 4904, and driving transistor 4906, three more transistors 4912, 4914, 4916 form a compensation circuit to improve the uniformity of brightness of the AMOLED display. That is, five transistors and two capacitors (5T2C) are used in the exemplary direct-charging type of pixel circuit 4900 of FIG. 49A for driving one OLED 4910.

The extra transistors required in the compensation circuit for an AMOLED display can increase the complexity of pixels, which in turn causes low yield and small aperture ratio. The average number of transistors per OLED also becomes a bottleneck for continuously increasing the resolution and pixels per inch (PPI) of AMOLED display due to the large layout area, especially when competing with liquid crystal displays (LCDs) which only need one transistor per pixel in their pixel circuits.

SUMMARY

The disclosure relates generally to displays, and more particularly, to display devices and pixel circuit thereof.

In one example, a circuit for driving light emitting elements includes a capacitor, a light emitting control transistors, a driving transistor, and a plurality of light emitting transistors. The light emitting control transistor includes a gate electrode operatively coupled to a light emitting control signal, a source electrode operatively coupled to a supply voltage, and a drain electrode. The driving transistor includes a gate electrode operatively coupled to one electrode of the capacitor, a source electrode operatively coupled to the drain electrode of the light emitting control transistor, and a drain electrode. Each of the plurality of light emitting transistors includes a gate electrode operatively coupled to a respective one of a plurality of light emitting signals, a source electrode operatively coupled to the drain electrode of the driving transistor, and a drain electrode operatively coupled to a respective one of a plurality of light emitting elements. Each of the plurality of light emitting signals turns on the respective light emitting transistor during a respective one of a plurality of light emitting periods within a frame period to cause the respective light emitting element to emit a light. The light emitting control signal turns on the light emitting control transistor during each of the plurality of light emitting periods within the frame period.

In another example, a circuit for driving light emitting elements includes a capacitor, a light emitting control transistor, a driving transistor, and a plurality of light emitting transistors. The light emitting control transistor includes a gate electrode operatively coupled to a light emitting control signal, a source electrode operatively coupled to a reference voltage, and a drain electrode. The driving transistor includes a gate electrode operatively coupled to one electrode of the capacitor, a source electrode operatively coupled to a supply voltage, and a drain electrode. Each of the plurality of light emitting transistors includes a gate electrode operatively coupled to a respective one of a plurality of light emitting signals, a source electrode operatively coupled to the drain electrode of the driving transistor, and a drain electrode operatively coupled to a respective one of a plurality of light emitting elements. Each of the plurality of light emitting signals turns on the respective light emitting transistor during a respective one of a plurality of light emitting periods within a frame period to cause the respective light emitting element to emit a light. The light emitting control signal turns on the light emitting control transistor during each of the plurality of light emitting periods within the frame period.

In still another example, an apparatus includes a light emitting driver. The apparatus drives an array of subpixels divided into k groups of subpixels, where k is an integer larger than 1. The light emitting driver is configured to cause each of the k groups of subpixels to sequentially emit lights in a respective one of k sub-frame periods within a frame period.

In yet another example, a method is provided for driving an array of subpixels divided into at least a first group of subpixels and a second group of subpixels. In a first sub-frame period within a frame period, the first group of subpixels is scanned and caused to emit lights. In a second sub-frame period within the frame period subsequent to the first sub-frame period, the second group of subpixels is scanned and caused to emit lights.

In yet another example, an AMOLED display includes an array of OLEDs, a plurality of pixel circuits, a light emitting driver, and a gate scanning driver. The array of OLEDs divided into k groups of OLEDs, where k is an integer larger than 1. Each of the plurality of pixel circuits is configured to drive k OLEDs from each of the k groups of OLEDs. The light emitting driver is operatively coupled to the plurality of pixel circuits and configured to cause each of the k groups of OLEDs to sequentially emit lights in a respective one of k sub-frame periods within a frame period. The gate scanning driver is operatively coupled to the plurality of pixel circuits and configured to sequentially scan each of the k groups of OLEDs in the respective sub-frame period within the frame period.

In yet another example, an apparatus includes a control signal generating module and a data converting module. The apparatus controls driving of an array of subpixels divided into k groups of subpixels, where k is an integer larger than 1. The control signal generating module is configured to provide a plurality of control signals to one or more drivers. The plurality of control signals control the one or more drivers to cause each of the k groups of subpixels to sequentially emit lights in a respective one of k sub-frame periods within a frame period. The data converting module is configured to convert original display data into converted display data based on a manner in which the array of subpixels is divided into the k groups of subpixels. The k groups of subpixels emit lights based on the converted display data.

BRIEF DESCRIPTION OF THE DRAWINGS

The embodiments will be more readily understood in view of the following description when accompanied by the below figures and wherein like reference numerals represent like elements, wherein.

Figure 18:
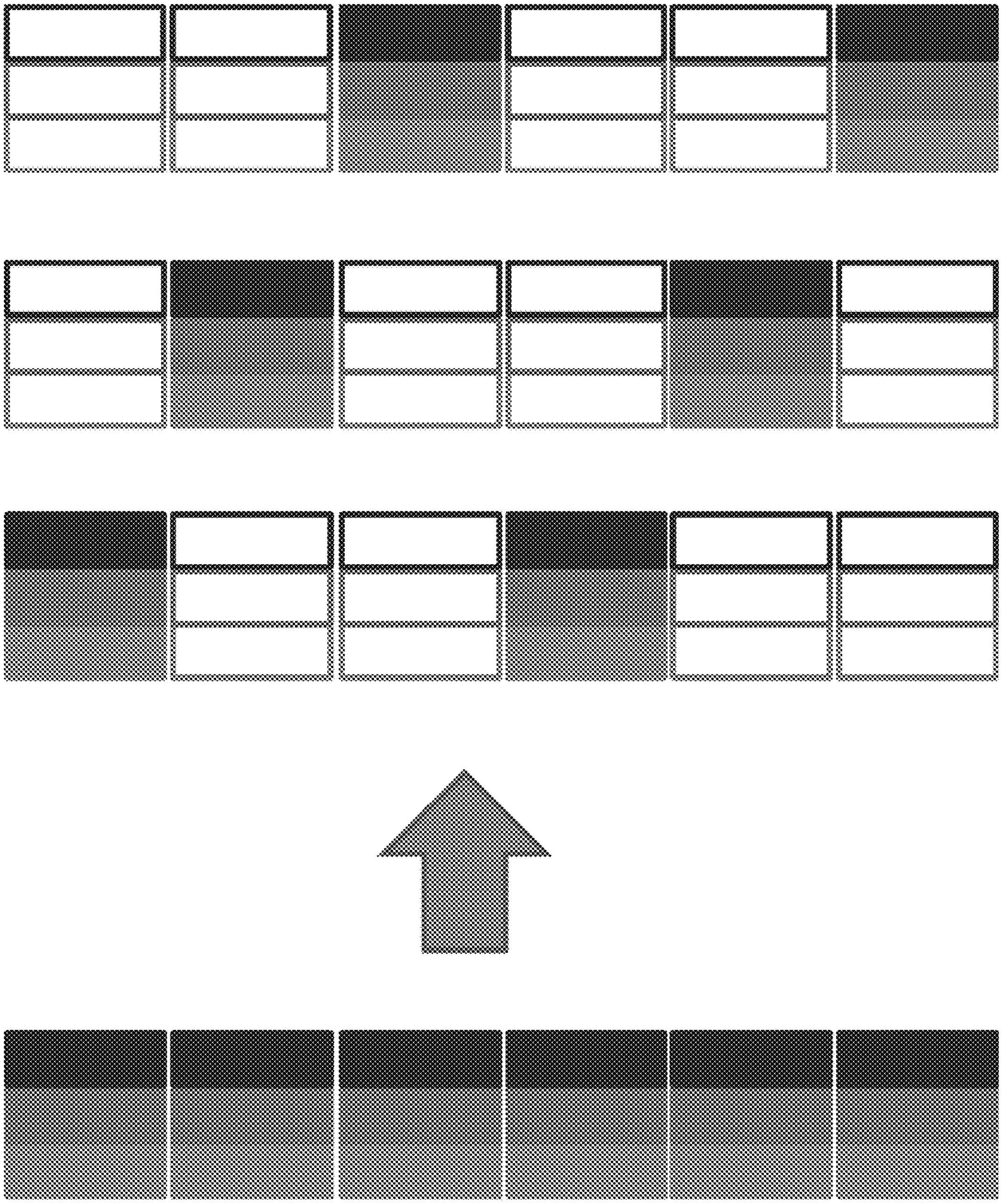
Figure 19:
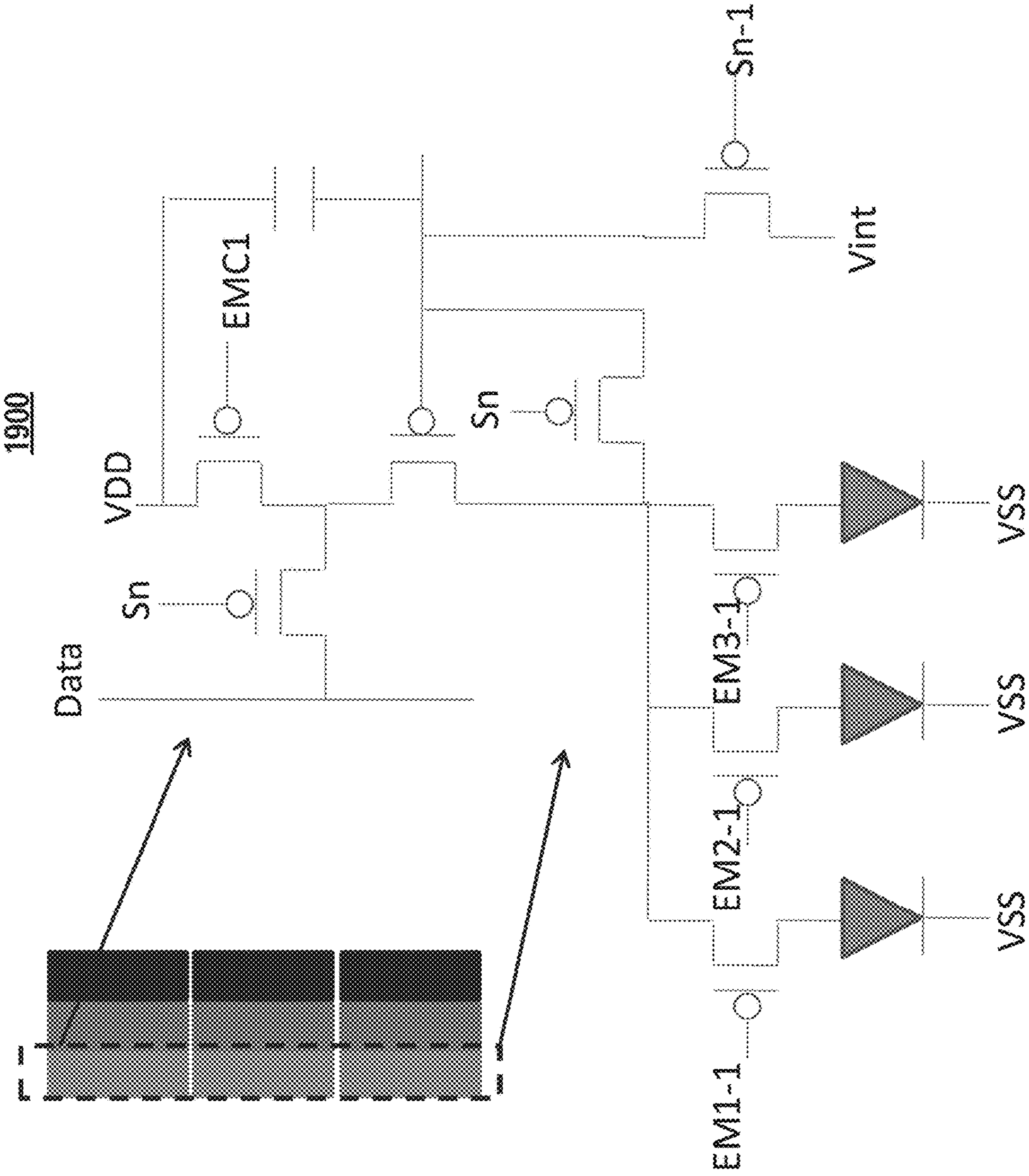
Figure 20:
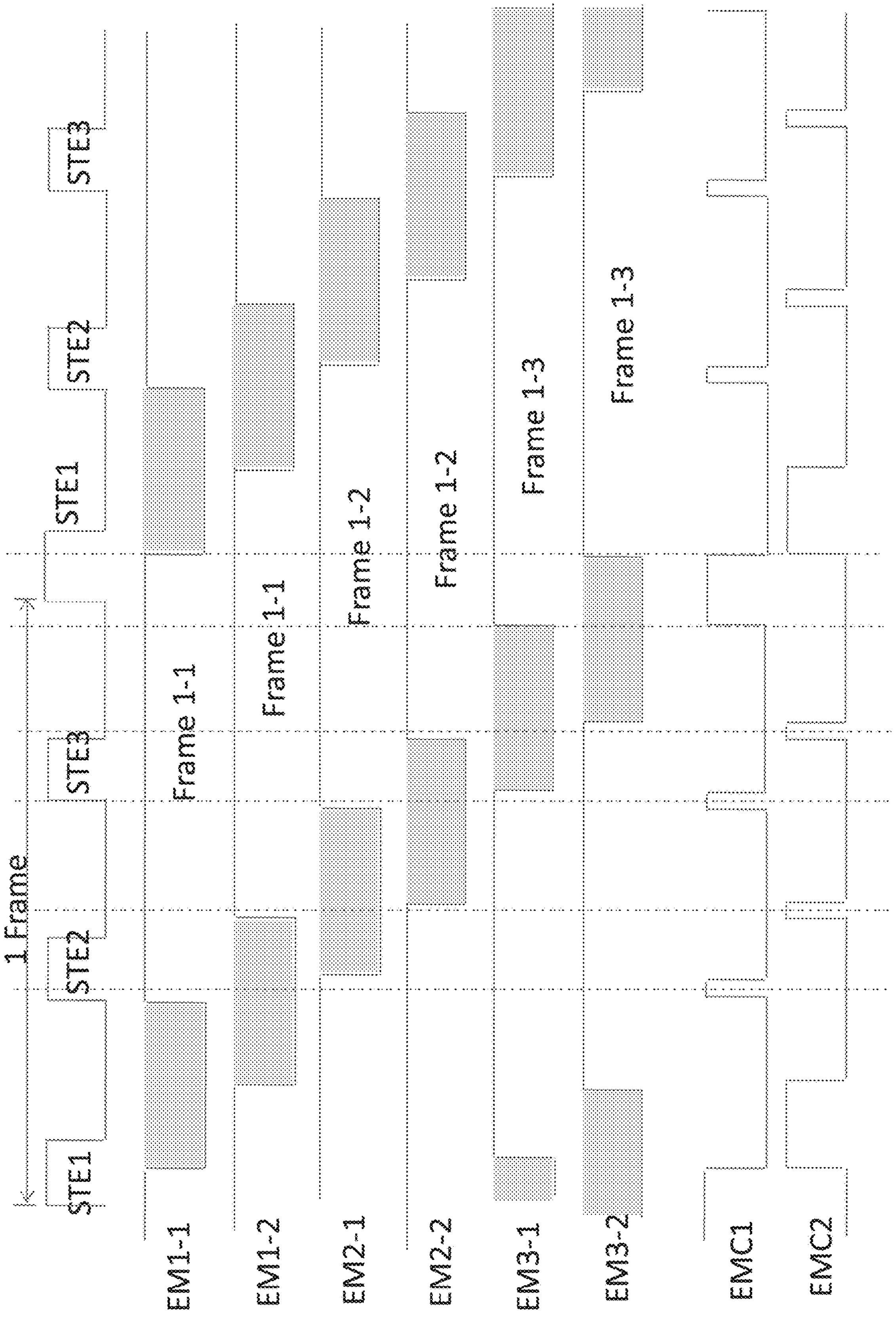
Figure 21:
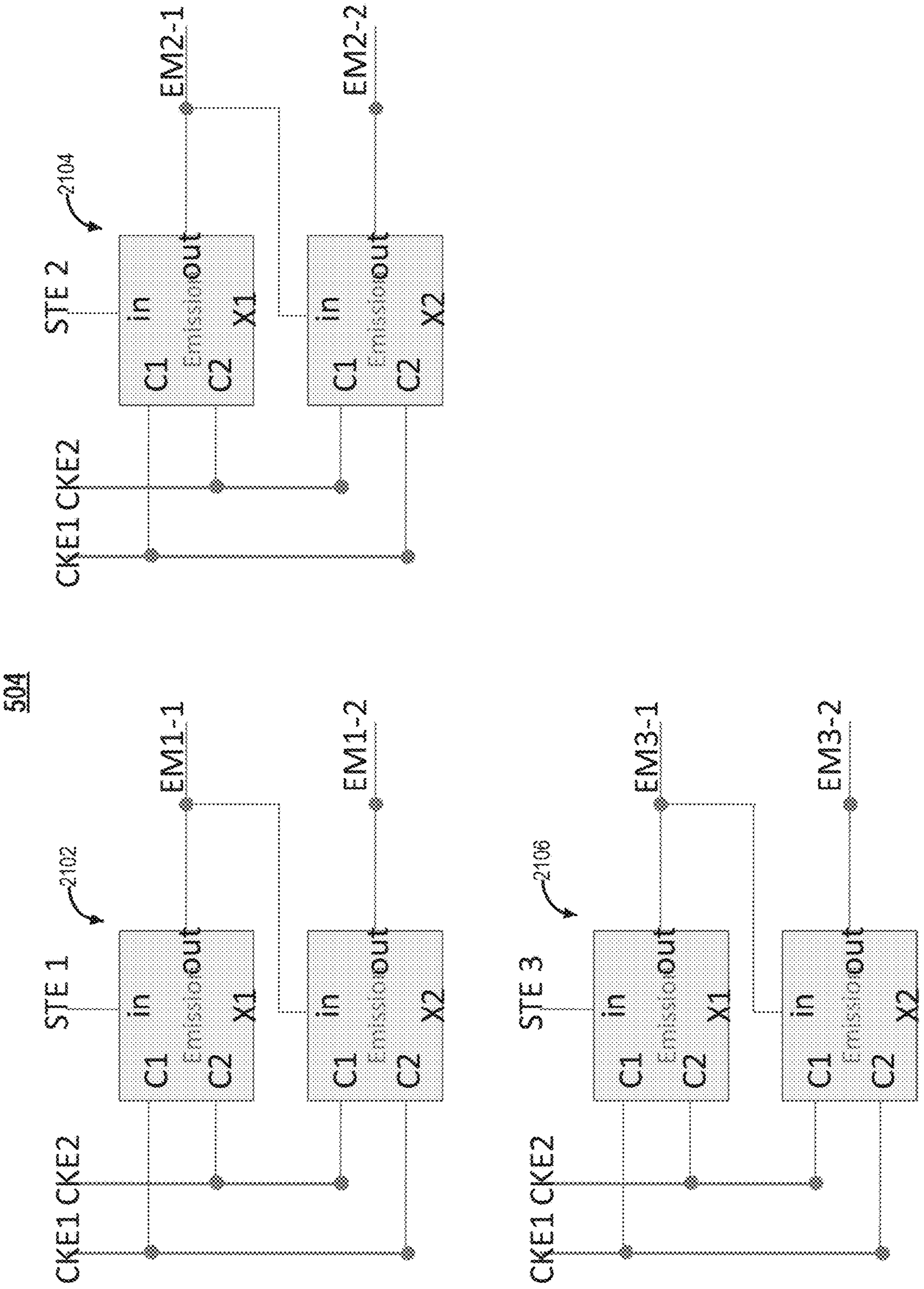
Figure 22A:
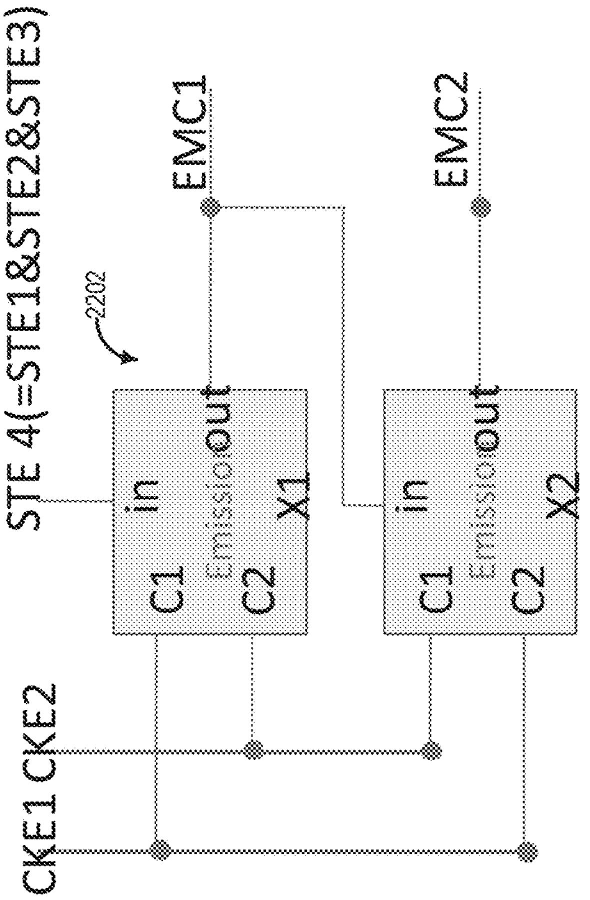
Figure 22B:
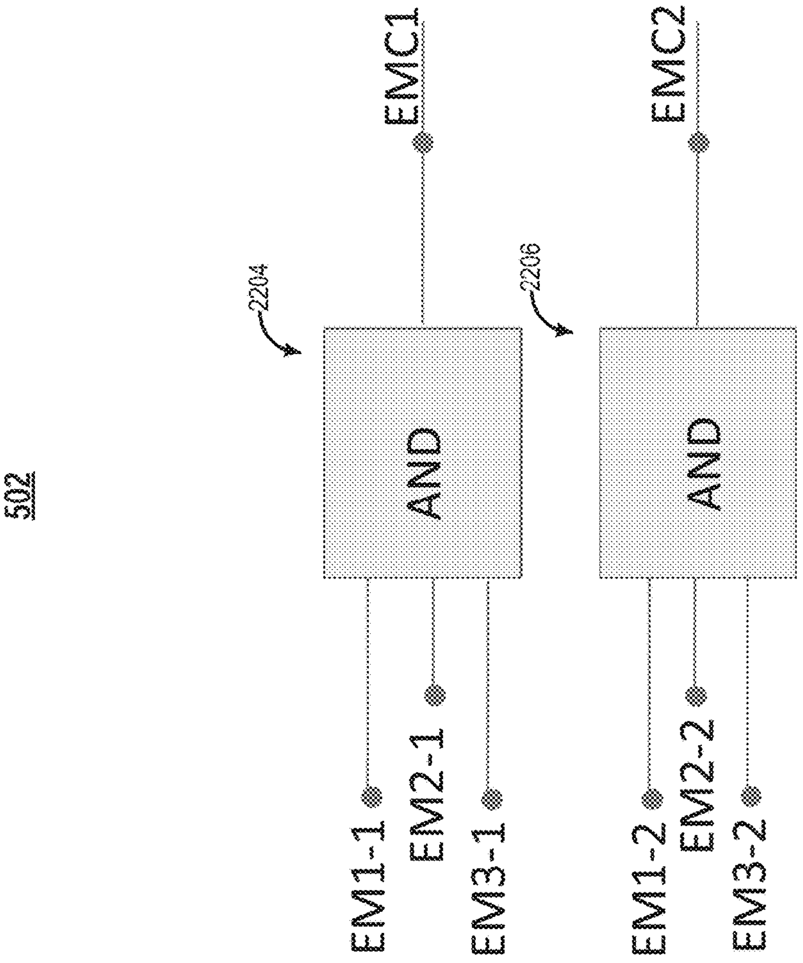
Figure 23:
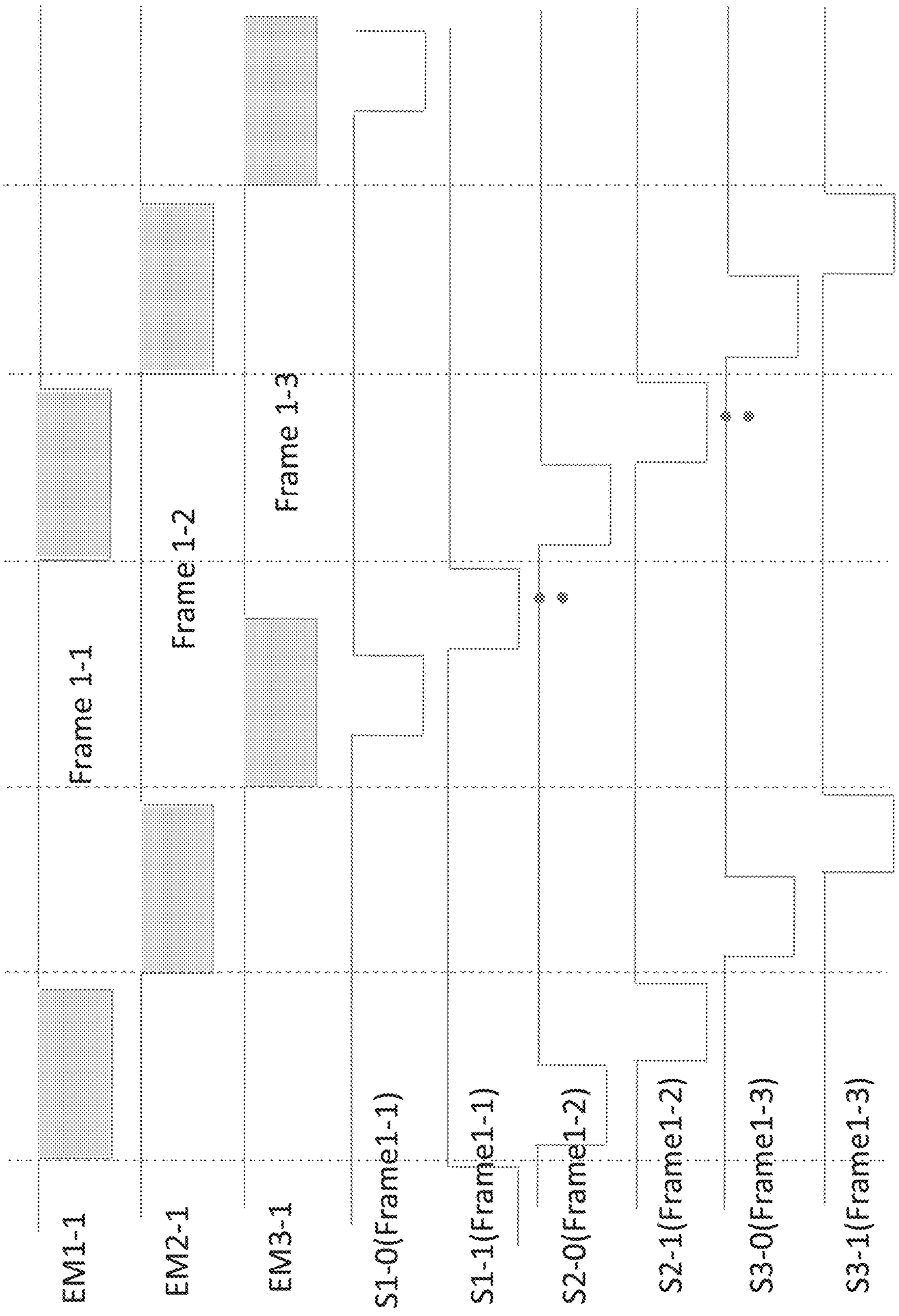
Figure 24:
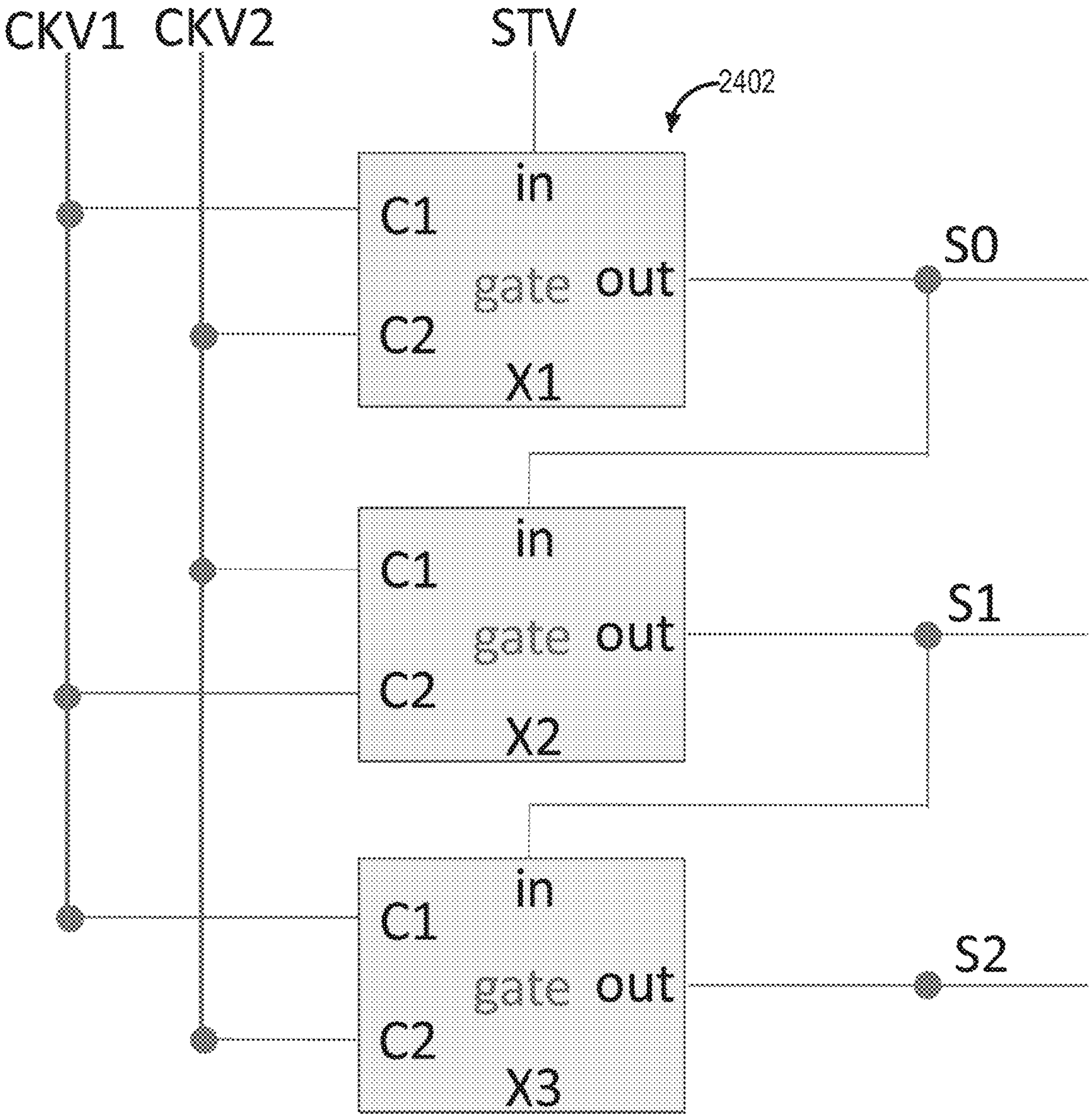
Figure 25:
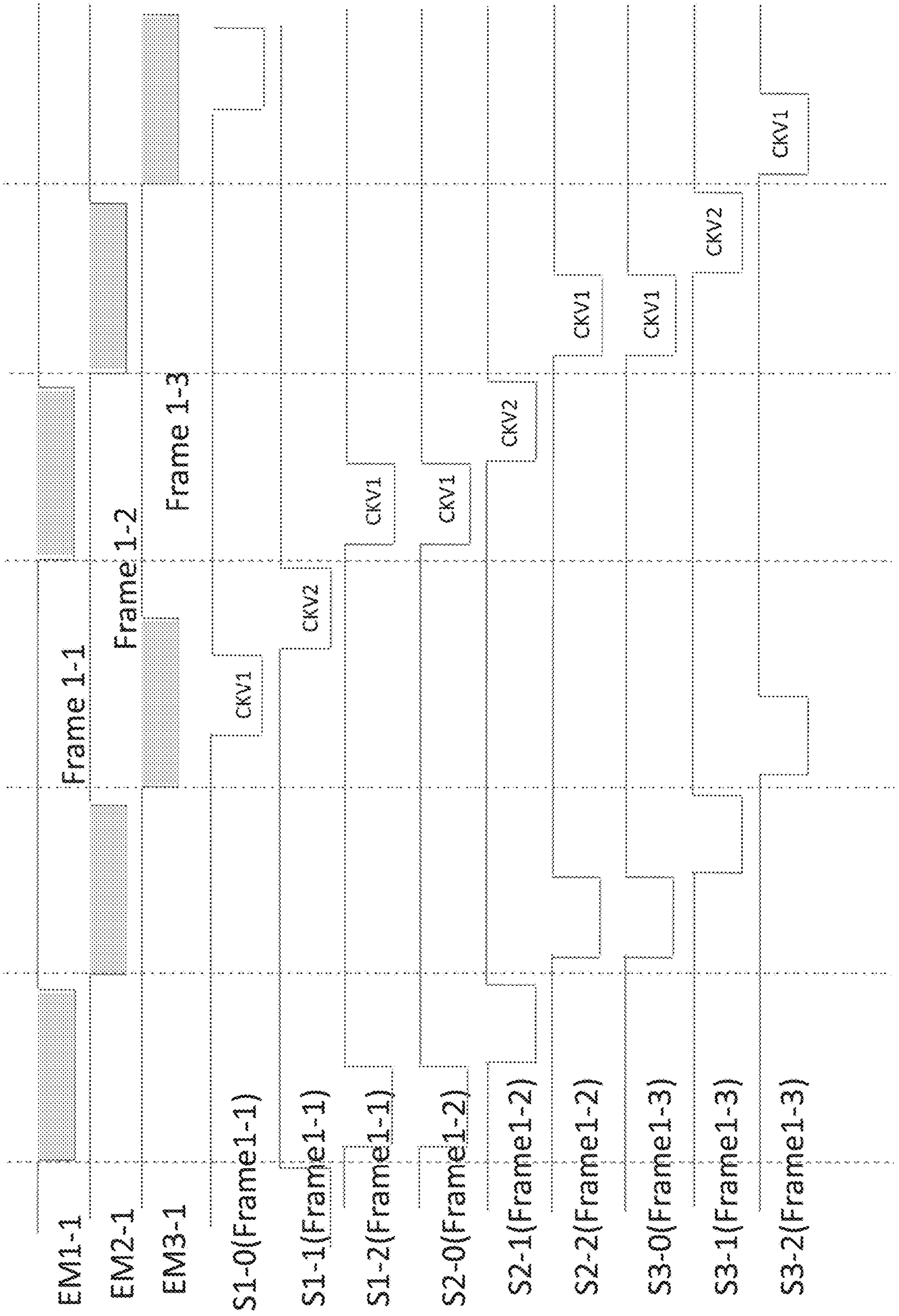
Figure 26:
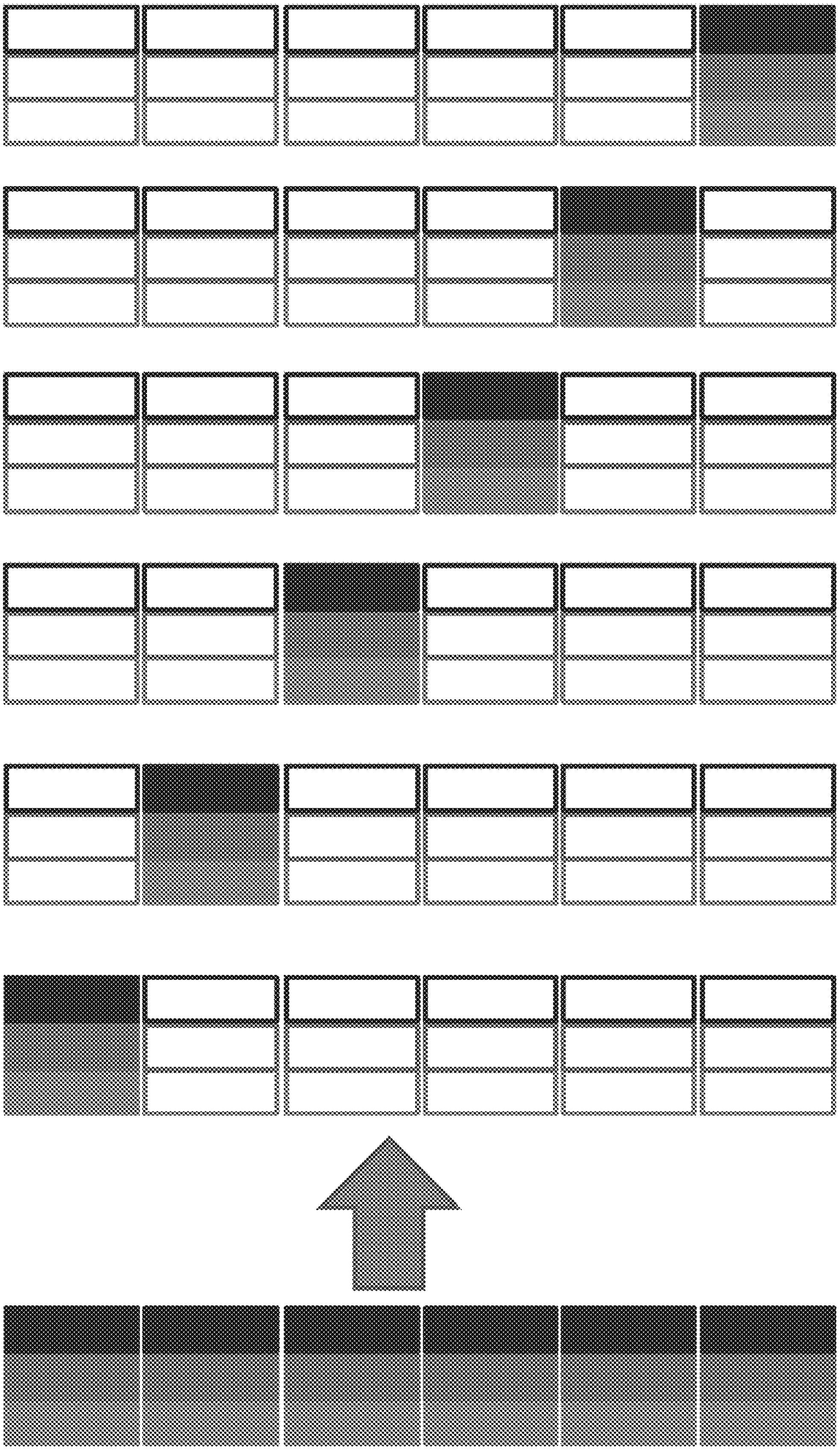
Figure 27:
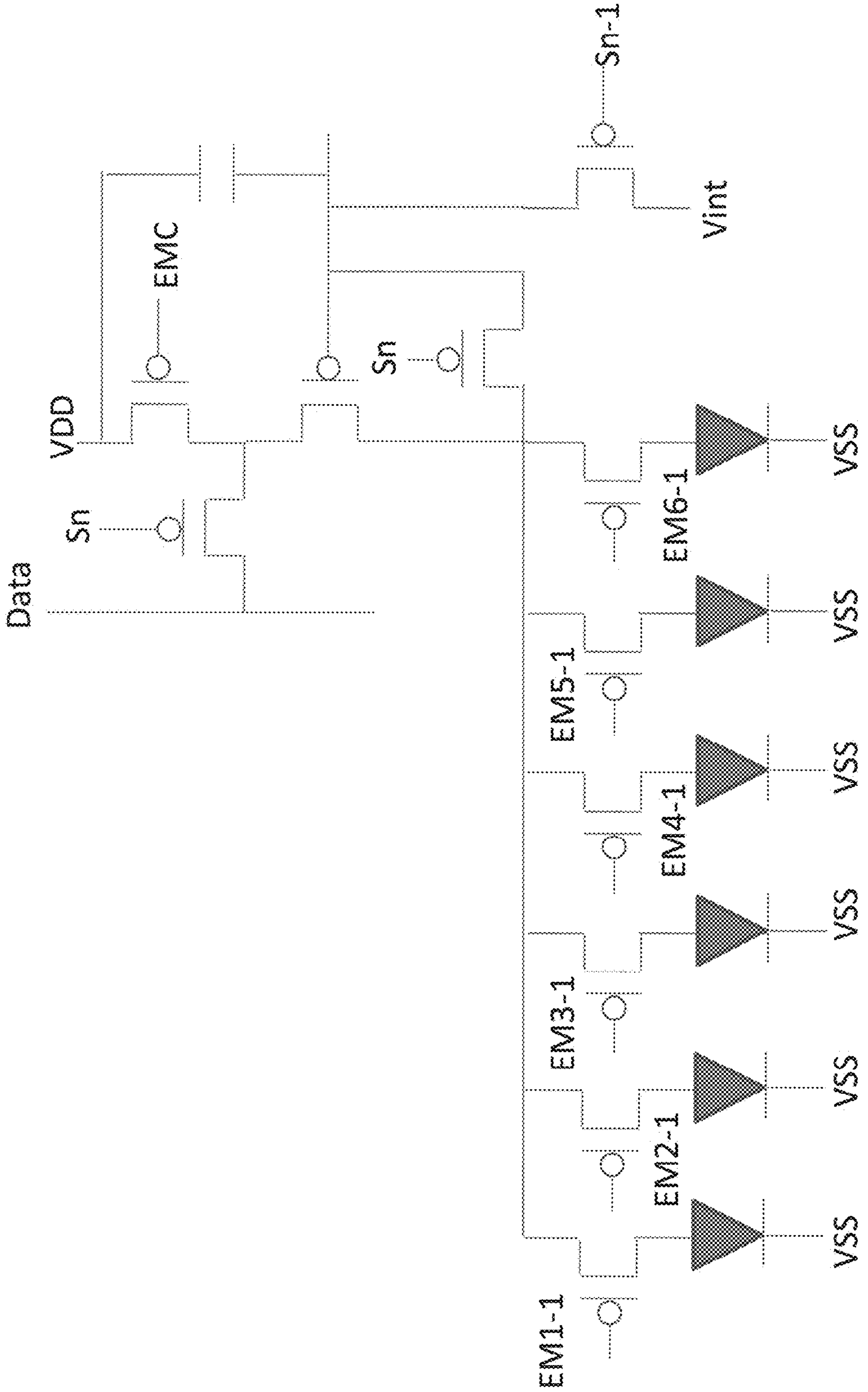
Figure 28:
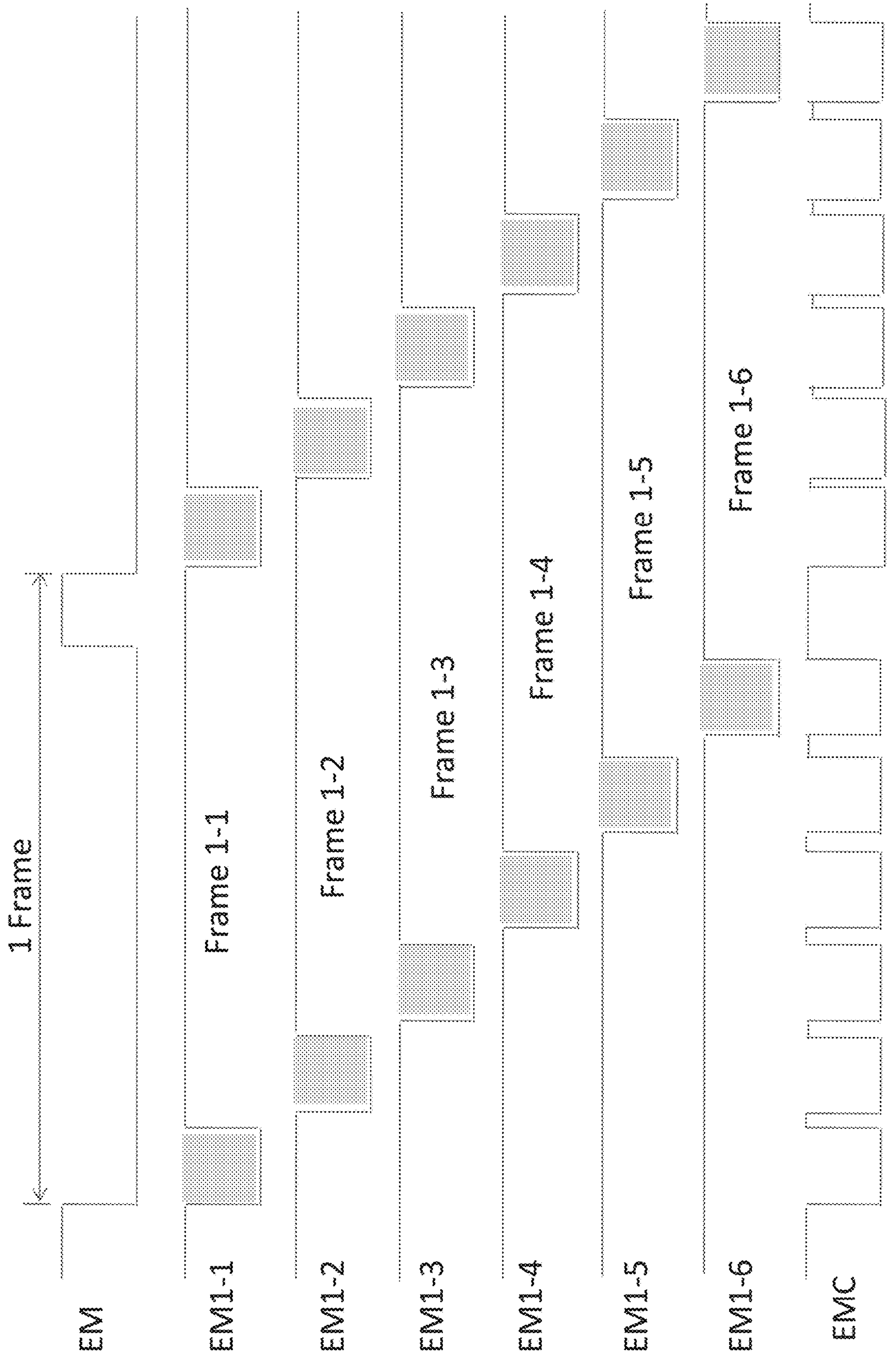
Figure 29:
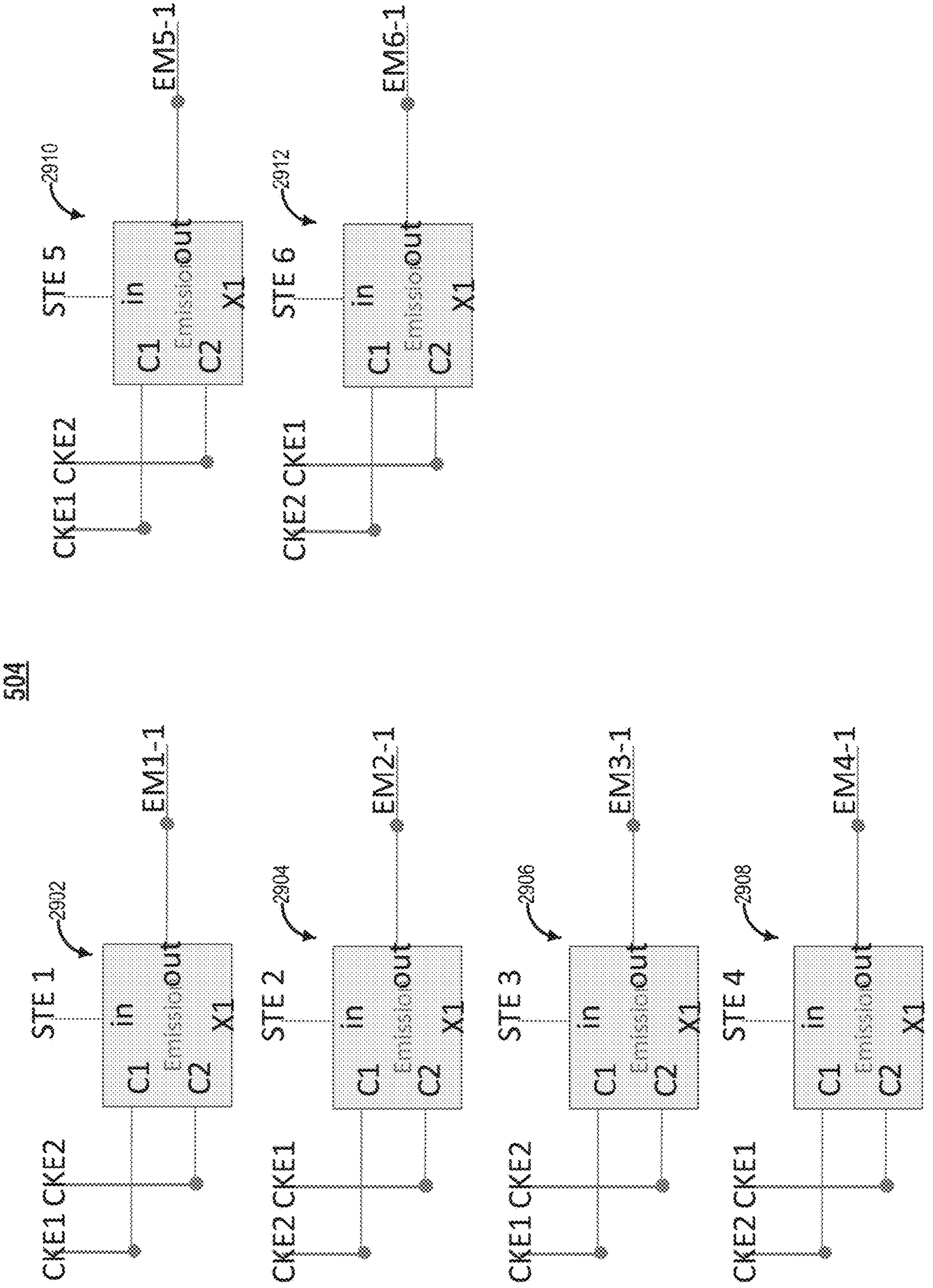
Figure 30A:
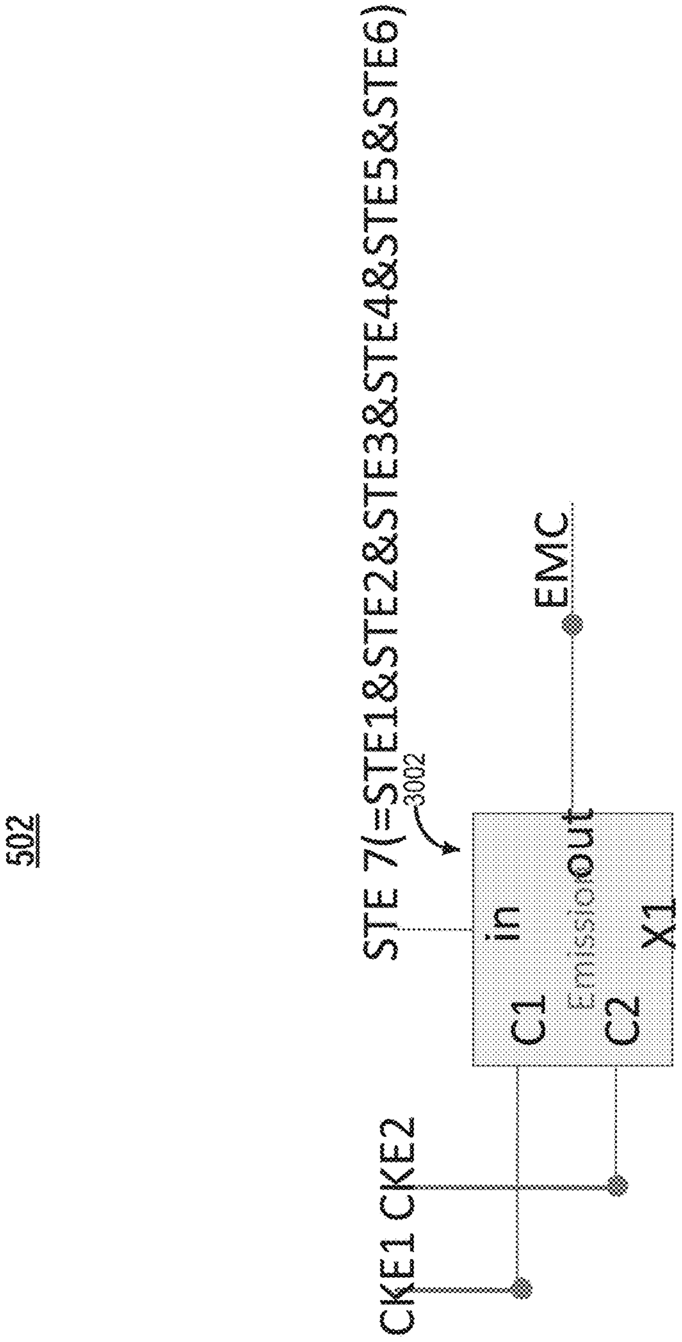
Figure 30B:
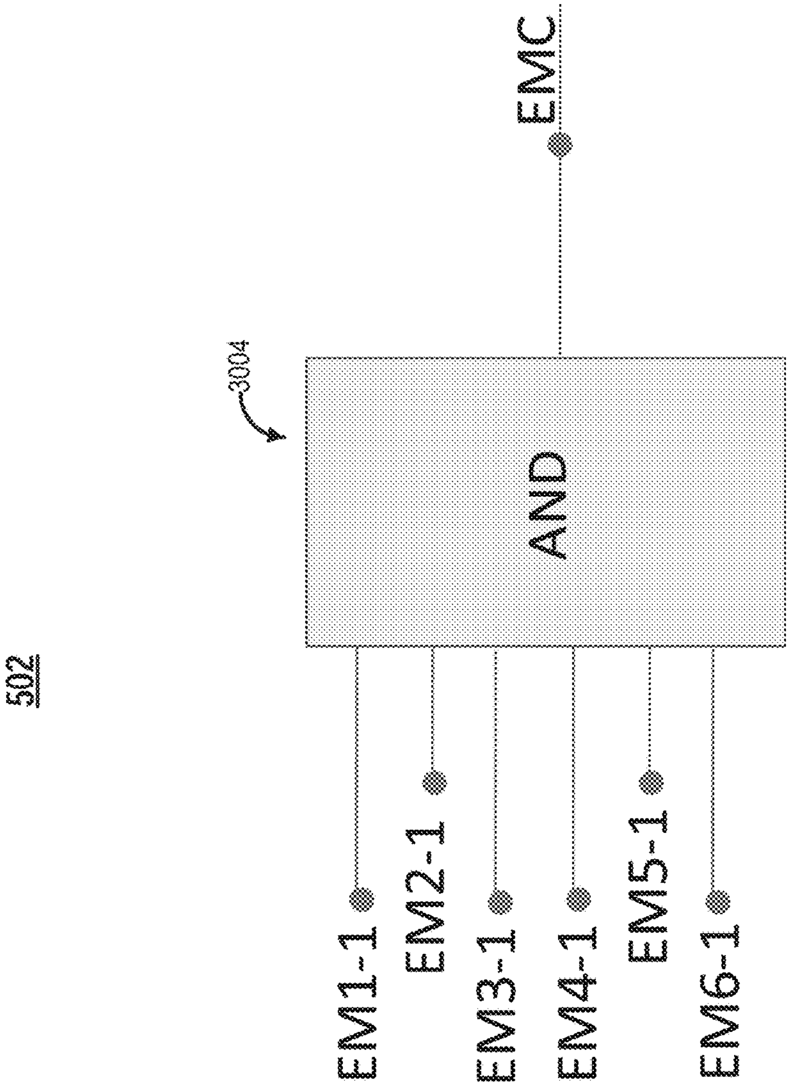
Figure 31:
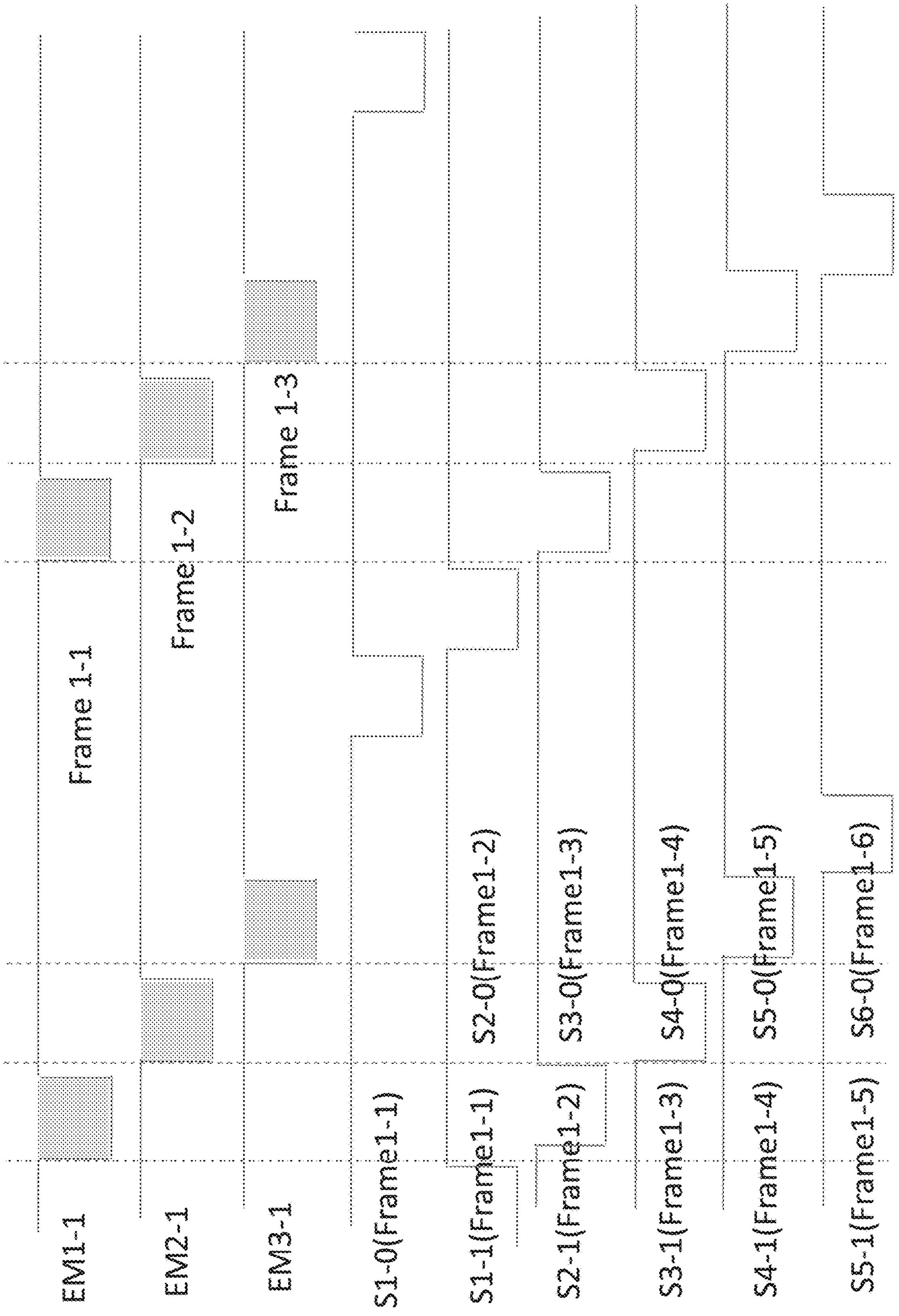
Figure 32:
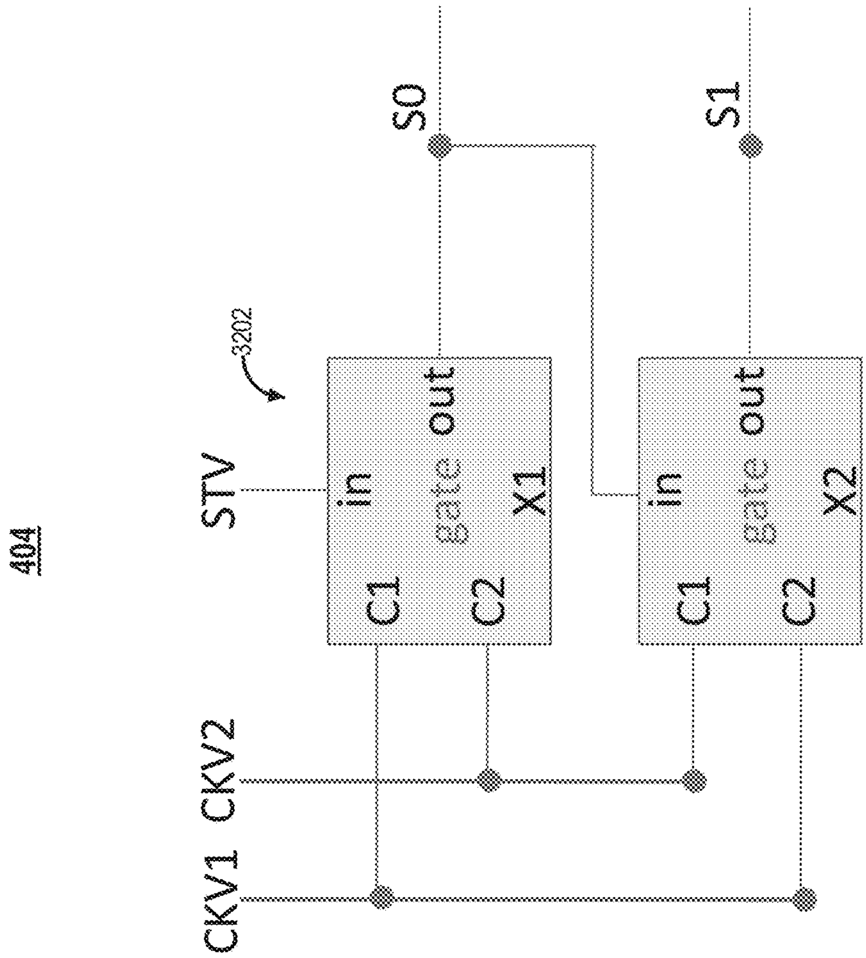
Figure 33A:
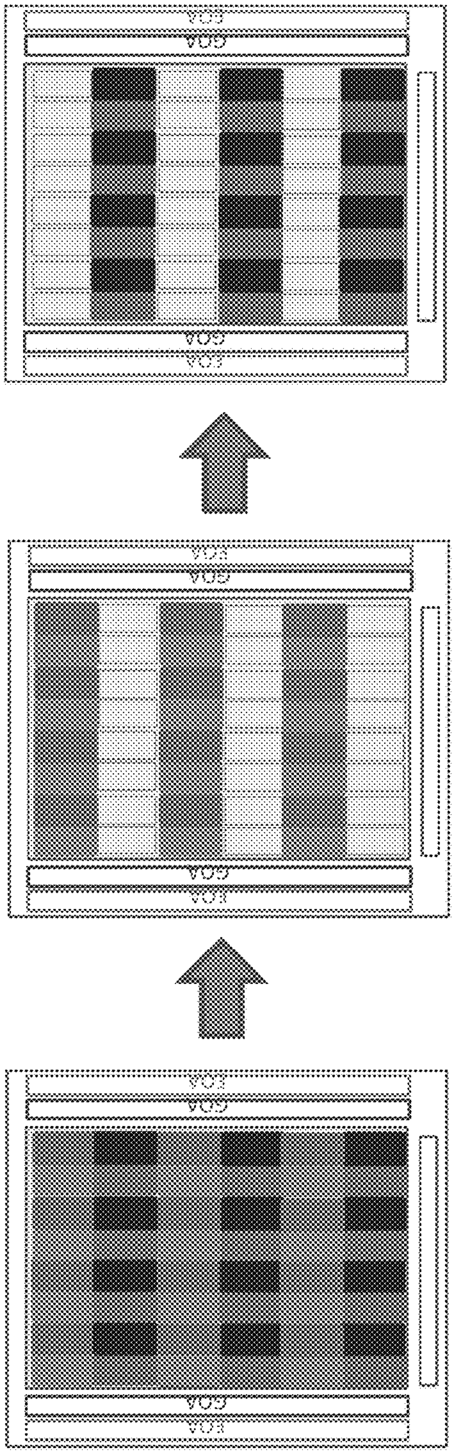
Figure 33B:
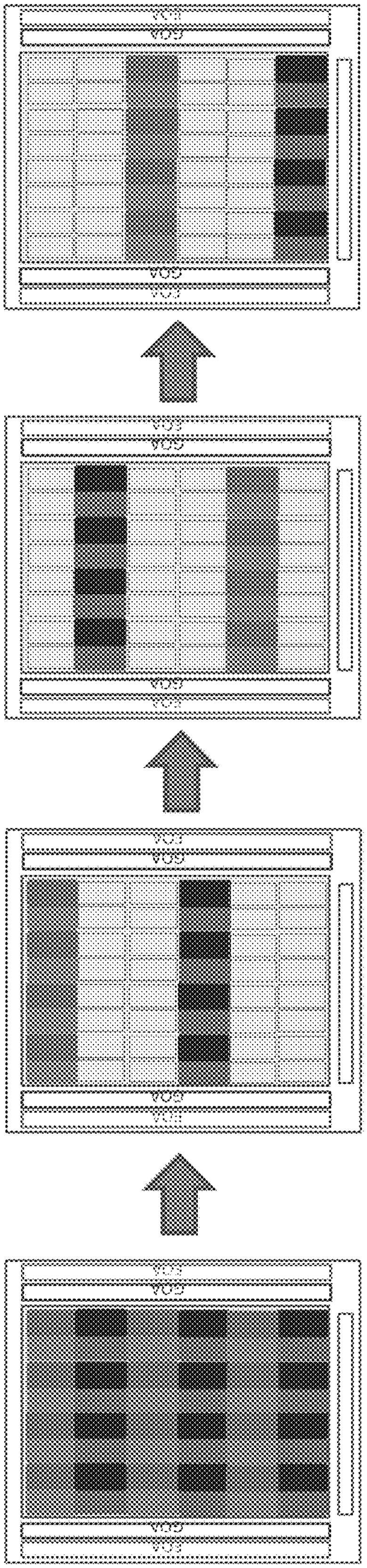
Figure 33C:
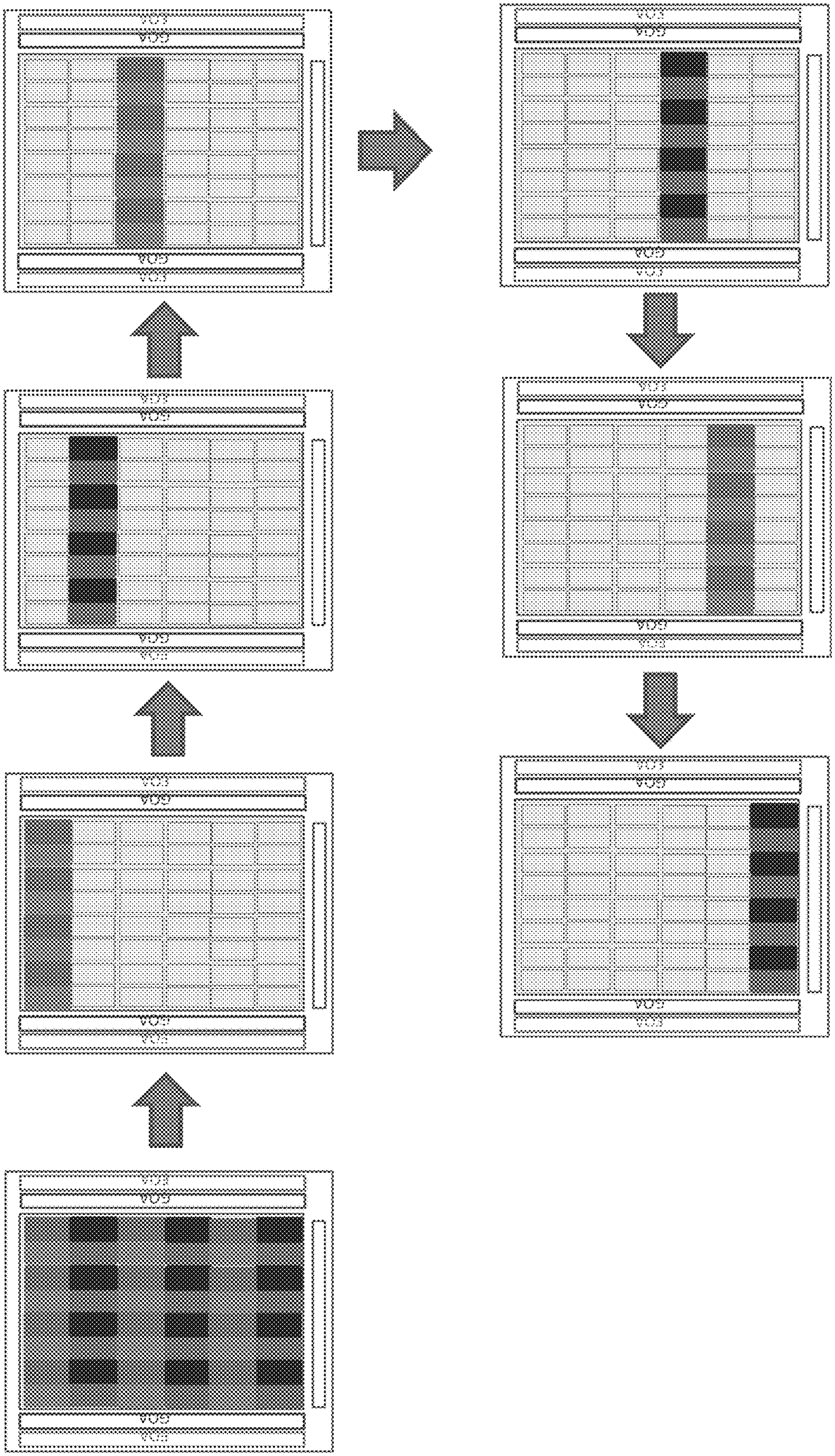
Figure 34A:
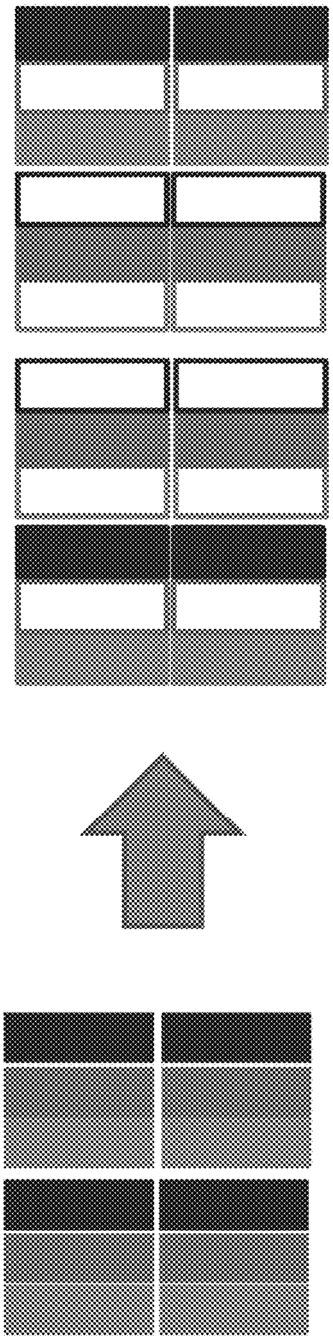
Figure 34B:
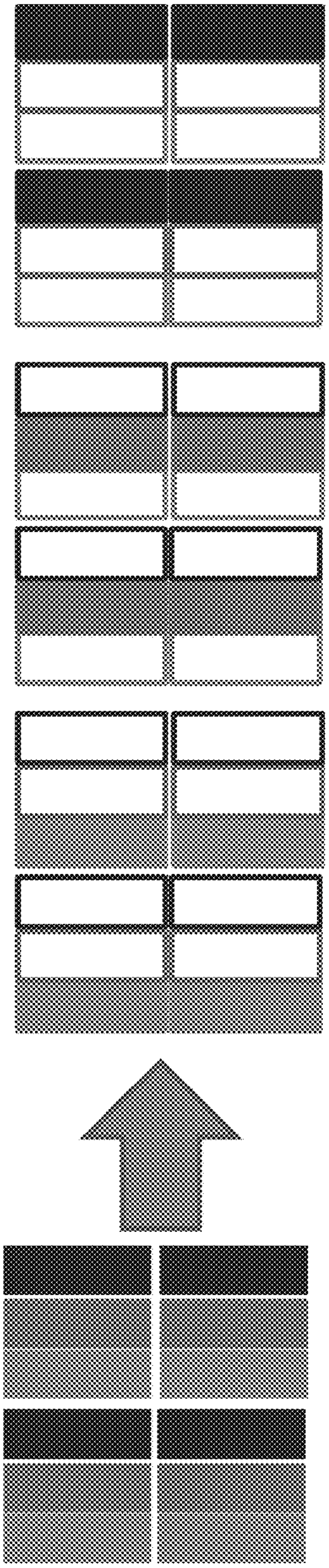
Figure 34C:
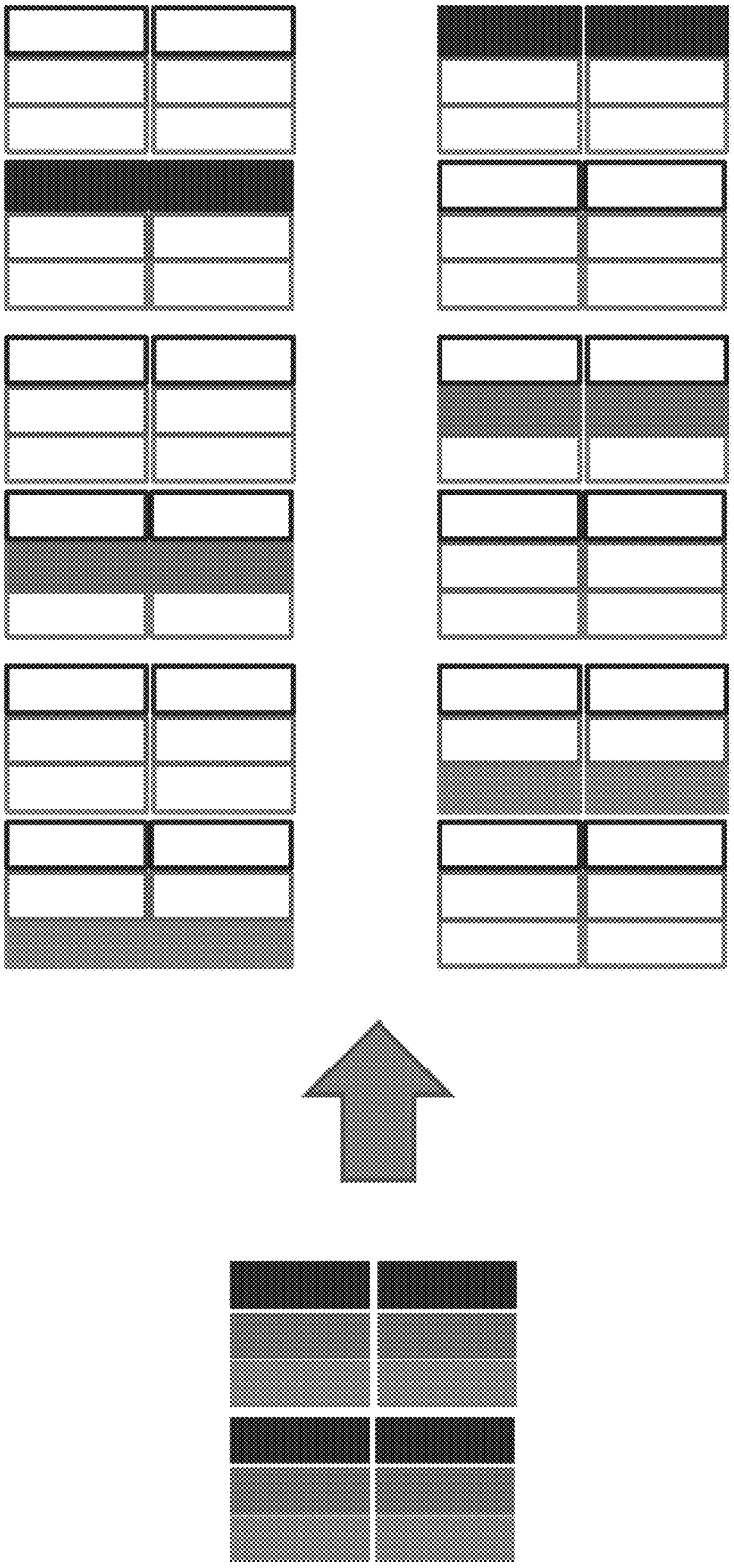
Figure 35:
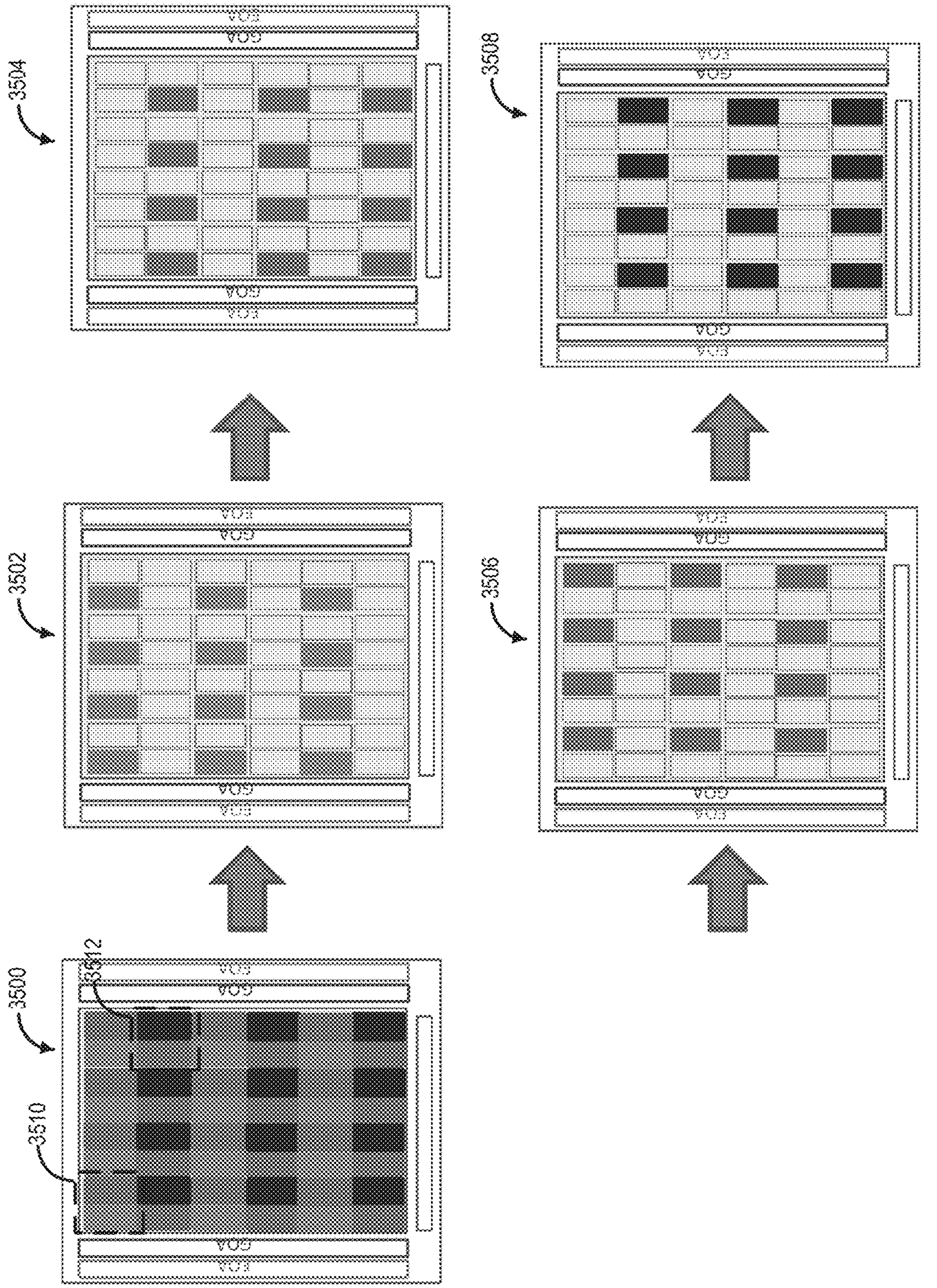
Figure 36:
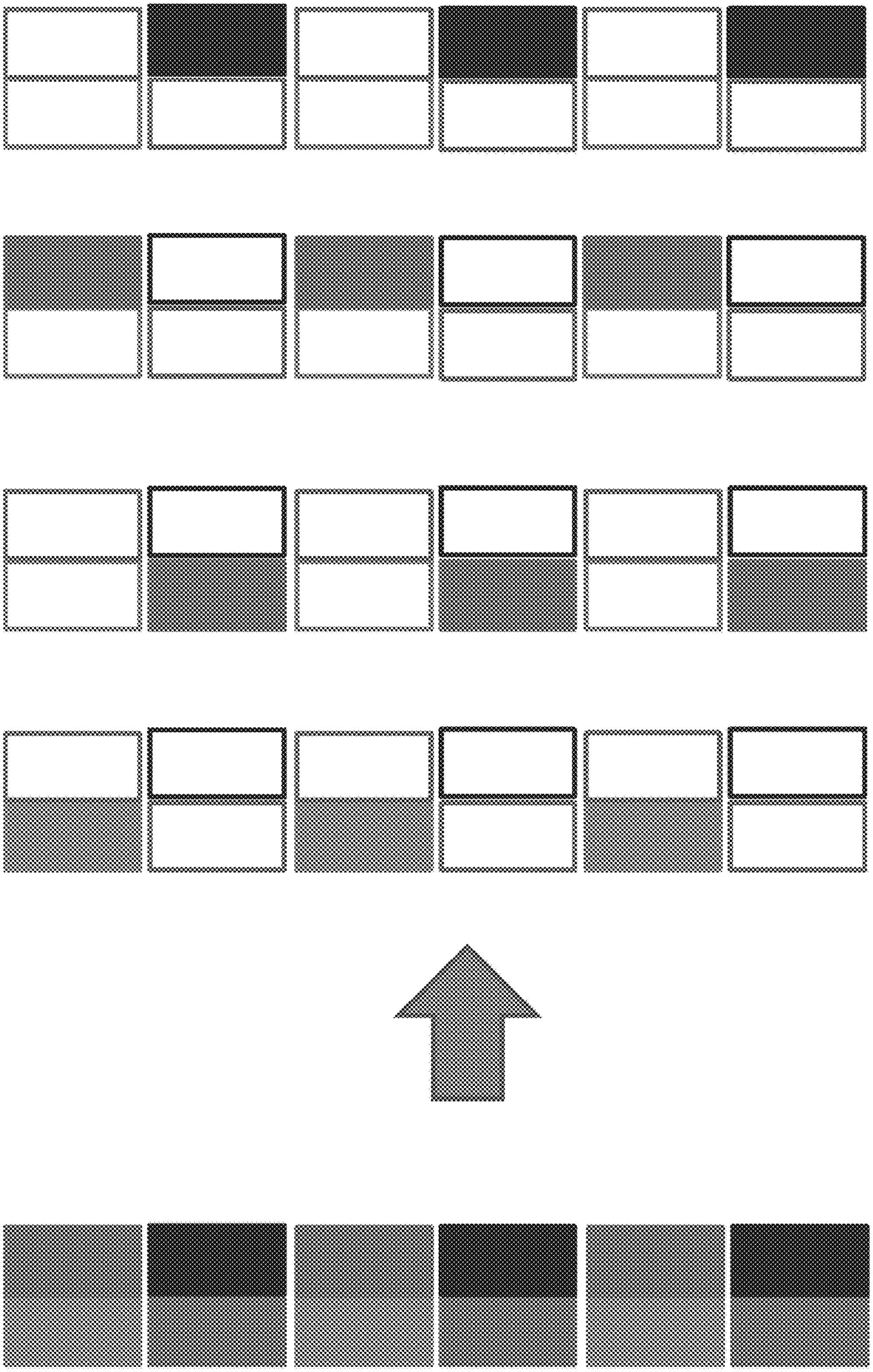
Figure 37:
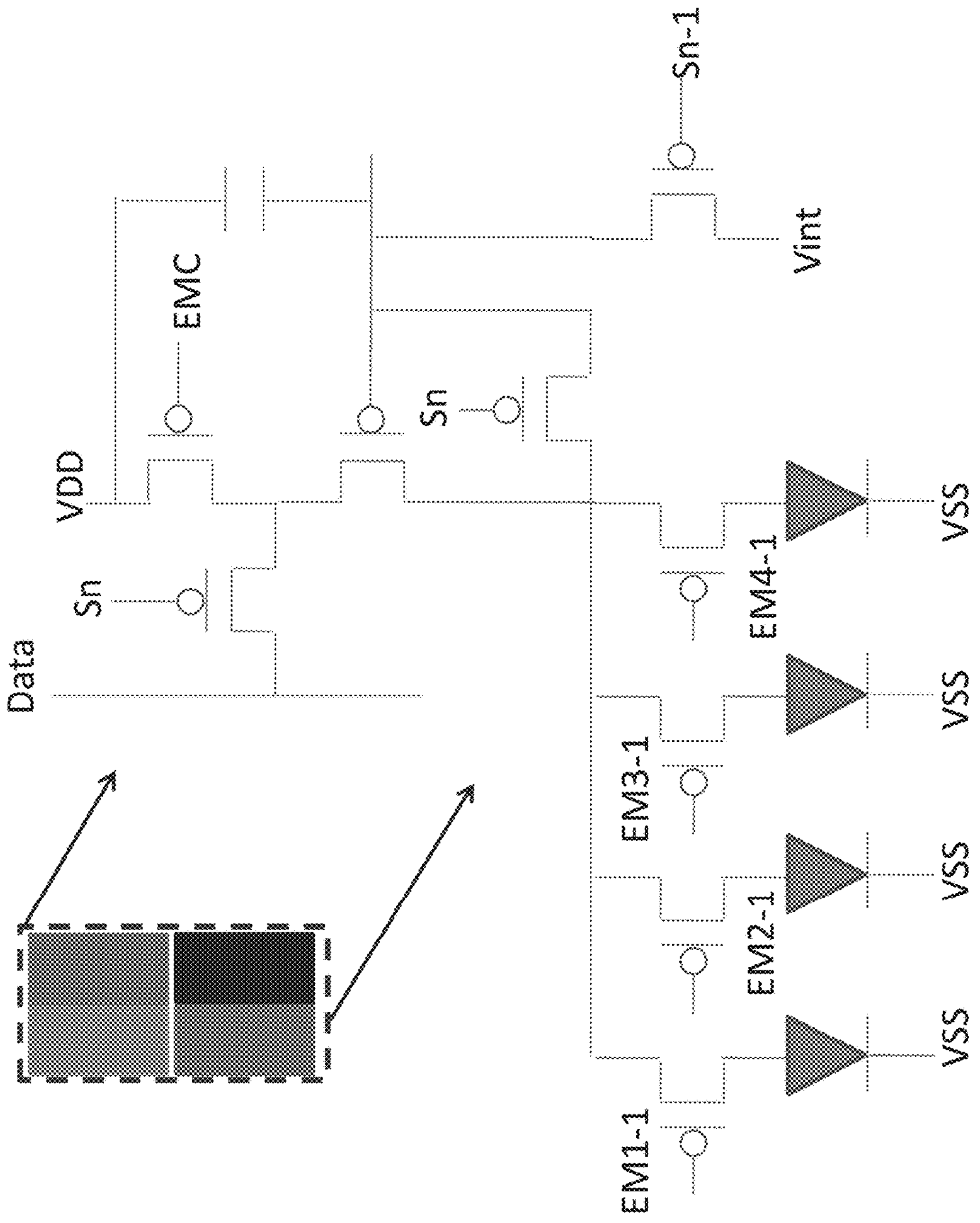
Figure 38:
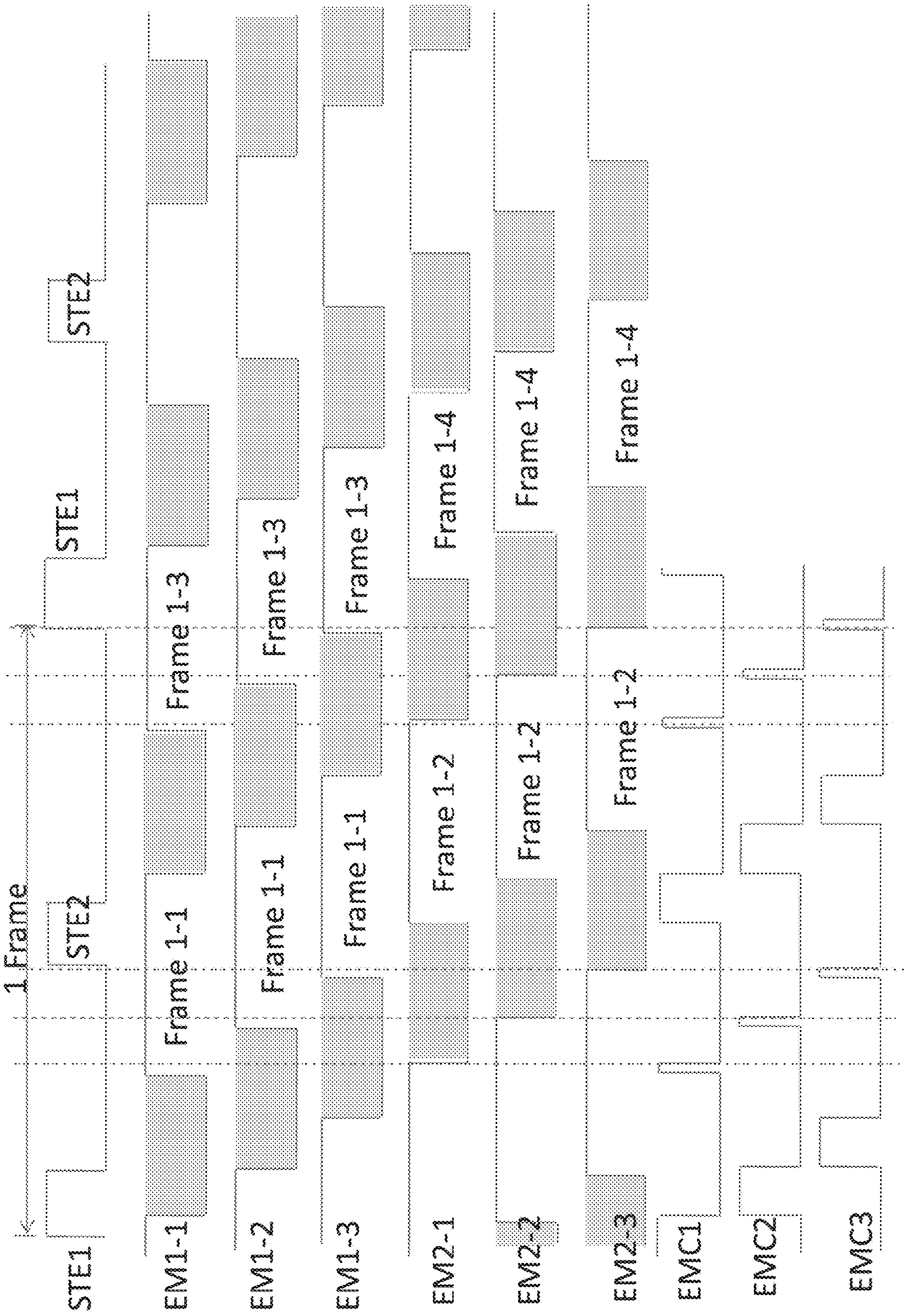
Figure 39:
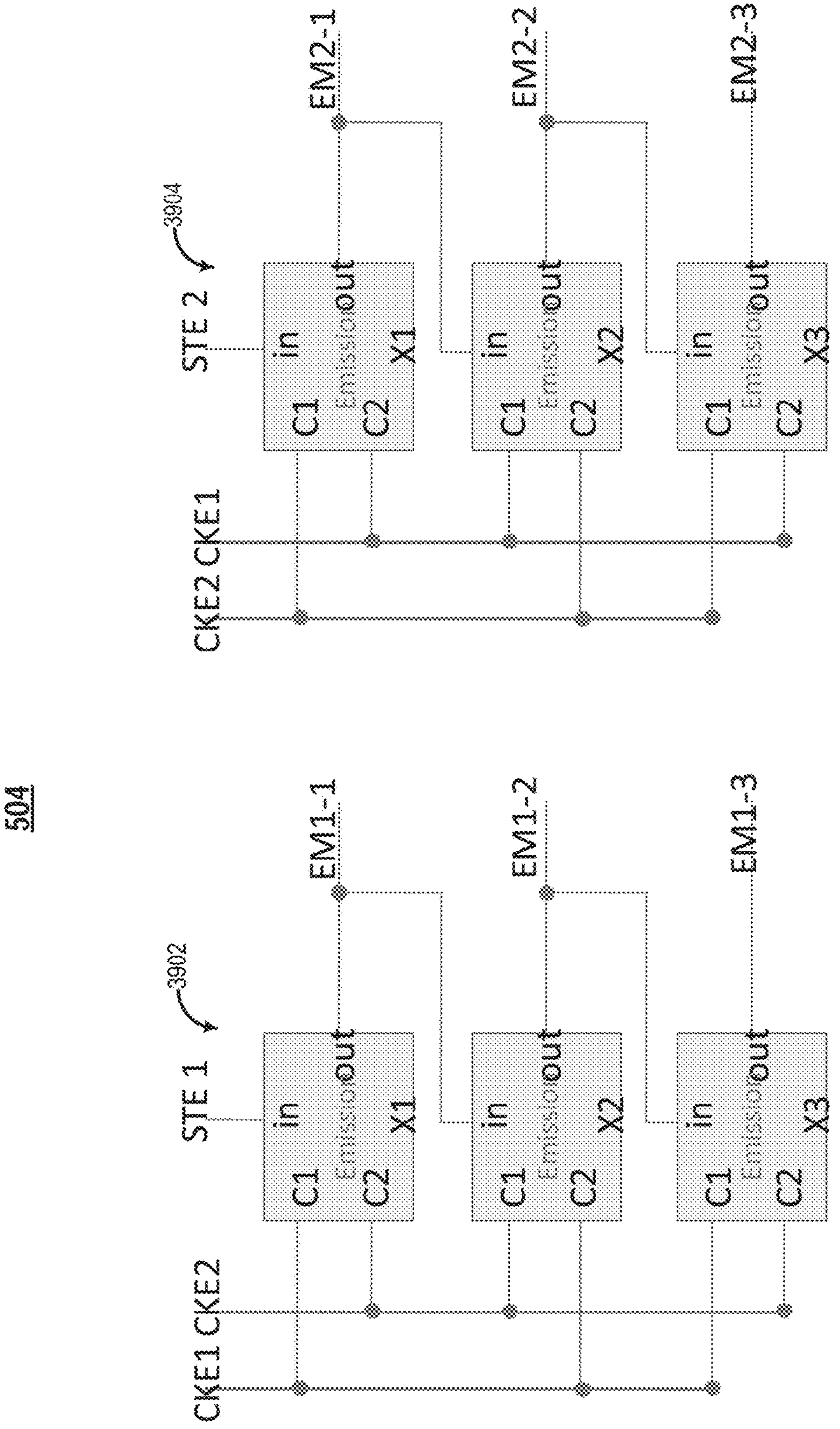
Figure 40A:
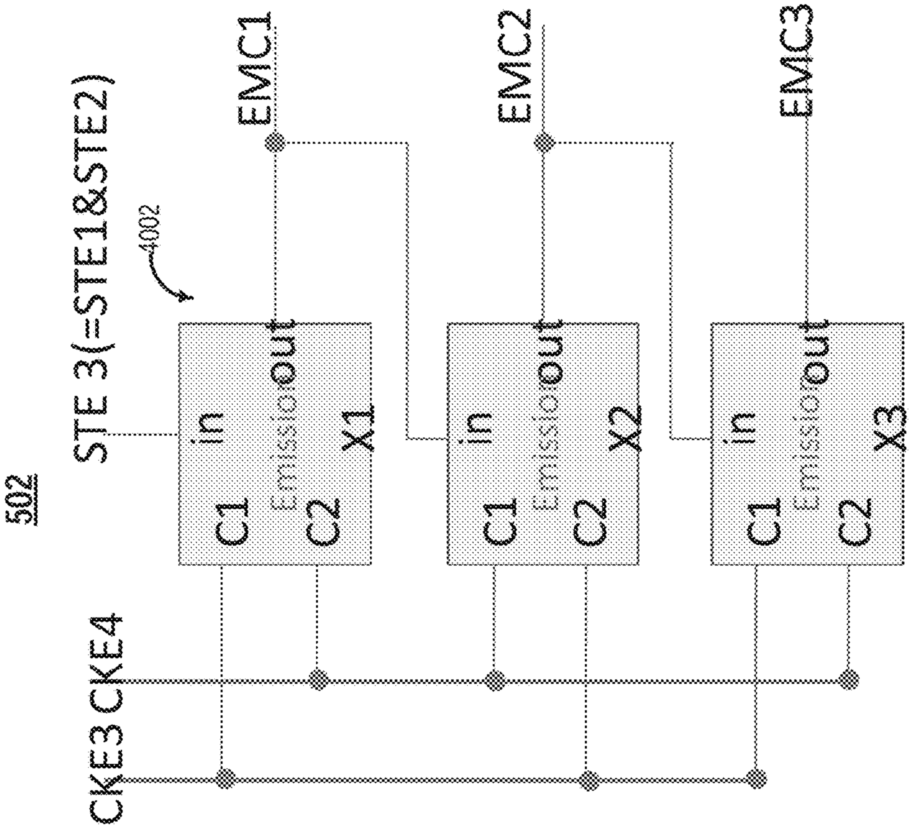
Figure 40B:
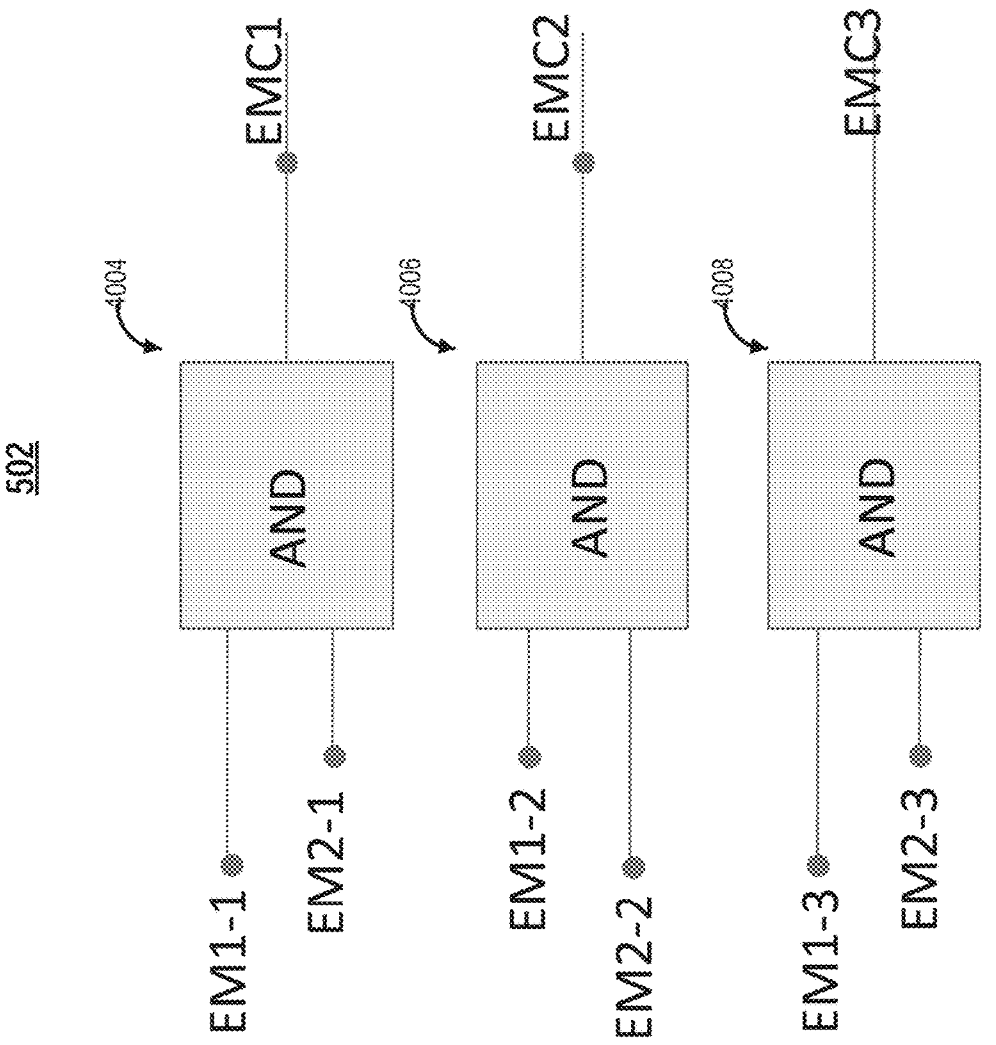
Figure 41:
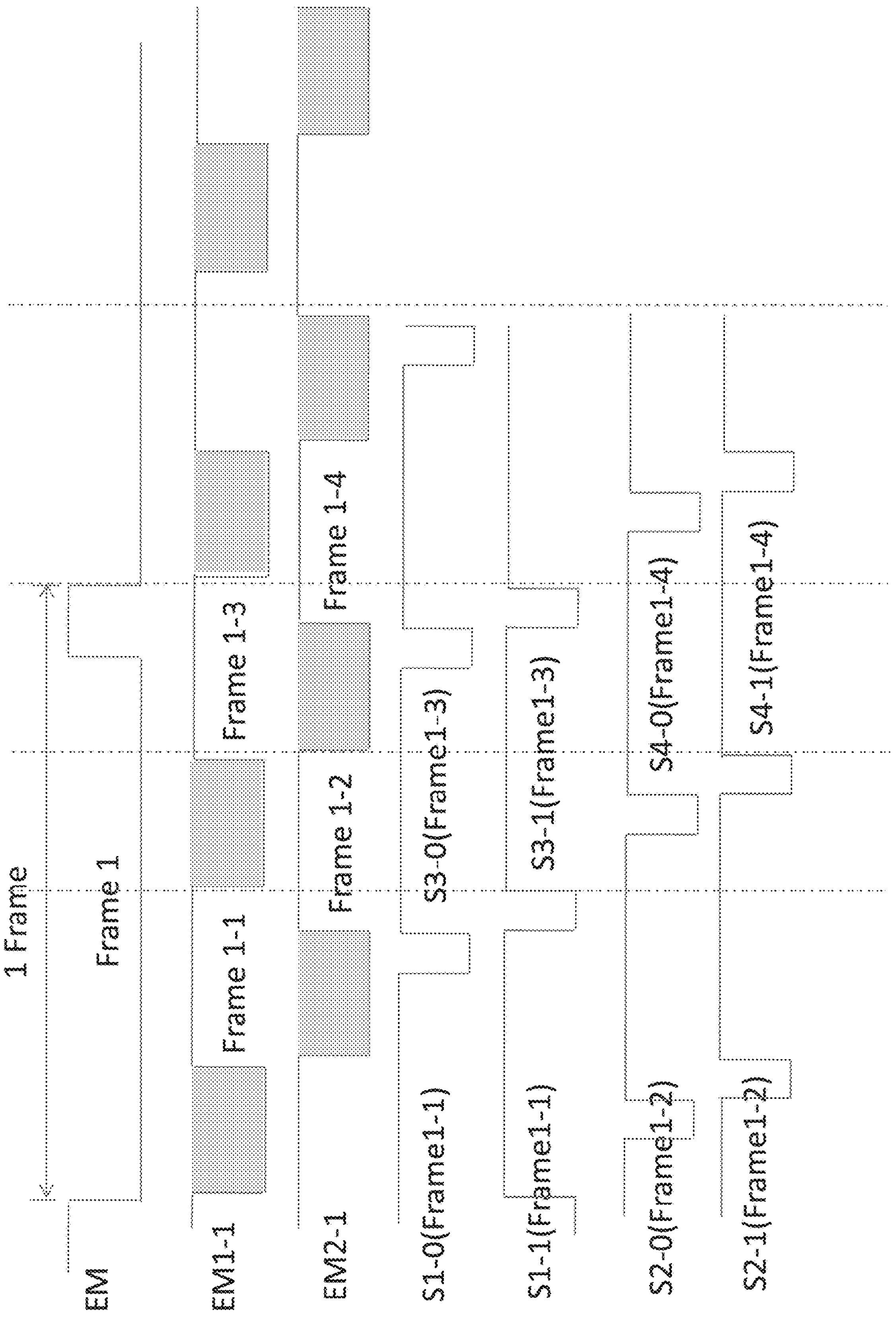
Figure 42:
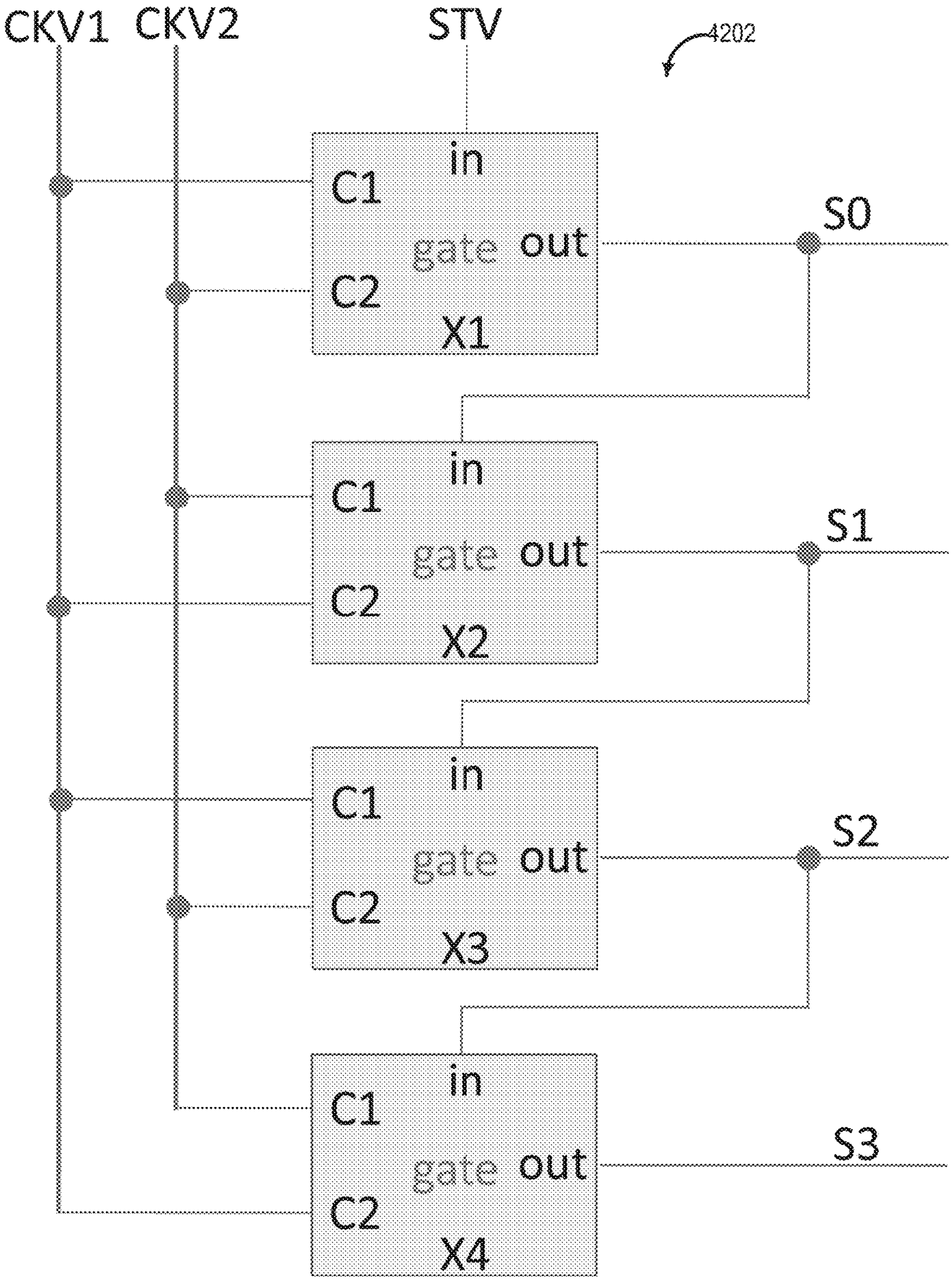
Figure 43:
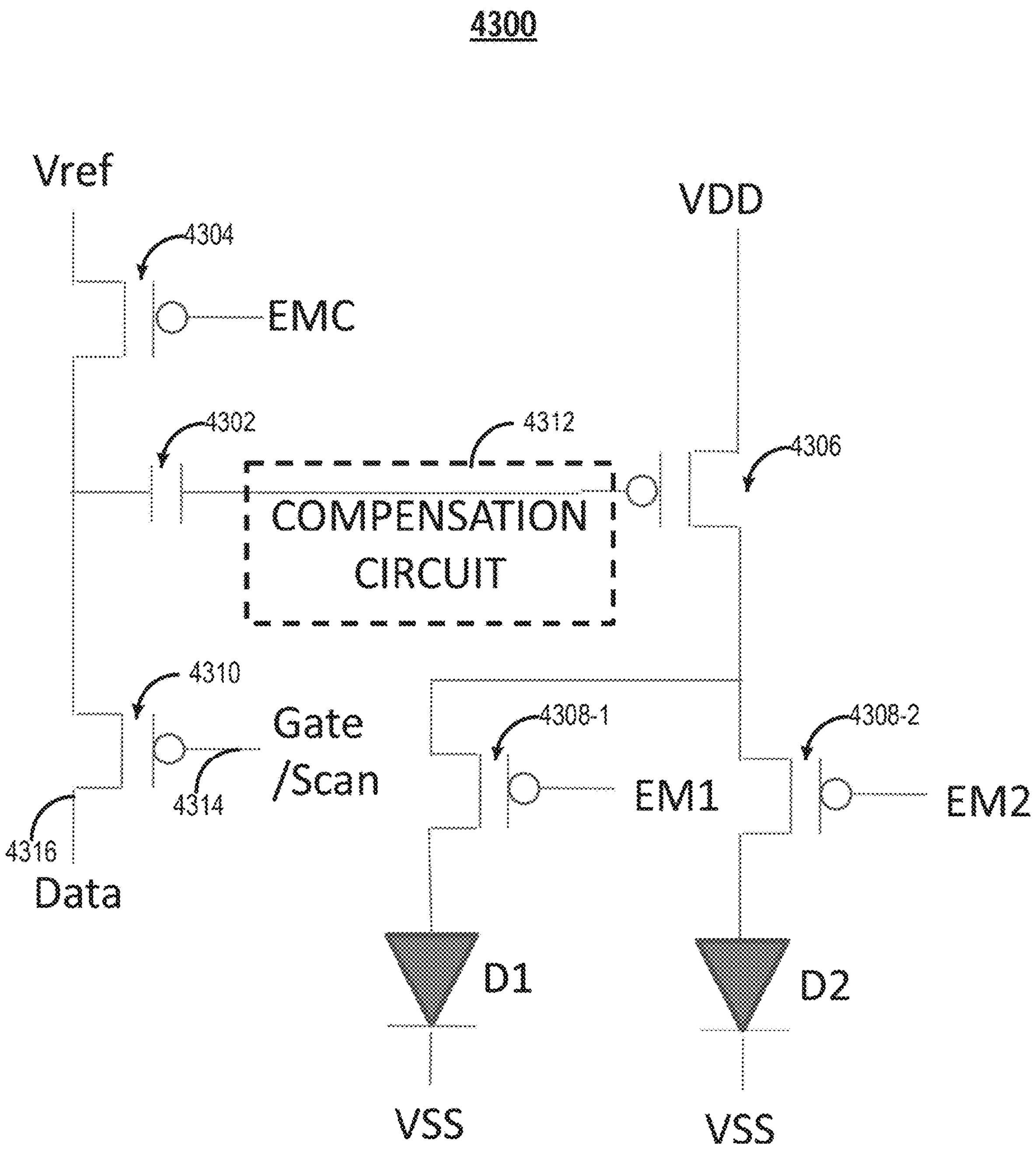
Figure 44:
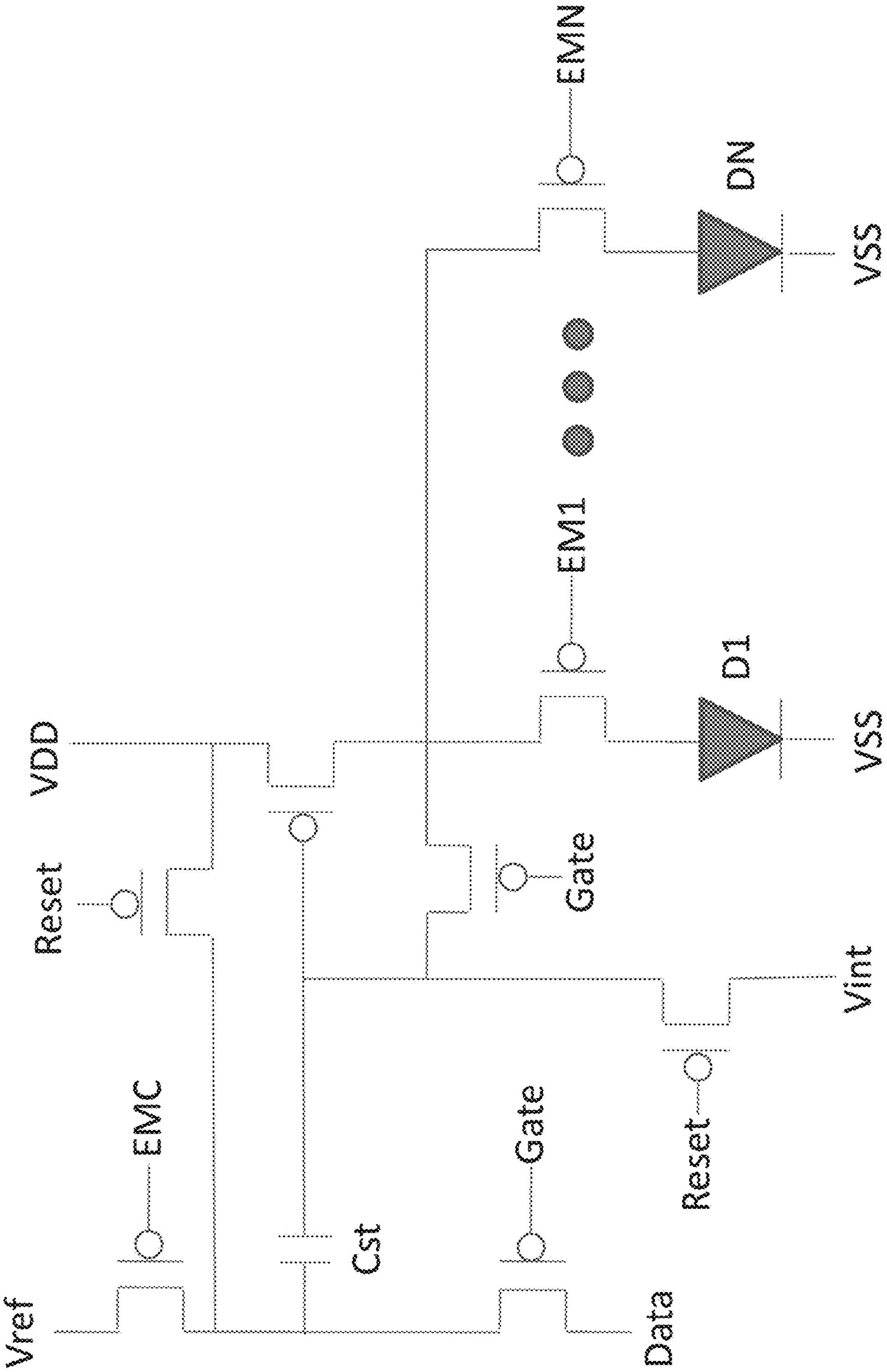
Figure 45:
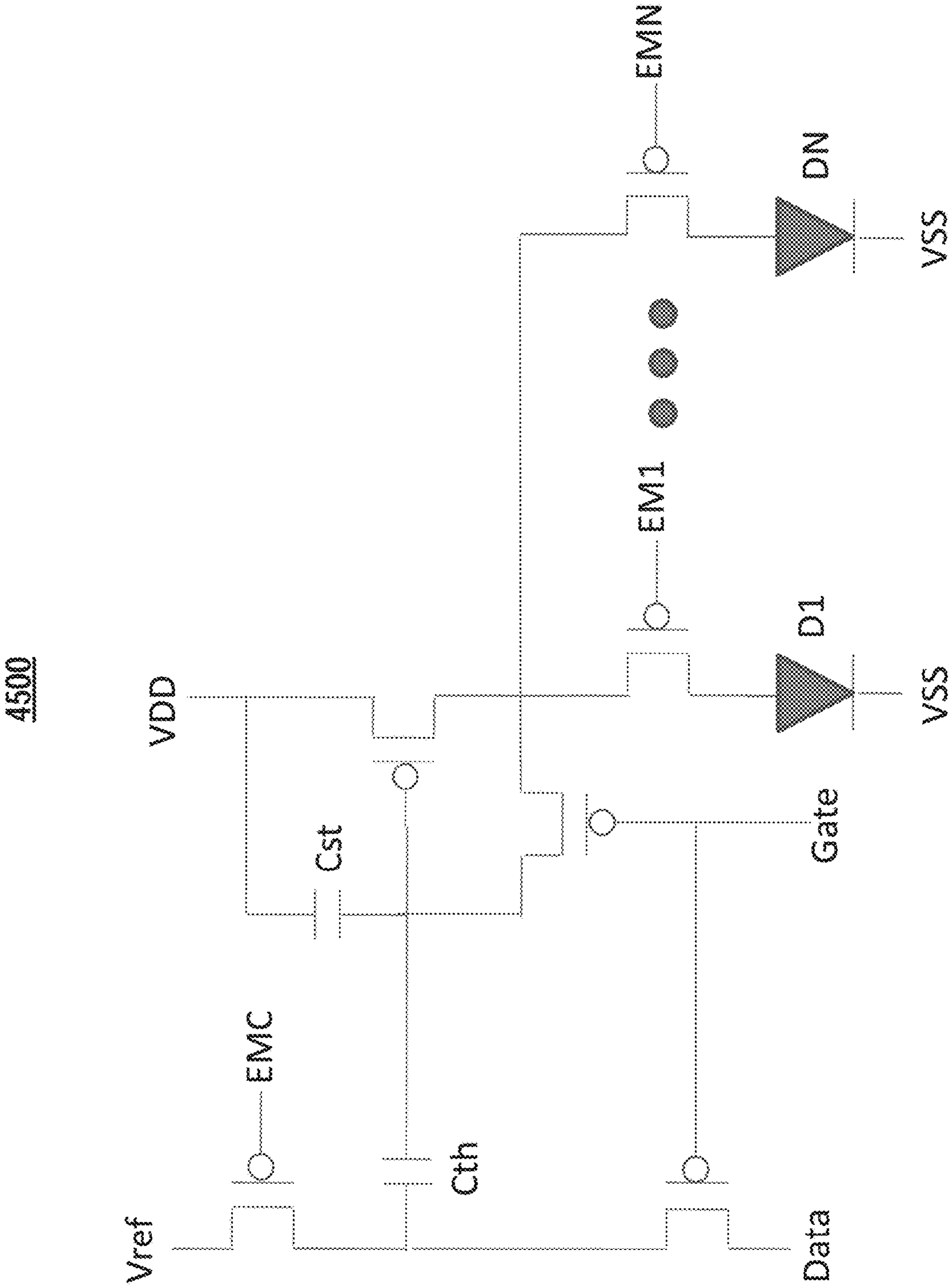
Figure 46:
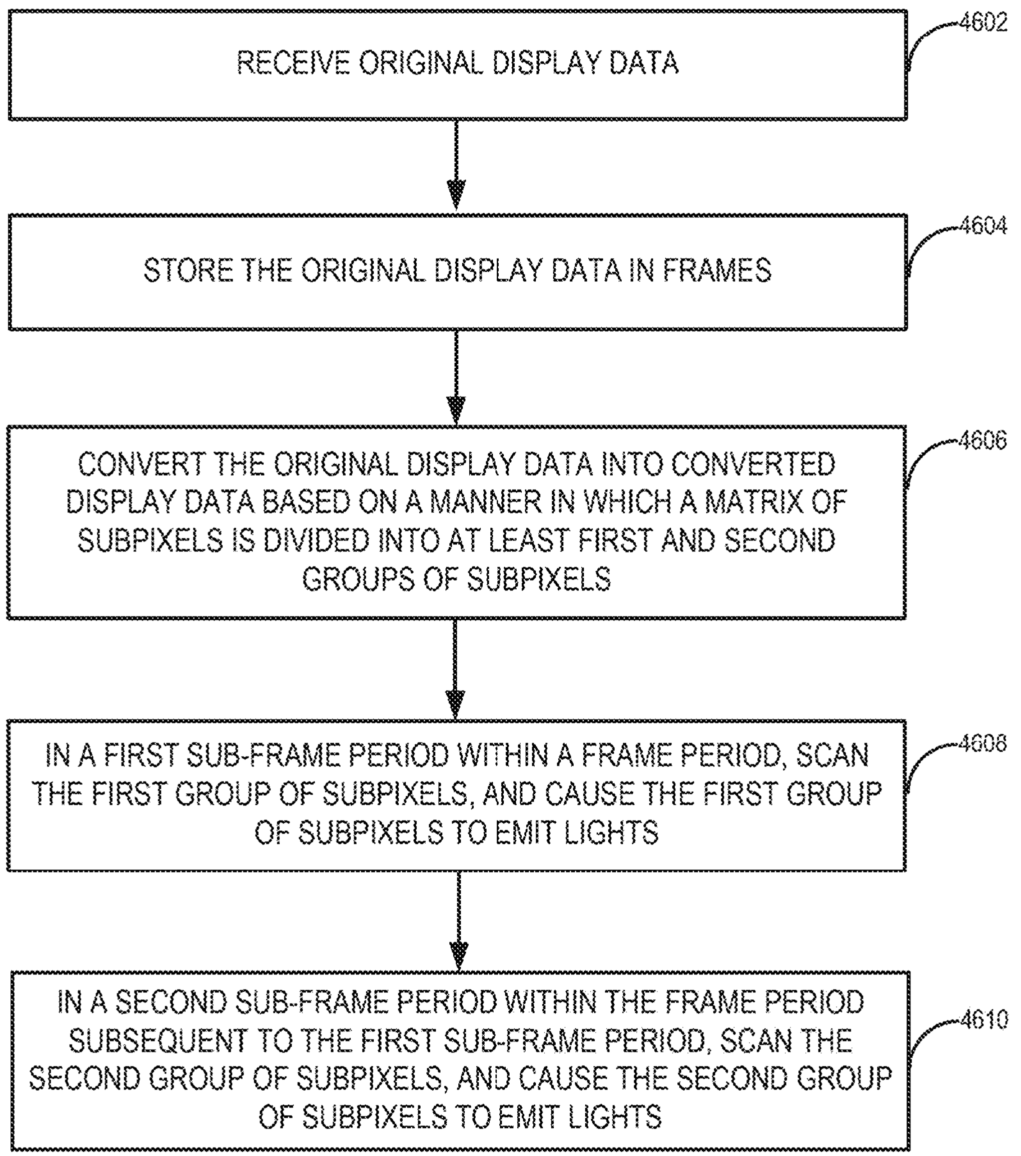
Figure 47A:
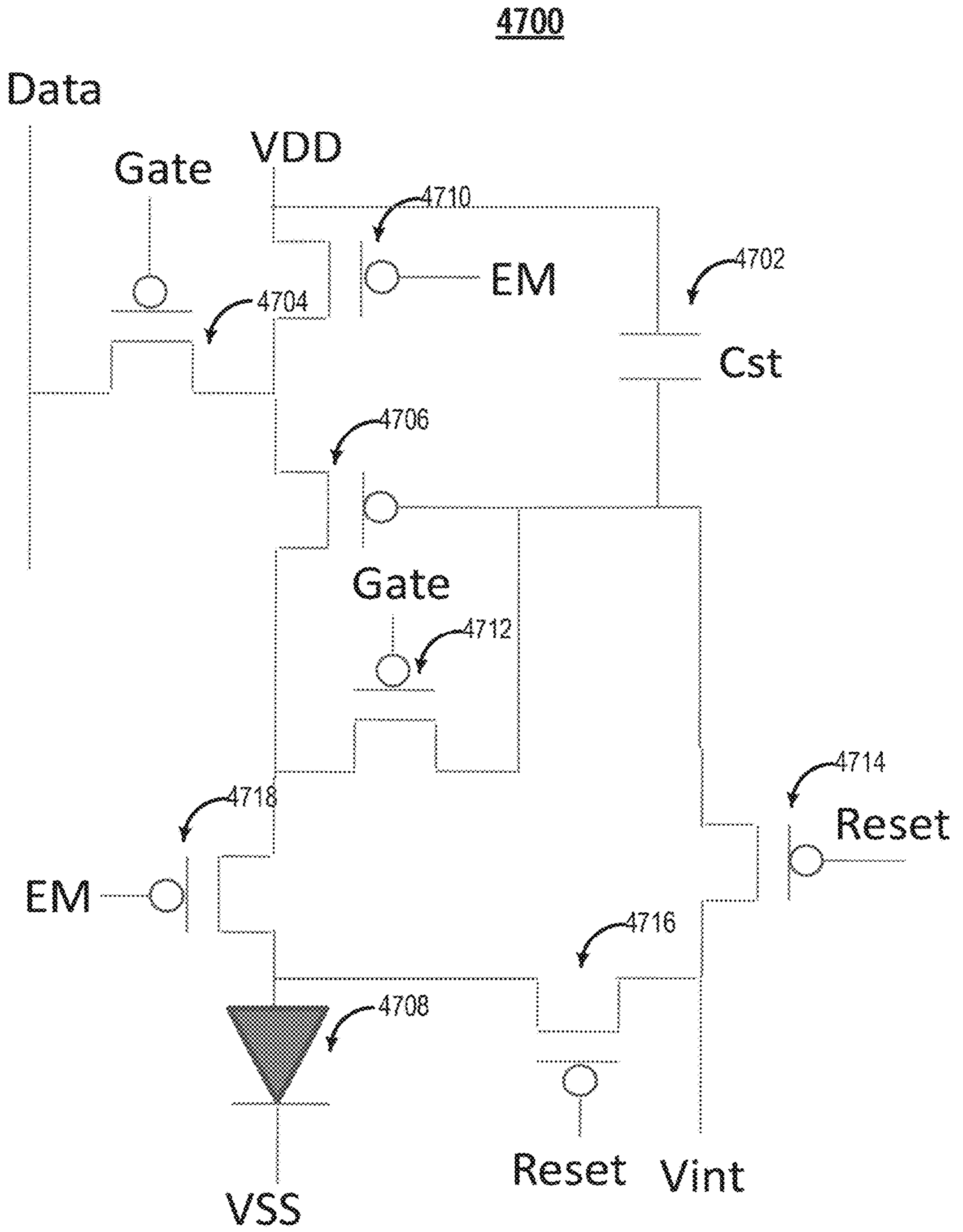
(PRIOR ART) FIG. 47A
Figure 47B:
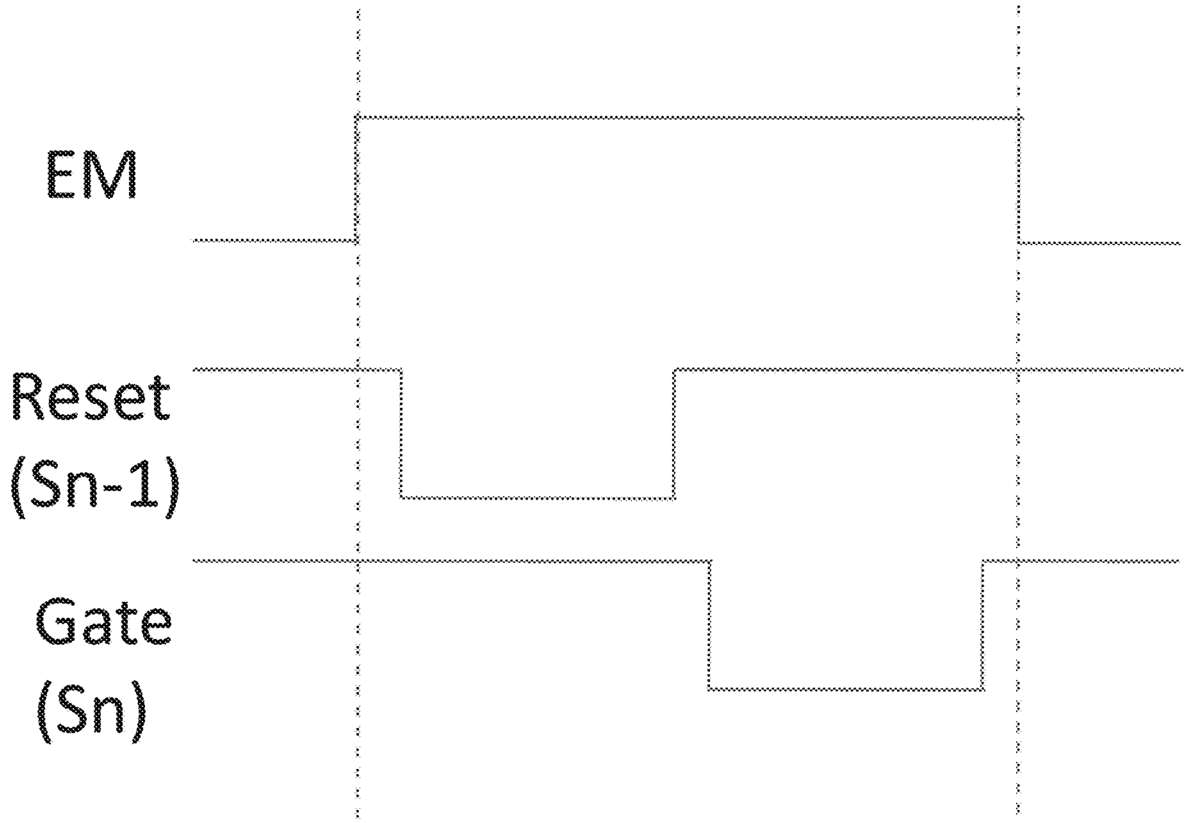
(PRIOR ART) FIG. 47B
Figure 48A:
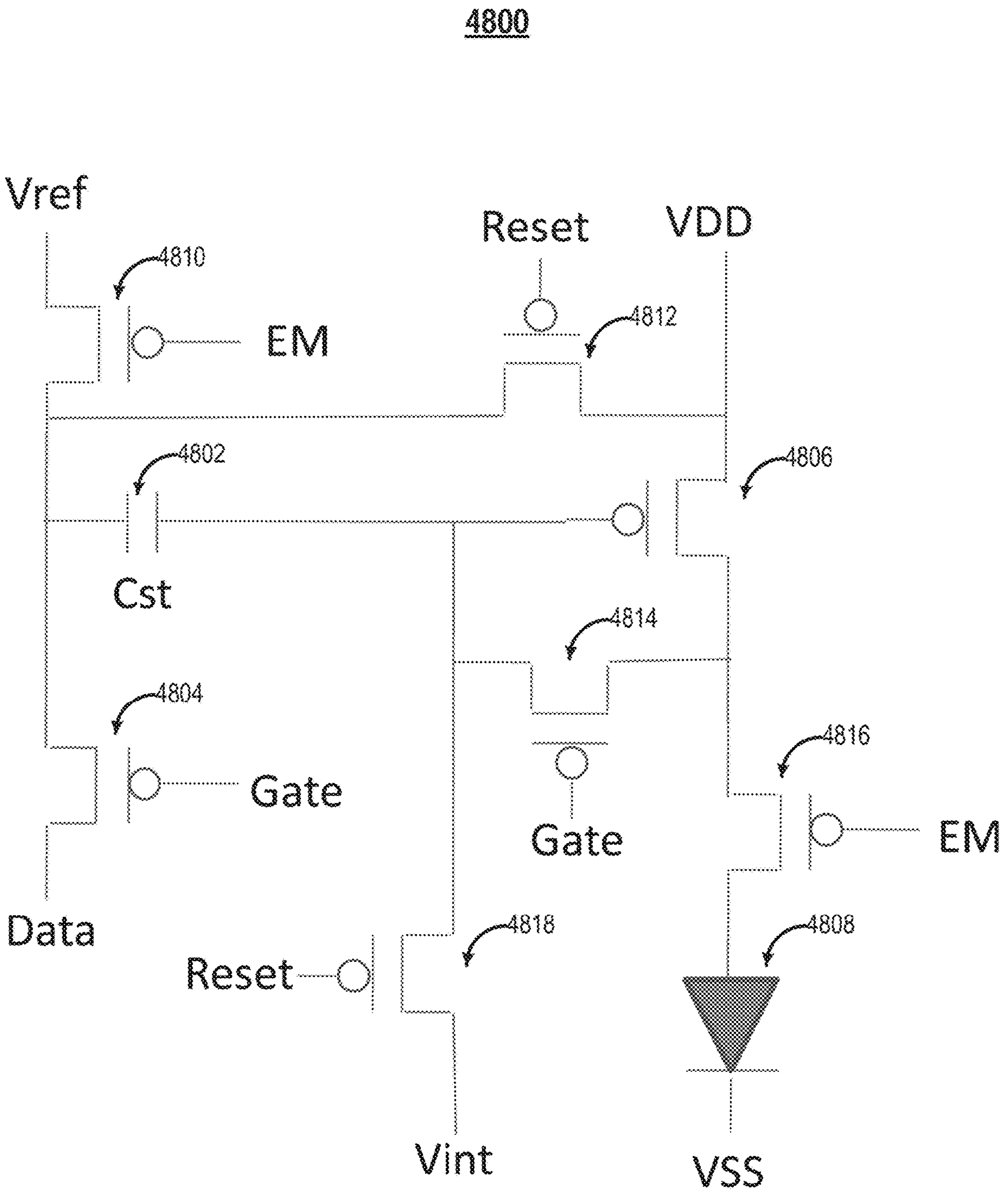
(PRIOR ART) FIG. 48A
Figure 48B:
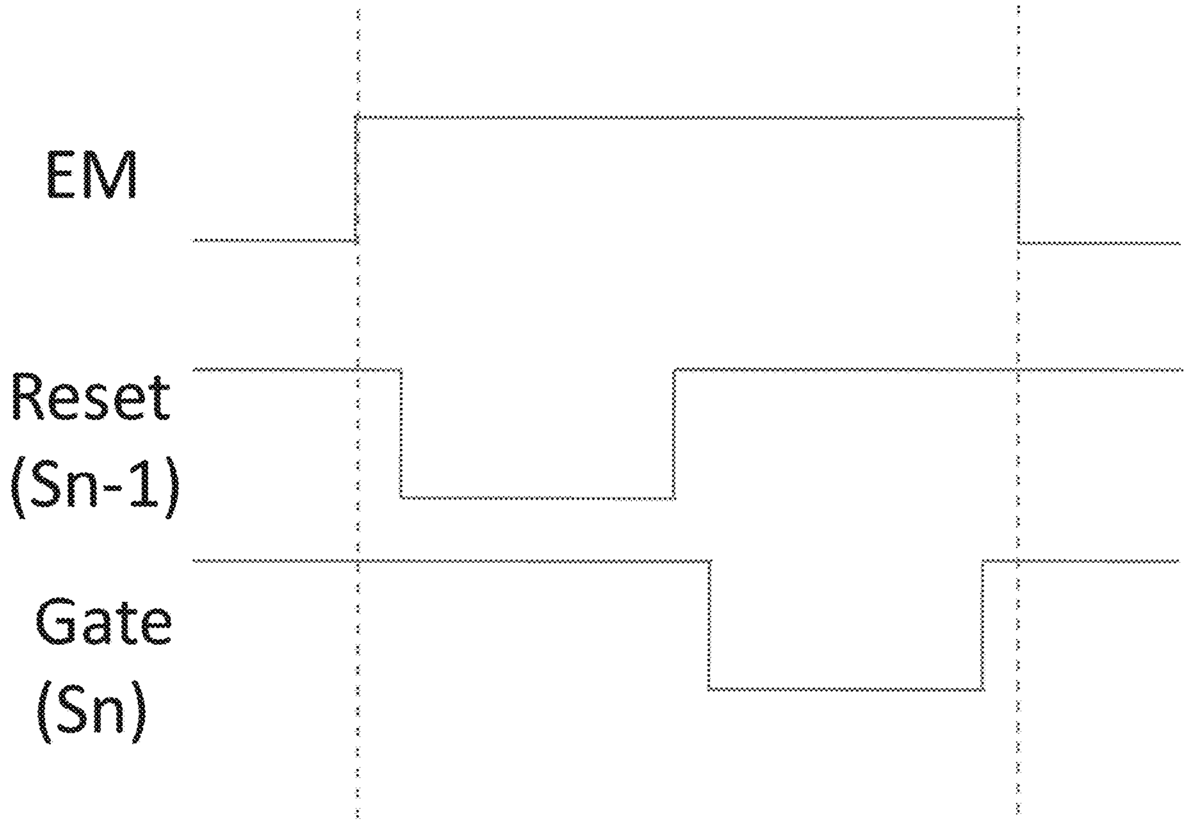
(PRIOR ART) FIG. 48B
Figure 49A:
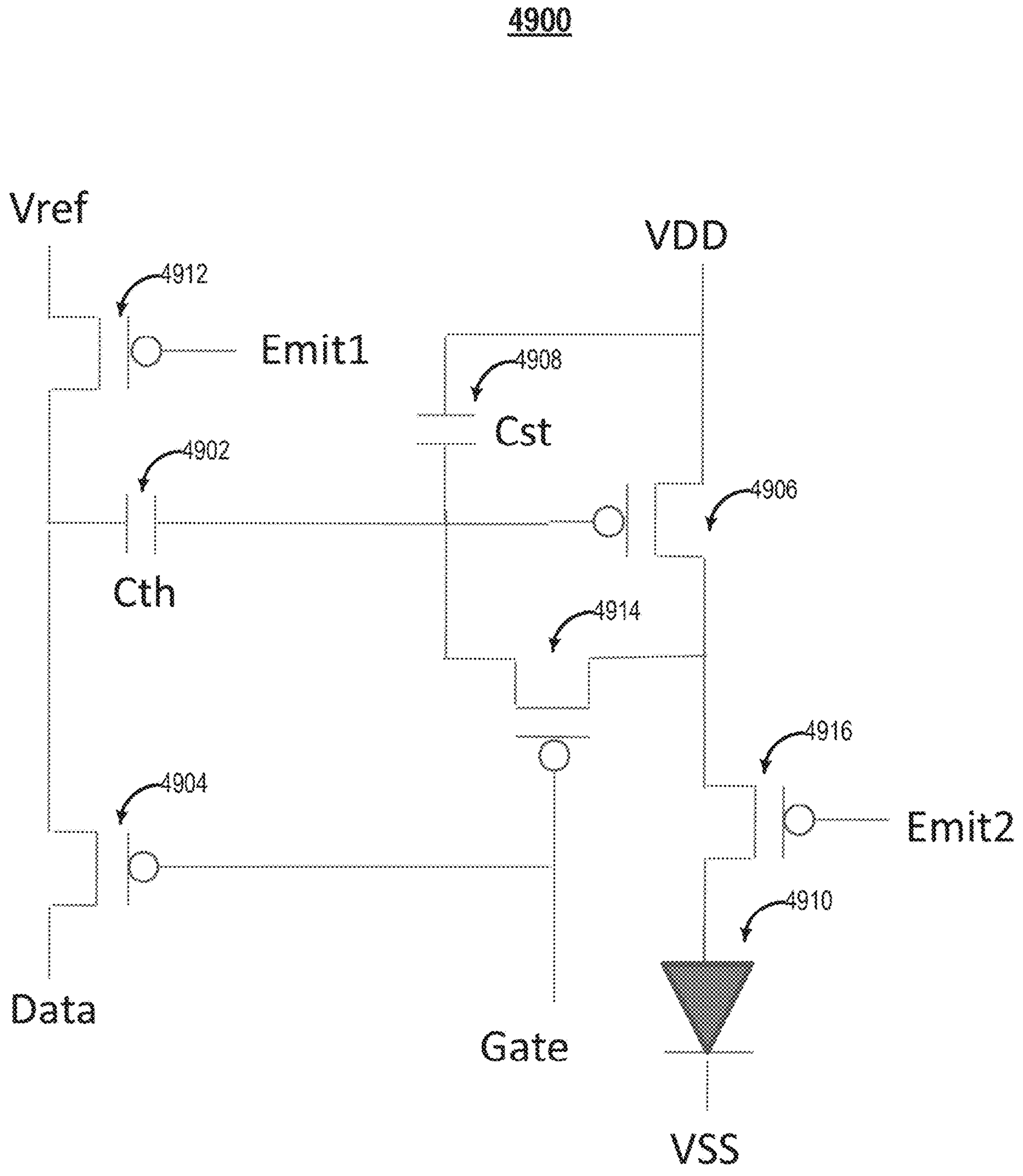
(PRIOR ART) FIG. 49A
Figure 49B:
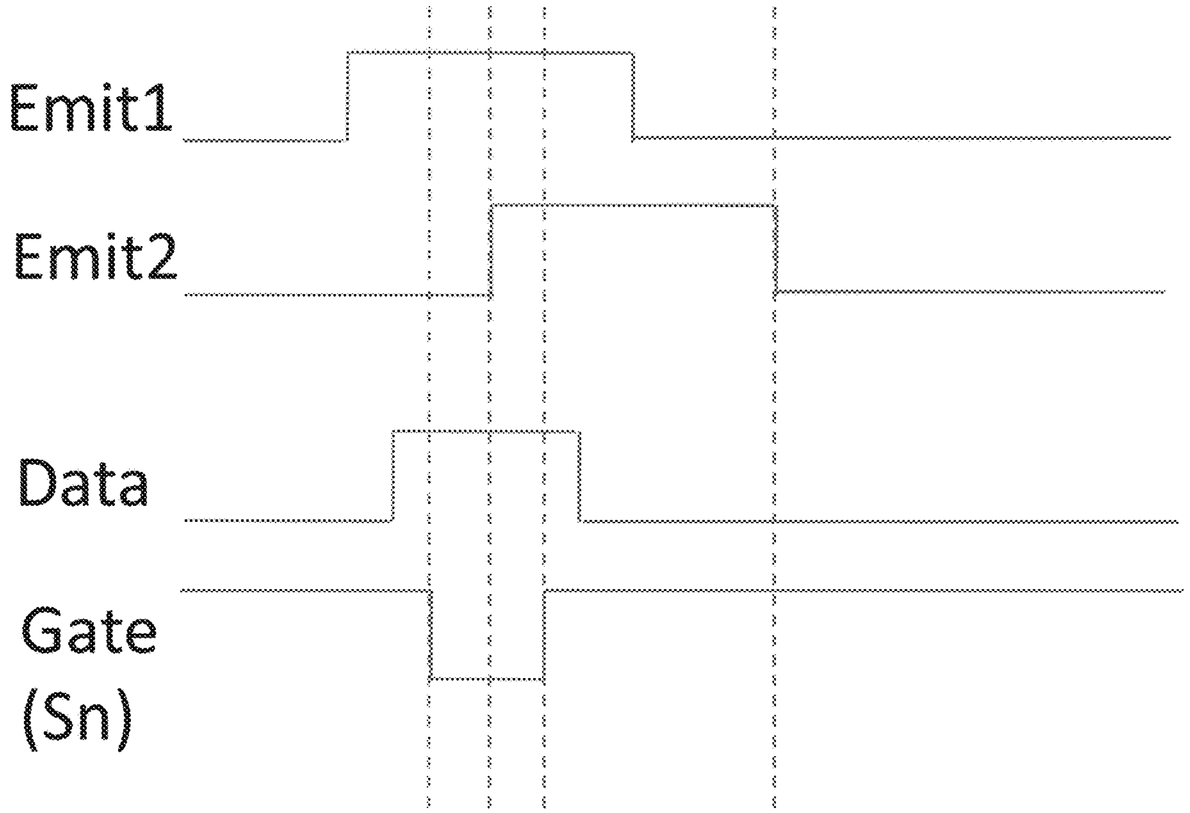
(PRIOR ART) FIG. 49B

FIG. 18 is a depiction of an example of dividing a 6×3 subpixel array into three subpixel groups in the scan direction in accordance with one embodiment set forth in the disclosure;

FIG. 19 is a circuit diagram illustrating a pixel circuit with a compensation circuit shared by three light emitting elements in the same column in accordance with one embodiment set forth in the disclosure;

FIG. 20 is a timing diagram of pixel circuits for driving the 6×3 subpixel array shown in FIG. 18 in accordance with one embodiment set forth in the disclosure;

FIG. 21 is a circuit diagram illustrating a light emitting circuit for providing light emitting signals for driving the 6×3 subpixel array shown in FIG. 18 in accordance with one embodiment set forth in the disclosure;

FIGS. 22A-22B are circuit diagrams illustrating various examples of a light emitting control circuit for providing light emitting control signals for driving the 6×3 subpixel array shown in FIG. 18 in accordance with various embodiments set forth in the disclosure;

FIG. 23 is another timing diagram of pixel circuits for driving the 6×3 subpixel array shown in FIG. 18 in accordance with one embodiment set forth in the disclosure;

FIG. 24 is a circuit diagram illustrating a gate scanning driver for providing scan signals for scanning the 6×3 subpixel array shown in FIG. 18 in accordance with one embodiment set forth in the disclosure;

FIG. 25 is still another timing diagram of pixel circuits for driving the 6×3 subpixel array shown in FIG. 18 in accordance with one embodiment set forth in the disclosure;

FIG. 26 is a depiction of an example of dividing a 6×3 subpixel array into six subpixel groups in the scan direction in accordance with one embodiment set forth in the disclosure;

FIG. 27 is a circuit diagram illustrating a pixel circuit with a compensation circuit shared by six light emitting elements in the same column in accordance with one embodiment set forth in the disclosure;

FIG. 28 is a timing diagram of pixel circuits for driving the 6×3 subpixel array shown in FIG. 26 in accordance with one embodiment set forth in the disclosure;

FIG. 29 is a circuit diagram illustrating a light emitting circuit for providing light emitting signals for driving the 6×3 subpixel array shown in FIG. 26 in accordance with one embodiment set forth in the disclosure;

FIGS. 30A-30B are circuit diagrams illustrating various examples of a light emitting control circuit for providing light emitting control signals for driving the 6×3 subpixel array shown in FIG. 26 in accordance with various embodiments set forth in the disclosure;

FIG. 31 is another timing diagram of pixel circuits for driving the 6×3 subpixel array shown in FIG. 26 in accordance with one embodiment set forth in the disclosure;

FIG. 32 is a circuit diagram illustrating a gate scanning driver for providing scan signals for scanning the 6×3 subpixel array shown in FIG. 26 in accordance with one embodiment set forth in the disclosure;

FIGS. 33A-33C are depictions of various examples of dividing a display frame into multiple sub-frames in the scan direction in accordance with various embodiments set forth in the disclosure;

FIGS. 34A-34C are depictions of various examples of dividing a 2×6 subpixel array into multiple subpixel groups in the data direction in accordance with various embodiments set forth in the disclosure;

FIG. 35 is a depiction of an example of dividing a display frame into four sub-frames in the scan and data directions in accordance with one embodiment set forth in the disclosure;

FIG. 36 is a depiction of dividing a 6×2 subpixel array into four subpixel groups in the scan and data directions in accordance with one embodiment set forth in the disclosure;

FIG. 37 is a circuit diagram illustrating a pixel circuit with a compensation circuit shared by four light emitting elements in a 2×2 subpixel block in accordance with one embodiment set forth in the disclosure;

FIG. 38 is a timing diagram of pixel circuits for driving the 6×2 subpixel array shown in FIG. 36 in accordance with one embodiment set forth in the disclosure;

FIG. 39 is a circuit diagram illustrating a light emitting circuit for providing light emitting signals for driving the 6×2 subpixel array shown in FIG. 36 in accordance with one embodiment set forth in the disclosure;

FIGS. 40A-40B are circuit diagrams illustrating various examples of a light emitting control circuit for providing light emitting control signals for driving the 6×2 subpixel array shown in FIG. 36 in accordance with various embodiments set forth in the disclosure;

FIG. 41 is another timing diagram of pixel circuits for driving the 6×2 subpixel array shown in FIG. 36 in accordance with one embodiment set forth in the disclosure;

FIG. 42 is a circuit diagram illustrating a gate scanning driver for providing scan signals for scanning the 6×2 subpixel array shown in FIG. 36 in accordance with one embodiment set forth in the disclosure;

FIG. 43 is a circuit diagram illustrating another example of a pixel circuit shared by two light emitting elements in accordance with one embodiment set forth in the disclosure;

FIG. 44 is a circuit diagram illustrating one example a pixel circuit with a compensation circuit shared by multiple light emitting elements in accordance with one embodiment set forth in the disclosure;

FIG. 45 is a circuit diagram illustrating another example of a pixel circuit with a compensation circuit shared by multiple light emitting elements in accordance with one embodiment set forth in the disclosure;

FIG. 46 is a flow chart of a method for driving a display having an array of subpixels in accordance with one embodiment set forth in the disclosure;

FIG. 47A-47B are circuit diagram and timing diagram, respectively, illustrating one example of a prior art pixel circuit with a compensation circuit for driving an AMOLED display;

FIG. 48A-48B are circuit diagram and timing diagram, respectively, illustrating another example of a prior art pixel circuit with a compensation circuit for driving an AMOLED display; and FIG. 49A-49B are circuit diagram and timing diagram, respectively, illustrating still another example of a prior art pixel circuit with a compensation circuit for driving an AMOLED display.

DETAILED DESCRIPTION

In the following detailed description, numerous specific details are set forth by way of examples in order to provide a thorough understanding of the relevant disclosures. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure.

Throughout the specification and claims, terms may have nuanced meanings suggested or implied in context beyond an explicitly stated meaning. Likewise, the phrase "in one embodiment/example" as used herein does not necessarily refer to the same embodiment and the phrase "in another embodiment/example" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

As will be disclosed in detail below, among other novel features, the novel display system and pixel circuit thereof disclosed in the present disclosure provide the ability to reduce the average number of transistors (e.g., TFTs) required for each light emitting element (e.g., OLED) while maintaining the same compensation effect for brightness uniformity of displays. For example, in this present disclosure, the array of light emitting elements can be divided into multiple groups, each of which emits lights in a respective sub-frame in one frame period; multiple light emitting elements from each group can thus share the same pixel circuit. The novel frame-division and pixel circuit-sharing scheme in the present disclosure is suitable for a variety of applications, including but not limited to, displays for virtual reality/augmented reality (VR/AR) devices and handheld devices. Compared with known solutions, the yield and display resolution/PPI can be increased by the novel frame-division and pixel circuit-sharing scheme in the present disclosure. Because the complexity of gate scanning driver and light emitting driver can be simplified and/or the number of wires connecting the gate scanning and light emitting drivers with the pixel circuits can be reduced, the display edges' area for handheld devices can also be reduced. In one embodiment of the present disclosure, the array of light emitting elements can be divided in the scan direction. In other words, each group of light emitting elements includes one or more rows of light emitting elements. As a result, the charging time for each light emitting element is not decreased compared with the known solutions.

Additional novel features will be set forth in part in the description which follows, and in part will become apparent to those skilled in the art upon examination of the following and the accompanying drawings or may be learned by production or operation of the examples. The novel features of the present disclosure may be realized and attained by practice or use of various aspects of the methodologies, instrumentalities, and combinations set forth in the detailed examples discussed below.

Figure 1:
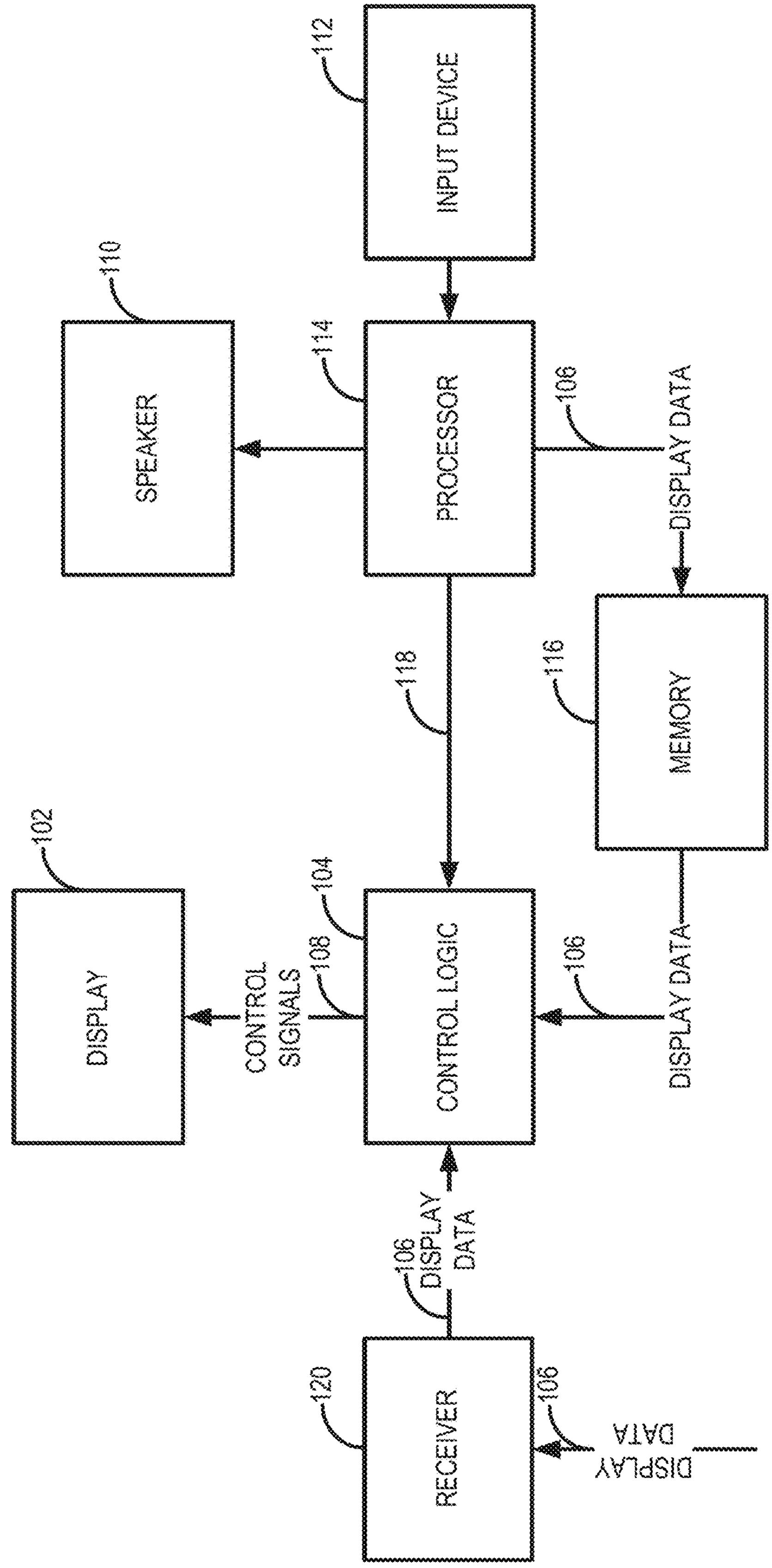
FIG. 1 is a block diagram illustrating an apparatus including a display and control logic in accordance with one embodiment set forth in the disclosure.

FIG. 1 illustrates an apparatus 100 including a display 102 and control logic 104. The apparatus 100 may be any suitable device, for example, a VR/AR device (e.g., VR headset, etc.), handheld device (e.g., dumb or smart phone, tablet, etc.), wearable device (e.g., eyeglasses, wrist watch, etc.), automobile control station, gaming console, television set, laptop computer, desktop computer, netbook computer, media center, set-top box, global positioning system (GPS), electronic billboard, electronic sign, printer, or any other suitable device. In this example, the display 102 is operatively coupled to the control logic 104 and is part of the apparatus 100, such as but not limited to, a head-mounted display, computer monitor, television screen, dashboard, electronic billboard, or electronic sign. The display 102 may be an OLED display, liquid crystal display (LCD), E-ink display, electroluminescent display (ELD), billboard display with LED or incandescent lamps, or any other suitable type of display.

The control logic 104 may be any suitable hardware, software, firmware, or combination thereof, configured to receive display data 106 and render the received display data 106 into control signals 108 for driving the subpixels on the display 102. The control signals 108 are used for controlling writing of data to the subpixels and directing operations of the display 102. For example, subpixel rendering algorithms for various subpixel arrangements may be part of the control logic 104 or implemented by the control logic 104. As described in detail below with respect to FIG. 6, the control logic 104 in one example may include a control signal generating module 602 having a timing controller (TCON) 608 and a clock generator 610, a data converting module 604 having a storing unit 612, and a data reconstructing unit 614, and a data interface 606. The control logic 104 may include any other suitable components, such as an encoder, a decoder, one or more processors, controllers, and storage devices. The control logic 104 may be implemented as a standalone integrated circuit (IC) chip, such as an application-specific integrated circuit (ASIC) or a field-programmable gate array (FPGA). The apparatus 100 may also include any other suitable component such as, but not limited to, a speaker 110 and an input device 112, e.g., a mouse, keyboard, remote controller, handwriting device, camera, microphone, scanner, etc.

In one example, the apparatus 100 may be a laptop or desktop computer having a display 102. In this example, the apparatus 100 also includes a processor 114 and memory 116. The processor 114 may be, for example, a graphic processor (e.g., GPU), a general processor (e.g., APU, accelerated processing unit; GPGPU, general-purpose computing on GPU), or any other suitable processor. The memory 116 may be, for example, a discrete frame buffer or a unified memory. The processor 114 is configured to generate display data 106 in display frames and temporally store the display data 106 in the memory 116 before sending it to the control logic 104. The processor 114 may also generate other data, such as but not limited to, control instructions 118 or test signals, and provide them to the control logic 104 directly or through the memory 116. The control logic 104 then receives the display data 106 from the memory 116 or from the processor 114 directly.

In another example, the apparatus 100 may be a television set having a display 102. In this example, the apparatus 100 also includes a receiver 120, such as but not limited to, an antenna, radio frequency receiver, digital signal tuner, digital display connectors, e.g., HDMI, DVI, DisplayPort (DP), USB, Bluetooth, WiFi receiver, or Ethernet port. The receiver 120 is configured to receive the display data 106 as an input of the apparatus 100 and provide the native or modulated display data 106 to the control logic 104.

In still another example, the apparatus 100 may be a handheld or VR/AR device, such as a smart phone, a tablet, or a VR headset. In this example, the apparatus 100 includes the processor 114, memory 116, and the receiver 120. The apparatus 100 may both generate display data 106 by its processor 114 and receive display data 106 through its receiver 120. For example, the apparatus 100 may be a handheld or VR/AR device that works as both a mobile television and a mobile computing device. In any event, the apparatus 100 at least includes the display 102 and control logic 104 as described below in detail.

Figure 2A:
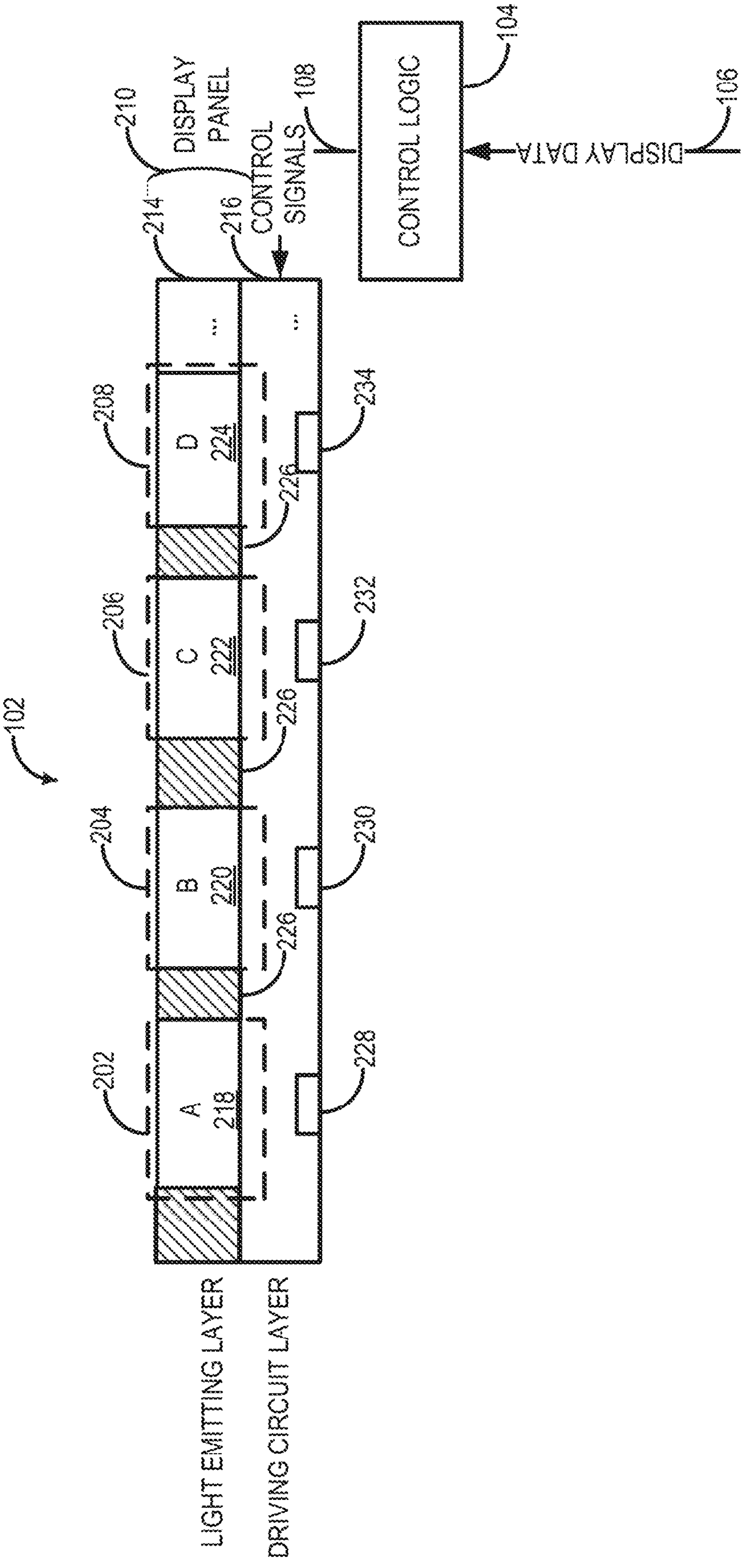
FIGS. 2A-2C are side-view diagrams illustrating various example of the display shown in FIG. 1 in accordance with various embodiments set forth in the disclosure.

FIG. 2A is a side-view diagram illustrating one example of a display 102 including a group of subpixels 202, 204, 206, 208. The display 102 may be any suitable type of display, for example, OLED displays, such as an AMOLED display, or any other suitable display. The display 102 may include a display panel 210 operatively coupled to the control logic 104. The example shown in FIG. 2A illustrates a side-by-side (a.k.a. lateral emitter) OLED color patterning architecture in which one color of light-emitting material is deposited through metal shadow mask while the other color areas are blocked by the mask.

In this example, the display panel 210 includes a light emitting layer 214 and a driving circuit layer 216. As shown in FIG. 2A, the light emitting layer 214 includes a plurality of light emitting elements (e.g., OLEDs in this example) 218, 220, 222, 224, corresponding to the plurality of subpixels 202, 204, 206, 208, respectively. A, B, C, and D in FIG. 2A denote OLEDs in different colors, such as but not limited to, red, green, blue, yellow, cyan, magenta, or white. The light emitting layer 214 also includes a black array 226 disposed between the OLEDs 218, 220, 222, 224, as shown in FIG. 2A. The black array 226, as the borders of the subpixels 202, 204, 206, 208, is used for blocking lights coming out from the parts outside the OLEDs 218, 220, 222, 224. Each OLED 218, 220, 222, 224 in the light emitting layer 214 can emit a light in a predetermined color and brightness.

In this example, the driving circuit layer 216 includes a plurality of pixel circuits 228, 230, 232, 234, each of which includes one or more thin film transistors (TFTs), corresponding to the plurality of OLEDs 218, 220, 222, 224 of the plurality of subpixels 202, 204, 206, 208, respectively. The pixel circuits 228, 230, 232, 234 may be individually addressed by the control signals 108 from the control logic 104 and configured to drive the corresponding subpixels 202, 204, 206, 208, by controlling the light emitting from the respective OLEDs 218, 220, 222, 224, according to the control signals 108. The driving circuit layer 216 may further include one or more drivers (not shown) formed on the same substrate as the pixel circuits 228, 230, 232, 234. The on-panel drivers may include circuits for controlling light emitting, gate scanning, and data writing as described below in detail. Scan lines and data lines are also formed in the driving circuit layer 216 for transmitting scan signals and data signals, respectively (as part of the control signals 108), from the drivers to each pixel circuit 228, 230, 232, 234. The display panel 210 may include any other suitable component, such as one or more glass substrates, polarization layers, or a touch panel (not shown) as known in the art. The pixel circuits 228, 230, 232, 234 and other components in the driving circuit layer 216 in this example are formed on a low temperature polycrystalline silicon (LTPS) layer deposited on a glass substrate, and the TFTs in each pixel circuit 228, 230, 232, 234 are p-type transistors (e.g., PMOS LTPS-TFTs). In some examples, the components in the driving circuit layer 216 may be formed on an amorphous silicon (a-Si) layer, and the TFTs in each pixel circuit may be n-type transistors (e.g., NMOS TFTs). In some examples, the TFTs in each pixel circuit may be organic TFTs (OTFT) or indium gallium zinc oxide (IGZO) TFTs.

As shown in FIG. 2A, each of the plurality of subpixels 202, 204, 206, 208 is formed by at least an OLED 218, 220, 222, 224 driven by a corresponding pixel circuit 228, 230, 232, 234. Each OLED may be formed by a sandwich structure of an anode, an organic light-emitting layer, and a cathode, as known in the art. Depending on the characteristics (e.g., material, structure, etc.) of the organic light-emitting layer of the respective OLED, a subpixel may present a distinct color and brightness. Each OLED 218, 220, 222, 224 in this example is a top-emitting OLED. In some examples, the OLED may be in a different configuration, such as a bottom-emitting OLED. In one example, one pixel may consist of three adjacent subpixels, such as subpixels in the three primary colors (red, green, and blue) to present a full color. In another example, one pixel may consist of four adjacent subpixels, such as subpixels in the three primary colors (red, green, and blue) and the white color. In still another example, one pixel may consist of two adjacent subpixels. For example, the subpixels A 202 and B 204 may constitute one pixel, and the subpixels C 206 and D 208 may constitute another pixel. Here, since the display data 106 is usually programmed at the pixel level, the two subpixels of each pixel or the multiple subpixels of several adjacent pixels may be addressed collectively by subpixel rendering to present the appropriate brightness and color of each pixel, as designated in the display data 106, with the help of subpixel rendering. However, it is understood that, in some examples, the display data 106 may be programmed at the subpixel level such that the display data 106 can directly address individual subpixel without the need of subpixel rendering. Because it usually requires three primary colors (red, green, and blue) to present a full color, specifically designed subpixel arrangements are provided for the display 102 in conjunction with subpixel rendering algorithms to achieve an appropriate apparent color resolution.

Figure 2B:
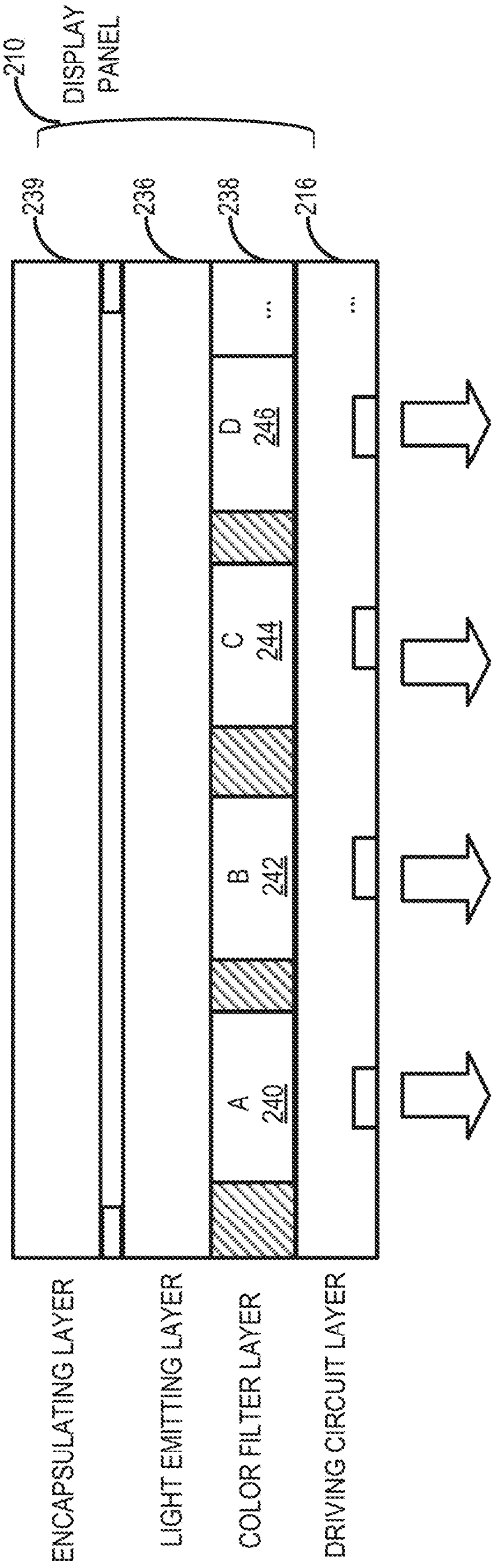

The example shown in FIG. 2A illustrates a side-by-side patterning architecture in which one color of light-emitting material is deposited through metal shadow mask while the other color areas are blocked by the mask. In another example, a white OLEDs with color filters (WOLED+CF) patterning architecture can be applied to the display panel 210. In the WOLED+CF architecture, a stack of light-emitting materials form a light emitting layer of white light. The color of each individual subpixel is defined by another layer of color filters in different colors. As the organic light-emitting materials do not need to be patterned through the metal shadow mask, the resolution and display size can be increased by the WOLED+CF patterning architecture. FIG. 2B illustrates an example of a WOLED+CF patterning architecture applied to the display panel 210. The display panel 210 in this example includes the driving circuit layer 216, a light emitting layer 236, a color filter layer 238, and an encapsulating layer 239. In this example, the light emitting layer 236 includes a stack of light emitting sub-layers and emits the white light. The color filter layer 238 may be comprised of a color filter on array having a plurality of color filters 240, 242, 244, 246 corresponding to the plurality of subpixels 202, 204, 206, 208, respectively. A, B, C, and D in FIG. 2B denote four different colors of filters, such as but not limited to, red, green, blue, yellow, cyan, magenta, or white. The color filters 240, 242, 244, 246 may be formed of a resin film in which dyes or pigments having the desired color are contained. Depending on the characteristics (e.g., color, thickness, etc.) of the respective color filter, a subpixel may present a distinct color and brightness. The encapsulating layer 239 may include an encapsulating glass substrate or a substrate fabricated by the thin film encapsulation (TFE) technology. The driving circuit layer 216 may be comprised of an array of pixel circuits including LTPS, IGZO, or OTFT transistors. The display panel 210 may include any other suitable component, such as polarization layers, or a touch panel (not shown) as known in the art.

Figure 2C:
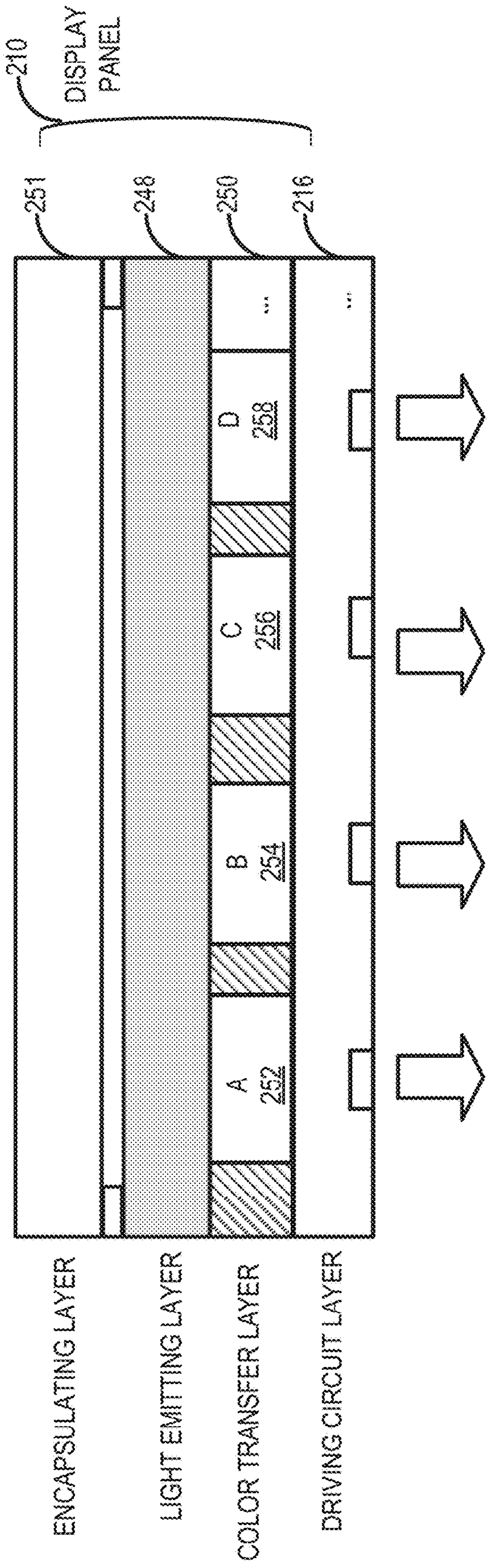

In still another example, a blue OLEDs with transfer color filters (BOLED+transfer CF) patterning architecture can be applied to the display panel 210 as well. In the BOLED+transfer CF architecture, a light-emitting material of blue light is deposited without a metal shadow mask, and the color of each individual subpixel is defined by another layer of transfer color filters for different colors. FIG. 2C illustrates an example of a BOLED+transfer CF patterning architecture applied to the display panel 210. The display panel 210 in this example includes the driving circuit layer 216, a light emitting layer 248, a color transfer layer 250, and an encapsulating layer 251. The light emitting layer 248 in this example emits the blue light and can be deposited without a metal shadow mask. It is understood that in other examples, the light emitting layer 248 may emit other colors of light. The color transfer layer 250 may be comprised of a transfer color filters on array having a plurality of transfer color filters 252, 254, 256, 258 corresponding to the plurality of subpixels 202, 204, 206, 208, respectively. A, B, C, and D in FIG. 2C denote four different colors of transfer color filters, such as but not limited to, red, green, blue, yellow, cyan, magenta, or white. Each type of transfer color filter may be formed of a color changing material. Depending on the characteristics (e.g., color, thickness, etc.) of the respective transfer color filter, a subpixel may present a distinct color and brightness. The encapsulating layer 251 may include an encapsulating glass substrate or a substrate fabricated by the TFE technology. The driving circuit layer 216 may be comprised of an array of pixel circuits including LTPS, IGZO, or OTFT transistors. The display panel 210 may include any other suitable component, such as polarization layers, or a touch panel (not shown) as known in the art.

The novel frame-division and pixel circuit-sharing scheme in the present disclosure is suitable for any known OLED patterning architectures, including but not limited to, the side-by-side, WOLED+CF, and BOLED+CCM patterning architectures as described above. Although FIGS. 2A-2C are illustrated as an OLED display, it is understood that it is provided for an exemplary purpose only and without limitations.

Traditionally, for OLED displays such as an AMOLED display, a gate driver, e.g., a gate driver on array (GOA), and a light emitting driver, e.g., an emission driver on array (EOA), are used to control each OLED to be charged and subsequently emit a light in each frame. For example, for a full high-definition (FHD) display with a resolution of 1920×1080 and a frame rate of 60 Hz, each frame is 16.7 ms and each scan is 8.7 μs. That is, in one frame, each OLED is first scanned and charged for 8.7 ns and then emits a light for the rest of the frame period until it is refreshed in the subsequent frame. Because the charging period (i.e., the scan period of 8.7 μs) is much shorter compared with the frame period (16.7 ms), each OLED can be considered emitting a light during the entire frame period in the traditional AMOLED display. However, in some emerging display applications, it may not be always necessary to turn on each subpixel during the whole frame period. For example, for certain VR displays (e.g., in the VR headsets), after being charged during the scan, each subpixel is only turned on to emit a light for 15% of the entire frame period. All the subpixels may be turned on during the same light emitting period or one after another in different display modes of the VR displays. Nevertheless, the light emitting time period is only a portion of the entire frame period. This so called "black frame insertion" (BFI) method has been used by VR displays to reduce motion blur.

The present disclosure recognizes that because each subpixel is not necessarily turned on during the entire frame period (e.g., because of BFI in VR displays), the array of subpixels on the display can be divided into groups of subpixels so that each group of subpixels can sequentially emit lights in a respective light emitting period with a frame period. That is, an entire frame period can include a number of light emitting periods, each of which can be used by one of a number of subpixels to emit a light. Thus, those subpixels can share the same pixel circuit to reduce the average transistor per subpixel and layout area. For example, for the VR displays in which the light emitting time period is 15% of the entire frame period, a maximum of six light emitting time periods can be included in one frame period and thus a maximum of six subpixels can share the same pixel circuit. In other words, each frame can be divided into sub-frames, and each group of subpixels sequentially emits lights in a respective sub-frame period within a frame period. The novel frame-division and pixel circuit-sharing scheme in the present disclosure is not only applicable to VR displays. Even for the traditional displays in which a longer light emitting period is desired to ensure the sufficient brightness of the display images, the novel frame-division and pixel circuit-sharing scheme in the present disclosure is also feasible. For example, the driving current for each OLED in an AMOLED display can be increased to compensate for the reduction of brightness due to the shorter light emitting period.

Figure 3A:
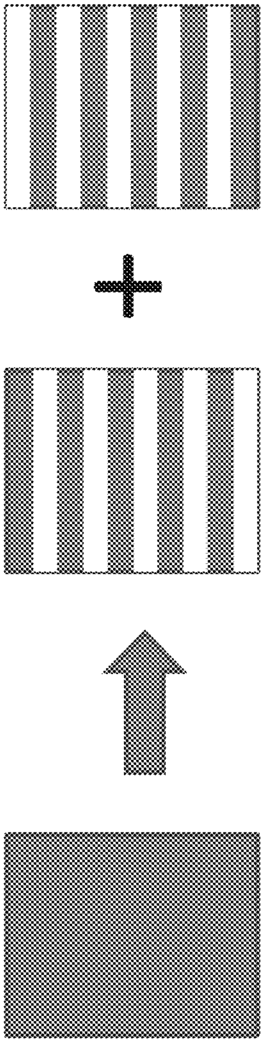
FIGS. 3A-3C are depictions of various examples of dividing an array of subpixels into groups of subpixels in accordance with various embodiments set forth in the disclosure.
Figure 3B:
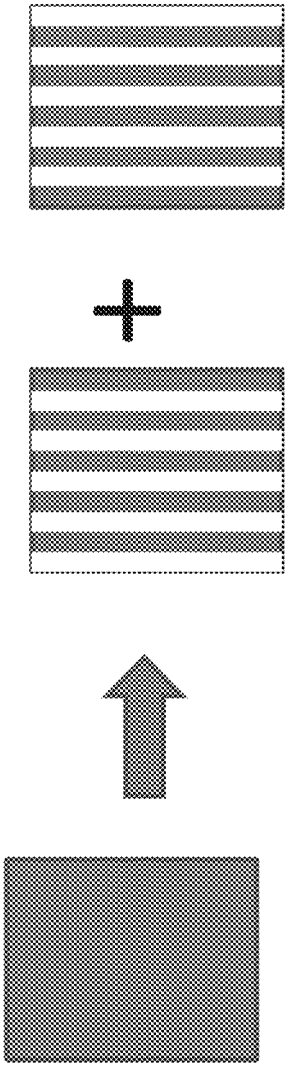
Figure 3C:
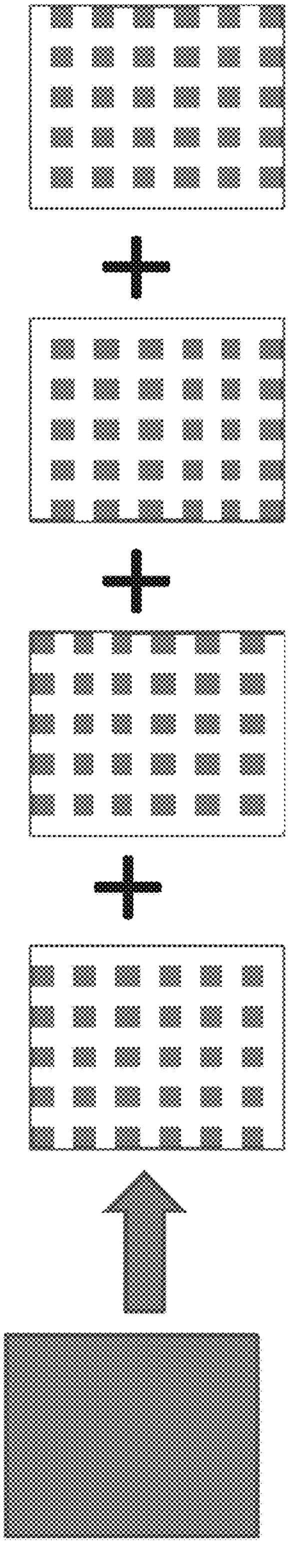

FIGS. 3A-3C are depictions of various examples of dividing an array of subpixels into groups of subpixels in accordance with various embodiments set forth in the disclosure. In FIG. 3A, a frame is divided into sub-frames in the scan direction (i.e., along the vertical direction of the display). In other words, an array of subpixels is divided into a plurality of groups of subpixels in the scan direction. Each group of subpixels includes one or more rows of subpixels. Although only two sub-frames (groups of subpixels) are shown in FIG. 3A, it is understood that the number of sub-frames (groups of subpixels) can be k, where k is an integer larger than 1, e.g., 2, 3, 4, 5, 6 . . . . In some examples, the array of subpixels may be evenly divided into k groups of subpixels in the scan direction (i.e., each group of subpixels has the same number of rows of subpixels). In those examples, k is the factor of the total number of rows of subpixels. In other examples, each group of subpixels may have different numbers of rows of subpixels so that k can be any integer larger than 1.

It is also understood that the manner in which the array of subpixels is divided into the groups of subpixels in the scan direction is not limited. In FIG. 3A, adjacent rows of subpixels are divided into different groups of subpixels. That is, one group of subpixels includes all the odd rows of subpixels, and the other group of subpixels includes all the even rows of subpixels. As a result, one subpixel from the first group of subpixels can share the same pixel circuit with another subpixel from the second group of subpixels. In some examples, the two subpixels sharing the same pixel circuit may be the subpixels having the minimum distance between each other in the two groups of subpixels in order to minimize the connection wires. For example, every two adjacent subpixels in the same column can share the same pixel circuit in the example shown in FIG. 3A. It is understood that for scan-direction-division, because subpixels in different rows may share the same pixel circuit, they can share the same scan line as well. Thus, the total number of scan lines can be reduced by the scan-direction-division. Furthermore, for scan-direction-division, the charging period for each subpixel is not reduced. In another example, for a display having N rows of subpixels, the first group of subpixels may include the top half of all rows of subpixels, i.e., 1st row to N/2th row, and the second group of subpixels may include the bottom half of all rows of subpixels, i.e., (N/2)+1th row to Nth row. As understood from the above-mentioned examples, the array of subpixels may be divided into groups of subpixels in the scan direction in various ways, as long as each group of subpixels includes one or more rows of subpixels. It is also understood that the array of subpixels is not physically divided, but is instead logically divided into groups of subpixels, so that each group of subpixels sequentially emits lights in a respective sub-frame period within a frame period as described below in detail.

In FIG. 3B, a frame is divided into sub-frames in the data direction (i.e., along the horizontal direction of the display). In other words, an array of subpixels is divided into a plurality of groups of subpixels in the data direction. Each group of subpixels includes one or more columns of subpixels. Although only two sub-frames (groups of subpixels) are shown in FIG. 3B, it is understood that the number of sub-frames (groups of subpixels) can be k, where k is an integer larger than 1, e.g., 2, 3, 4, 5, 6, . . . . In some examples, the array of subpixels are evenly divided into k groups of subpixels in the data direction (i.e., each group of subpixels has the same number of columns of subpixels). In those examples, k is the factor of the total number of columns of subpixels. In other examples, each group of subpixels may have different numbers of columns of subpixels, so that k can be any integer larger than 1.

It is also understood that the manner in which the array of subpixels is divided into the groups of subpixels in the data direction is not limited. In FIG. 3B, adjacent columns of subpixels are divided into different groups of subpixels. That is, one group of subpixels includes all the odd columns of subpixels, and the other group of subpixels includes all the even columns of subpixels. As a result, one subpixel from the first group of subpixel shares the same pixel circuit with one subpixel from the second group of subpixels. In some examples, the two subpixels sharing the same pixel circuit may be the subpixels having the minimum distance between each other in the two groups of subpixels in order to minimize the connection wires. For example, every two adjacent subpixels in the same row can share the same pixel circuit in the example shown in FIG. 3B. It is understood that for data-direction-division, because subpixels in different columns may share the same pixel circuit, they can share the same data line as well. Thus, the total number of data lines can be reduced by the data-direction-division. Furthermore, for data-direction-division, the charging period for each subpixel is reduced as well. In another example, for a display having M columns of subpixels, the first group of subpixels may include the left half of all columns of subpixels, i.e., 1st column to M/2th column, and the second group of subpixels may include the right half of all columns of subpixels, i.e., (M/2)+1th column to Mth column. As understood from the above-mentioned examples, the array of subpixels may be divided into groups of subpixels in the data direction in various ways, as long as each group of subpixels includes one or more columns of subpixels. It is also understood that the array of subpixels is not physically divided, but instead, is logically divided into groups of subpixels, so that each group of subpixels sequentially emits lights in a respective sub-frame period within a frame period as described below in detail.

In FIG. 3C, a frame is divided into sub-frames in both the scan direction and the data direction. In other words, an array of subpixels is divided into a plurality of groups of subpixels in the scan and data directions. Each group of subpixels includes a number of blocks of subpixels (e.g., a 2×2 subpixel block or a 2×3 subpixel block). In FIG. 3C, the array of subpixels is divided into four groups of subpixels, each of which includes a number of 2×2 subpixel blocks. The example in FIG. 3C is suitable for subpixel arrangements in which one pixel consists of two subpixels because of the layout uniformity. Although only four sub-frames (groups of subpixels) are shown in FIG. 3C, it is understood that the number of sub-frames (groups of subpixels) can be k, where k is an integer larger than 1, e.g., 2, 3, 4, 5, 6, . . . , and each sub-frame (group of subpixels) includes a number of p×q subpixel blocks. In another example, the array of subpixels may be divided into six groups of subpixels, each of which includes a number of 2×3 subpixel blocks. The division in the above example is suitable for real RGB displays in which one pixel consists of red, green, and blue subpixels because of the layout uniformity. In some examples, the array of subpixels is evenly divided into k groups of subpixels in the scan and data directions. In those examples, p is the factor of the total number of rows of subpixels, and q is the factor of the total number of columns of subpixels.

It is also understood that the manner in which the array of subpixels is divided into the groups of subpixels in the scan and data directions is not limited. In another example, each of four groups of subpixels may be a quadrant of the array of subpixels, i.e., the top-left quarter, top-right quarter, bottom-left quarter, or bottom-right quarter. As understood from the above-mentioned examples, the array of subpixels may be divided into groups of subpixels in the scan and data directions in various ways, as long as each group of subpixels includes one or more blocks of subpixels. It is also understood that the array of subpixels is not physically divided, but instead, is logically divided into groups of subpixels, so that each group of subpixels sequentially emits lights in a respective sub-frame period within a frame period as described below in detail.

Figure 4:
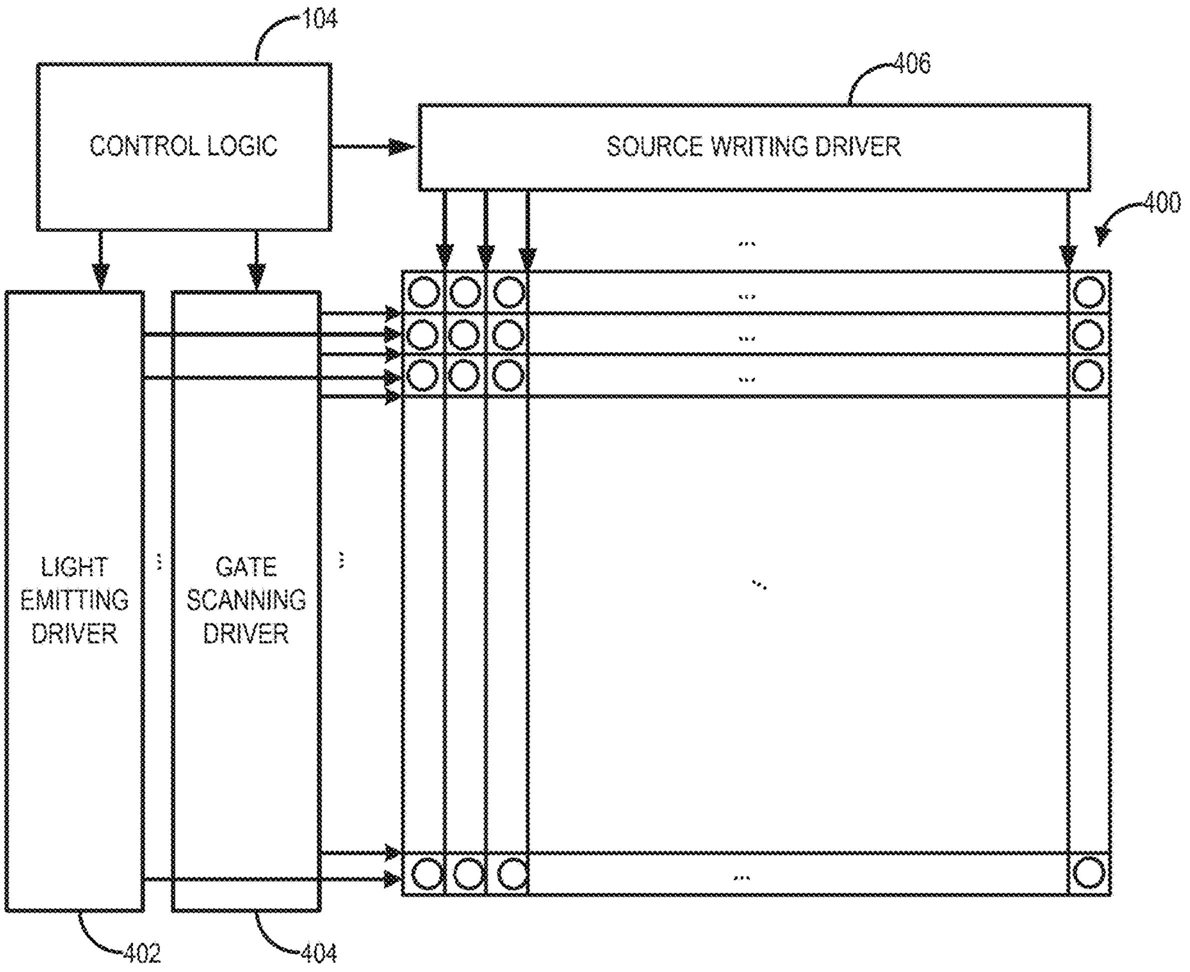
FIG. 4 is a plan-view diagram illustrating the display shown in FIG. 1 including multiple drivers in accordance with one embodiment set forth in the disclosure.

FIG. 4 is a plan-view diagram illustrating the display shown in FIG. 1 including multiple drivers in accordance with one embodiment set forth in the disclosure. The display panel 210 in this example includes an array of subpixels 400 (e.g., OLEDs), a plurality of pixel circuits (not shown), and multiple on-panel drivers including a light emitting driver 402, a gate scanning driver 404, and a source writing driver 406. The array of subpixels 400 may be divided into k groups of subpixels, where k is an integer larger than 1. As described above, the division may be made in the scan direction, data direction, or scan and data directions. The pixel circuits are operatively coupled to the array of subpixels 400 and the on-panel drivers 402, 404, and 406. Each pixel circuit may be shared by k subpixels from each of the k groups of subpixels. That is, each pixel circuit is configured to drive k corresponding subpixels. For example, if the array of subpixels 400 is divided into two groups of subpixels in the scan direction as shown in FIG. 3A, then each pixel circuit may be shared by two adjacent subpixels in the same column (one subpixel from the first group of subpixels having all odd rows of subpixels, and one subpixel from the second group of subpixels having all even rows of subpixels).

Figure 5:
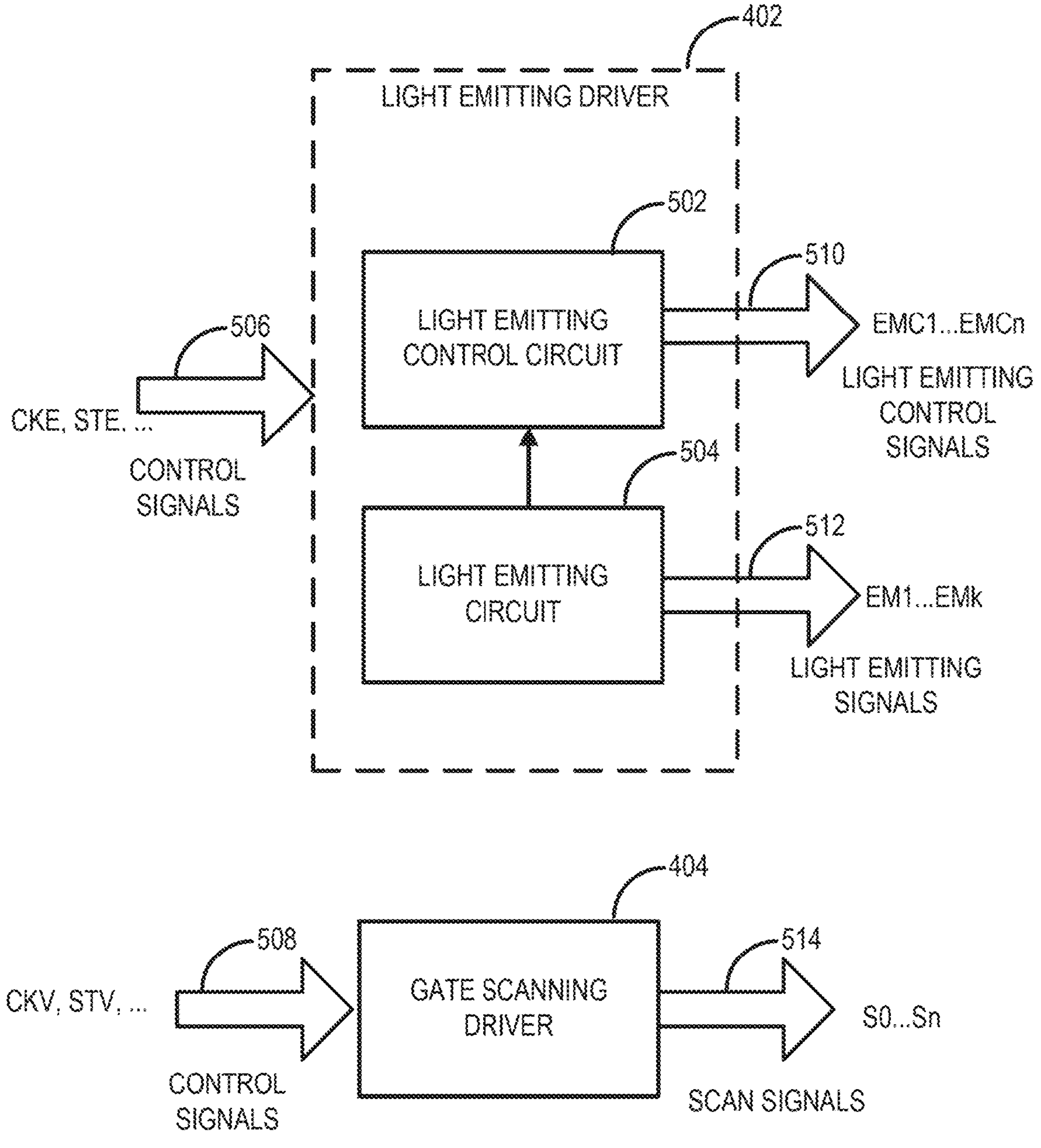
FIG. 5 is a block diagram illustrating the drivers shown in FIG. 4 in accordance with one embodiment set forth in the disclosure.

The light emitting driver 402 in this example is configured to cause each of the k groups of subpixels to sequentially emit lights in a respective one of k sub-frame periods within a frame period. Turning now to FIG. 5, in one example, the light emitting driver 402 receives control signals 506 (as part of the control signals 108) from the control logic 104 and provides a set of light emitting control signals 510 and a set of light emitting signals 512 to the pixel circuits of the array of subpixels 400. The control signals 506 may include one or more clock signals CKE and enable signals, such as the start emission STE signals. It is understood that although one light emitting driver 402 is illustrated in FIG. 4, in other examples, multiple light emitting drivers may work in conjunction with each other. The light emitting driver 402 in this example includes a light emitting control circuit 502 and a light emitting circuit 504, each of which may include one or more shift registers.

As described below in detail, the light emitting circuit 504 in this example is configured to provide k sets of light emitting signals EM1-EMk for the k groups of subpixels, respectively, to the plurality of pixel circuits. Each of the k sets of light emitting signals EM1-EMk causes the subpixels in the respective group of subpixels to emit lights in the respective sub-frame period within a frame period. In this example, the light emitting circuit 504 provides the light emitting signals 512 based on the clock signals CKE and a set of start emission signals STE. The light emitting control circuit 502 in this example is configured to provide one or more light emitting control signals EMC1-EMCn to the plurality of pixel circuits. Each of the light emitting control signals EMC1-EMCn controls each of the k subpixels sharing the same pixel circuit to sequentially emit a light in the sub-frame period within a frame period. In this example, the light emitting control circuit 502 provides the light emitting control signals 510 based on the clock signals CKE and another start emission signals STE. The STE signal for the light emitting control circuit 502 may be a logical disjunction of the set of STE signals for the light emitting circuit 504. In one example, for PMOS pixel circuits, each of the plurality of light emitting signals EM1-EMk is low during a respective one of the light emitting periods within a frame period, and the corresponding light emitting control signal EMCn is low in each of the light emitting periods within the frame period. In another example, for NMOS pixel circuits, each of the plurality of light emitting signals EM1-EMk is high during a respective one of the light emitting periods within a frame period, and the corresponding light emitting control signal EMCn is high in each of the light emitting periods within the frame period.

In some examples as described below in detail with respect to FIGS. 15B, 22B, 30B, and 40B, the light emitting control signals EMC1-EMCn may be provided by the light emitting control circuit 502 based on the light emitting signals EM1-EMk. In one example, for PMOS pixel circuits, the light emitting control circuit 502 may include AND gates, each of which provides one of the light emitting control signals EMC1-EMCn based on two or more of the light emitting signals EM1-EMk depending on the frame-division manner. In another example, for NMOS pixel circuits, the light emitting control circuit 502 may include OR gates, each of which provides one of the light emitting control signals EMC1-EMCn based on two or more of the light emitting signals EM1-EMk depending on the frame-division manner.

Returning to FIG. 4, the gate scanning driver 404 in this example applies a plurality of scan signals, which are generated based on the control signals from the control logic 104, to the scan lines (a.k.a. gate lines) for each row of subpixels in the array of subpixels 400 in a sequence. For example, as shown in FIG. 5, the gate scanning driver 404 receives control signals 508 (as part of the control signals 108) from the control logic 104 and provides a set of scan signals 514 to the pixel circuits of the array of subpixels 400. The control signals 508 may include one or more clock signals CKV and enable signals, such as start vertical STV signals. As described below in detail, the scan signals S0-Sn are applied to the gate electrode of a switching transistor of each pixel circuit during the scan/charging period in each frame period to turn on the switching transistor so that the data signal for the corresponding subpixel can be written by the source writing driver 406. In one example, each of the scan signals S0-Sn causes each of the k subpixels sharing the same pixel circuit to be sequentially charged in the respective sub-frame period within a frame period. As mentioned above, for scan-direction-division or scan/data-direction-division of the array of subpixels 400, multiple rows of subpixels may share the same scan line, and thus, the total number of scan lines is less than the total number of rows of subpixels. It is understood that although one gate scanning driver 404 is illustrated in FIG. 4, in other examples, multiple gate scanning drivers may work in conjunction with each other to scan the array of subpixels 400.

The source writing driver 406 in this example is configured to write display data received from the control logic 104 into the array of subpixels 400 in each frame. For example, the source writing driver 406 may simultaneously apply data signals to data lines (a.k.a. source lines) for each column of subpixels. That is, the source writing driver 406 may include one or more shift registers, digital-analog converter (DAC), multiplexers (MUX), and arithmetic circuit for controlling a timing of application of voltage to the source electrode of the switching transistor of each pixel circuit (i.e., during the scan/charging period in each frame period) and a magnitude of the applied voltage according to gradations of the display data. As each frame is divided into sub-frames, and groups of subpixels sequentially emit lights in the respective sub-frame period in a frame period, the original (native) display data 106 received from the processor 114 or receiver 120 may not be used directly by the source writing driver 406. In one example, the control logic 104 may convert the original display data 106 into converted display data based on a manner in which the array of subpixels 400 is divided into the k groups of subpixels (e.g., a sequence in which each row of subpixels is scanned within the frame period), such that the source writing driver 406 writes the converted display data into the array of subpixels 400. As described above, for data-direction-division or scan/data-direction division of the array of subpixels 400, multiple columns of subpixels may share the same data line, and thus, the total number of data lines is less than the total number of columns of subpixels. It is understood that although one source writing driver 406 is illustrated in FIG. 4, in other examples, multiple source writing drivers may work in conjunction with each other to apply the data signals to the data lines for each column of subpixels.

Figure 6:
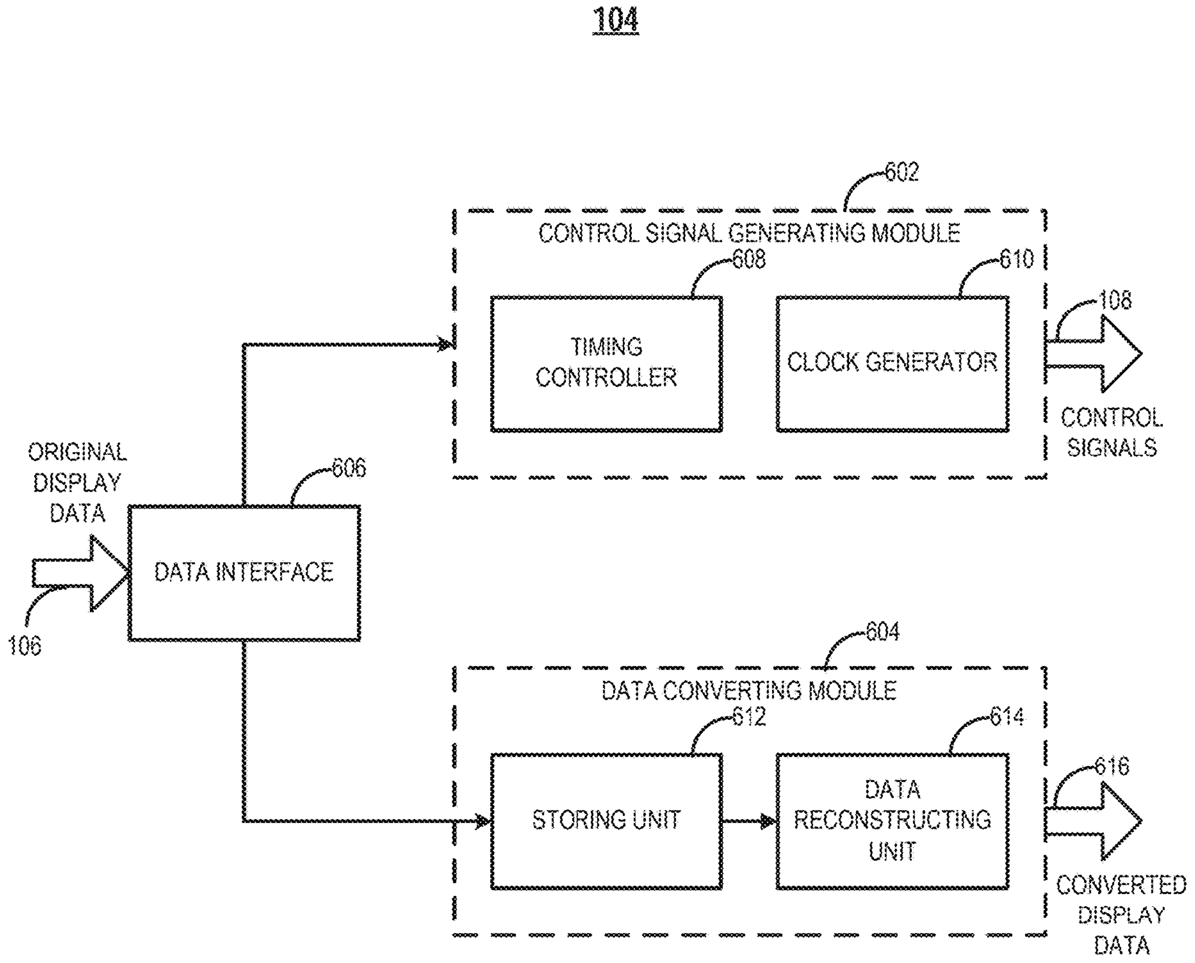
FIG. 6 is a block diagram illustrating one example of the control logic shown in FIG. 1 in accordance with one embodiment set forth in the disclosure.

FIG. 6 is a block diagram illustrating one example of the control logic shown in FIG. 1 in accordance with one embodiment set forth in the disclosure. In this example, the control logic 104 is an integrated circuit (but may alternatively include a state machine made of discrete logic and other components), which provides an interface function between the processor 114/memory 116 and the display 102. The control logic 104 may provide various control signals 108 with suitable voltage, current, timing, and de-multiplexing, to make the display 102 to show the desired text or image. The control logic 104 may be an application-specific microcontroller and may include storage units such as RAM, flash memory, EEPROM, and/or ROM, which may store, for example, firmware and display fonts. In this example, the control logic 104 includes a control signal generating module 602, a data converting module 604, and a data interface 606. The data interface 606 may be any serial or parallel interface, such as but not limited to, TTL, CMOS, RS-232, SPI, $I^2C$, MIMP, eDP, I80/M68 series MCU interface, etc. The data interface 606 is configured to receive the original display data 106 in multiple frames and any other control instructions 118 or test signals. The original display data 106 may be received in consecutive frames at any frame rate used in the art, such as 30, 60, or 72 Hz. The received original display data 106 is forwarded by the data interface 606 to the control signal generating module 602 and data converting module 604.

In this example, the control signal generating module 602 provides the control signals 108 to the on-panel drivers 402, 404, 406. The control signals 108 control the on-panel drivers 402, 404, 406 to cause each group of subpixels to sequentially emit lights in the respective sub-frame periods within a frame period. The control signal generating module 602 may include a TCON 608 and a clock generator 610. The TCON 608 may provide a variety of enable signals, including but not limited to, the STE and STV signals to the light emitting driver 402 and gate scanning driver 404, respectively. The clock generator 610 may provide a variety of clock signals, including but not limited to, the CKE and CKV signals to the light emitting driver 402 and gate scanning driver 404, respectively. As described above, the control signal generating module 602 may provide a first set of control signals 506, including the CKE and STE signals, to the light emitting driver 402 to control the light emitting driver 402. The control signal generating module 602 may also provide a second set of control signals 508, including the CKV and STV signals, to the gate scanning driver 404 to control the gate scanning driver 404. The details of the timing of each control signal 108 provided by the control signal generating module 602 are described below in accordance with various embodiments of the present disclosure.

In this example, the data converting module 604 provides converted display data 616 to the source writing driver 406. The data converting module 604 is configured to convert the original display data 106 into the converted display data 616 based on a manner in which the array of subpixels 400 is divided into the groups of subpixels. The original display data in one frame includes a plurality of data signals to be transmitted to each column of subpixels via a corresponding data line. The timing of each data signal is arranged according to the sequence of scanning each subpixel in the corresponding column. For example, the first level of an original data signal 106 represents the data to be written to the subpixel in the first row, the second level of the original data signal 106 represents the data to be written to the subpixel in the second row, and so on and so forth. In the present disclosure, as the array of subpixels is divided into groups of subpixels, each of which emit lights in a respective sub-frame in a frame period, the sequence of scanning the rows of subpixels is changed accordingly. In the example shown in FIG. 3A, the sequence of scanning the rows of subpixels is no longer following the pattern of 1st row, 2nd row, 3rd row, 4th row, 5th row, . . . , Nth row. Instead, the scanning sequence becomes 1st row, 3rd row, 5th row, . . . , (N−1)th row, 2nd row, 4th row, 6th row, . . . , Nth row. Accordingly, the timing of each data signal is re-arranged in the converted display data 616 according to the new scanning sequence determined based on the manner of division.

The data converting module 604 in this example includes a storing unit 612 and a data reconstructing unit 614. The storing unit 612 is configured to receive the original display data 106 and store the original display data 106 in each frame because the conversion of display data is performed at the frame level. The storing unit 612 may be data latches that temporally store the original display data 106 forwarded by the data interface 606. The data reconstructing unit 614 is operatively coupled to the storing unit 612 and configured to reconstruct, in each frame, the original display data 106 into the corresponding converted display data 616 based on the sequence in which the groups of subpixels emit lights within the frame period. For scan-direction-division, the sequence corresponds to the scanning sequence of the rows of subpixels. It is understood that in some examples, the data converting module 604 may not be included in the control logic 104. Instead, the processor 114 may adjust the timing of the original display data 106 by itself to accommodate the change of scanning sequence caused by the frame division.

Figure 7:
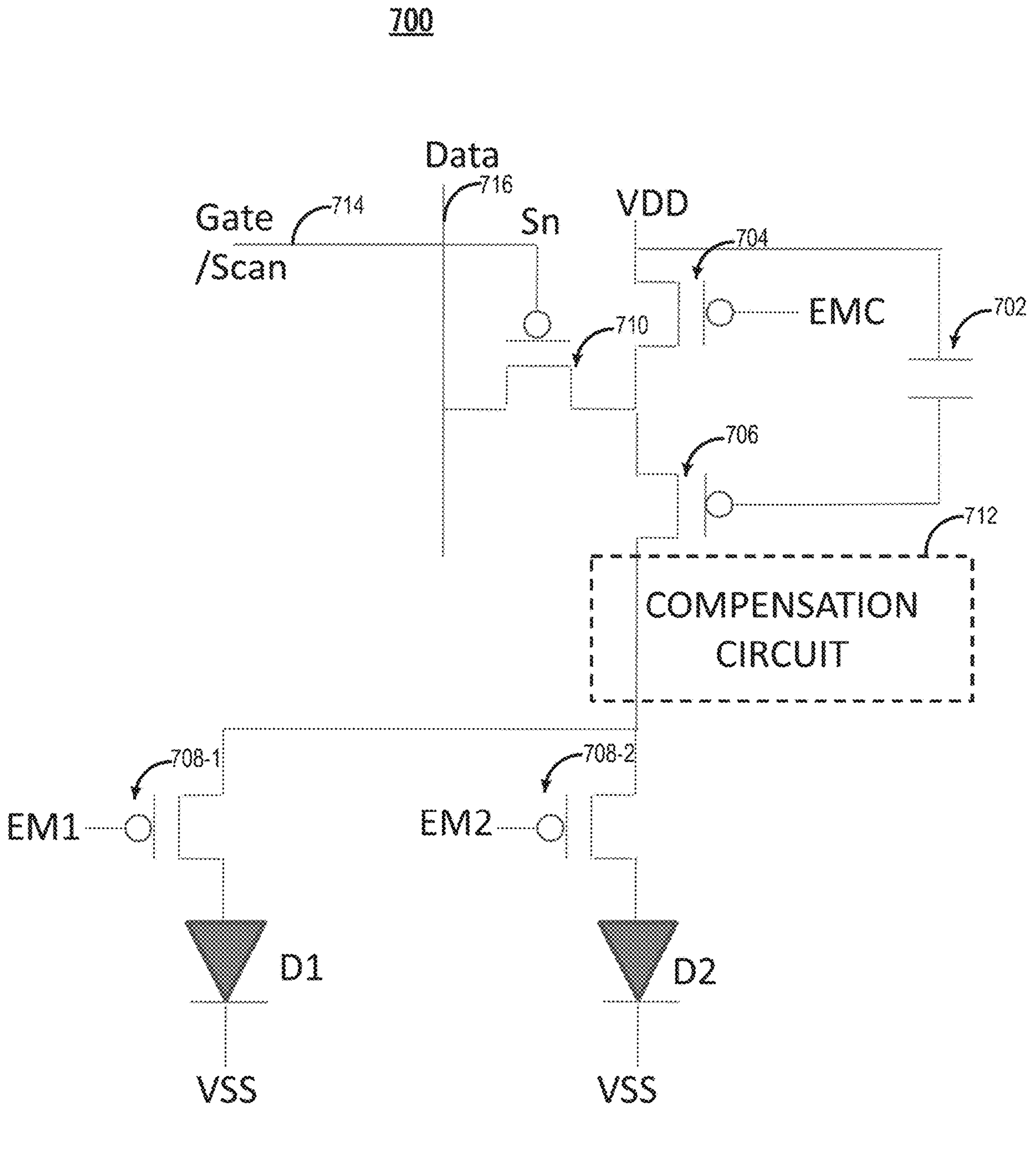
FIG. 7 is a circuit diagram illustrating one example of a pixel circuit shared by two light emitting elements in accordance with one embodiment set forth in the disclosure.

FIG. 7 is a circuit diagram illustrating one example of a pixel circuit shared by two light emitting elements in accordance with one embodiment set forth in the disclosure. The pixel circuit 700 in this example is shared by two light emitting elements D1, D2 representing two subpixels from different groups of subpixels. The pixel circuit 700 in this example includes a storage capacitor 702, a light emitting control transistor 704, a driving transistor 706, two light emitting transistors 708-1, 708-2, and a switching transistor 710. The light emitting elements D1, D2 may be OLEDs, such as top-emitting OLEDs, and each transistor may be a p-type transistor, such as a PMOS TFT. The pixel circuit 700 may be operatively coupled to the gate scanning driver 404 via a scan line 714 and the source writing driver 406 via a data line 716. Additionally or optionally, a compensation circuit 712 may be included in the pixel circuit 700 to ensure the brightness uniformities between the light emitting elements D1, D2. The compensation circuit 712 can be in any configurations as known in the art, which includes one or more transistors and capacitors. The pixel circuit 700 is suitable for any configuration of the direct-charging type of pixel circuits because in the pixel circuit 700 the data signal is directly applied to the driving transistor 706 when the switching transistor 710 is turned on during the charging period.

In this example, the light emitting control transistor 704 includes a gate electrode operatively coupled to a light emitting control signal EMC, a source electrode operatively coupled to a supply voltage Vdd, and a drain electrode. The light emitting control signal EMC may be provided by the light emitting control circuit 502 of the light emitting driver 402. The light emitting control signal EMC in this example turns on the light emitting control transistor 704 during each of the two light emitting periods for the two light emitting elements D1, D2 within a frame period. The driving transistor 706 includes a gate electrode operatively coupled to one electrode of the storage capacitor 702, a source electrode operatively coupled to the drain electrode of the light emitting control transistor 704, and a drain electrode. In each light emitting period (i.e., when the light emitting control transistor 704 is turned on), the driving transistor 706 provides a driving current to one of the light emitting elements D1, D2 at a level determined based on the voltage level currently at the storage capacitor 702.

Each of the light emitting transistors 708-1, 708-2 includes a gate electrode operatively coupled to a respective light emitting signal EM1, EM2, a source electrode operatively coupled to the drain electrode of the driving transistor 706, and a drain electrode operatively coupled to the respective light emitting element D1, D2. It is understood that in the examples in which the compensation circuit 712 is included in the pixel circuit 700, the source electrode of a light emitting transistor 708-1, 708-2 may not directly connect to the drain electrode of the driving transistor 706. In any event, during a light emitting period (i.e., when the light emitting control transistor 704 is turned on), a driving current path is formed through the supply voltage Vdd, light emitting control transistor 704, driving transistor 706, one of the light emitting transistors 708-1, 708-2, and one of the light emitting elements D1, D2. Each light emitting signal EM1, EM2 turns on the respective light emitting transistor 708-1, 708-2 during a respective one of the two light emitting periods within a frame period to cause the respective light emitting element D1, D2 to emit a light.

In this example, the switching transistor 710 includes a gate electrode operatively coupled to the scan line 714 transmitting a scan signal, a source electrode operatively coupled to the data line 716 transmitting a data signal, and a drain electrode. The scan signal may turn on the switching transistor 710 during each of the two charging periods within a frame period to cause the storage capacitor 702 to be charged at a respective level in the data signal for the respective light emitting element D1, D2. As described above, the timing of the display data has been re-arranged in the converted display data to accommodate the novel frame-division and pixel circuit-sharing scheme in the present disclosure. In this example, the storage capacitor 702 is charged twice in one frame period for the two light emitting elements D1, D2, respectively. During each charging period, the light emitting control signal EMC turns off the light emitting control transistor 704 to block the supply voltage Vdd.

Figure 8:
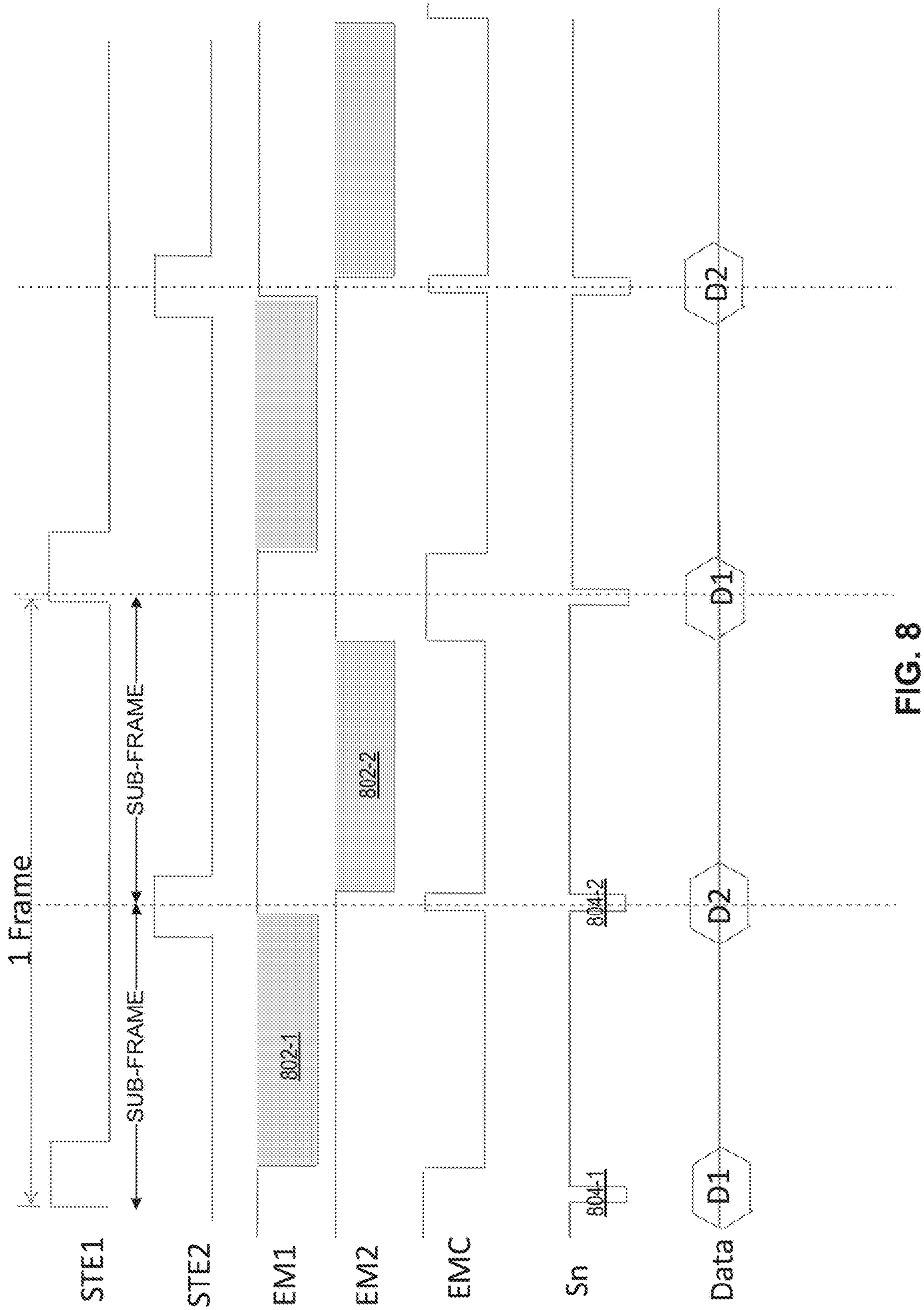
FIG. 8 is a timing diagram of the pixel circuit shown in FIG. 7 in accordance with one embodiment set forth in the disclosure.

FIG. 8 is a timing diagram of the pixel circuit shown in FIG. 7 in accordance with one embodiment set forth in the disclosure. In this example, a frame period is divided into two sub-frames for each of the two light emitting elements D1, D2. The light emitting control signal EMC turns on the light emitting control transistor 704 in each of the two sub-frames (i.e., the light emitting control transistor 704 is turned on twice in the frame period). Accordingly, the first light emitting signal EM1 turns on the first light emitting transistor 708-1 during the first light emitting period 802-1 in the first sub-frame, and the second light emitting signal EM2 turns on the second light emitting transistor 708-2 during the second light emitting period 802-2 in the second sub-frame. That is, the timings of the light emitting control signal EMC and the two light emitting signals EM1, EM2 are designed to coordinate with each other to create the two subsequent light emitting periods 802-1, 802-2 within one frame period.

In FIG. 8, the scan signal Sn turns on the switching transistor 710 to charge the storage capacitor 702 with the data signal Data in each of the two sub-frames (i.e., the storage capacitor 702 is charged twice in the frame period) before the light emitting control signal EMC turns on the light emitting control transistor 704. That is, the scan signal Sn creates two charging periods 804-1, 804-2 in one frame period for the two light emitting elements D1, D2, respectively. During the first charging period 804-1, the storage capacitor 702 is charged with the data signal Data at the level for the first light emitting element D1. Then, during the first light emitting period 802-1, the first light emitting element D1 emits a light at a brightness level determined based on the charged voltage level of the storage capacitor 702. At the second light emitting period 804-2, the storage capacitor 702 is charged with the data signal Data at the level for the second light emitting element D2. Then, during the second light emitting period 802-2, the second light emitting element D2 emits a light at a brightness level determined based on the charged voltage level of the storage capacitor 702. In this example, the light emitting control signal EMC turns off the light emitting control transistor 704 during the charging periods 804-1, 804-2.

Figure 9:
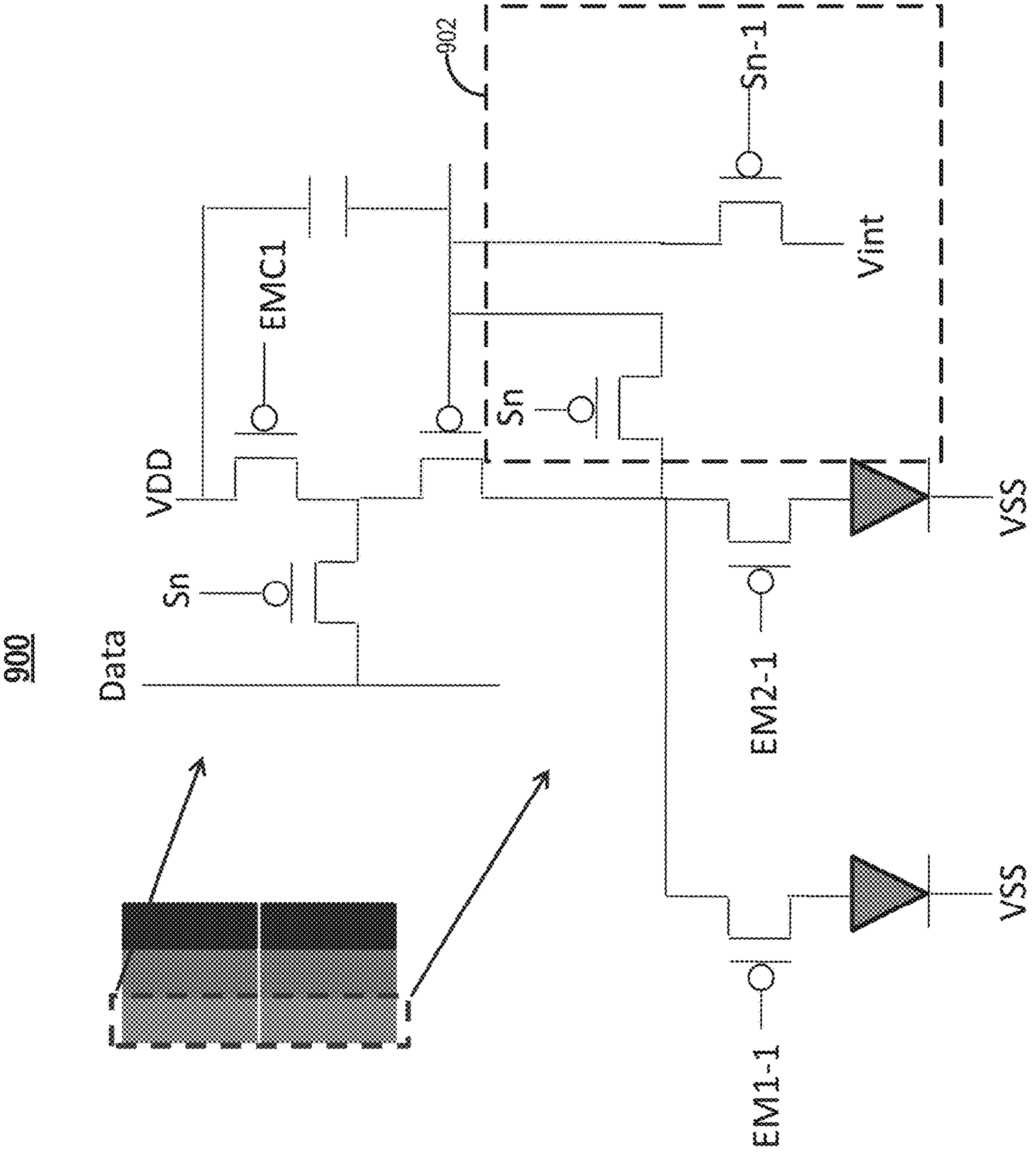
FIG. 9 is a circuit diagram illustrating a pixel circuit with a compensation circuit shared by two light emitting elements in the same column in accordance with one embodiment set forth in the disclosure.
Figure 10:
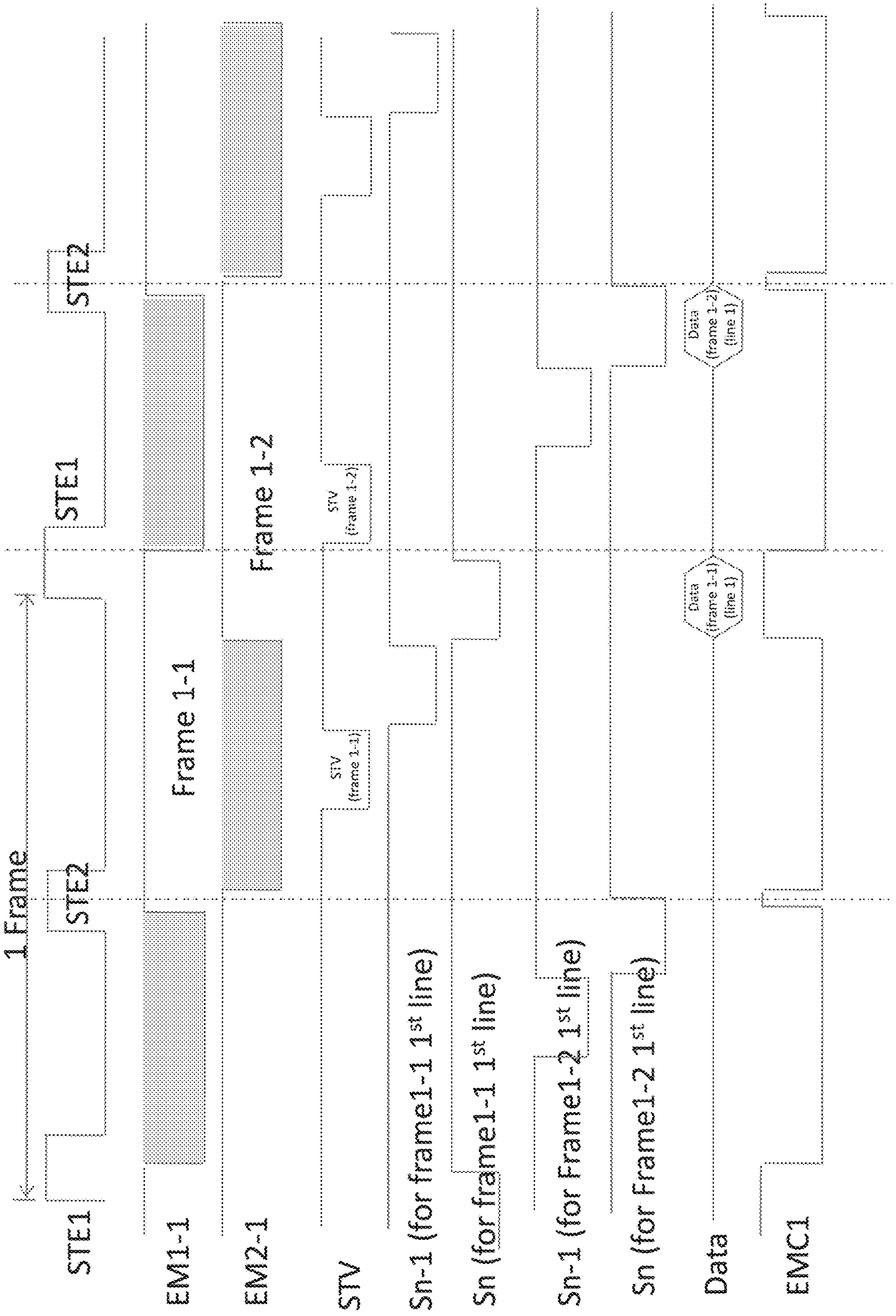
FIG. 10 is a timing diagram of the pixel circuit shown in FIG. 9 in accordance with one embodiment set forth in the disclosure.

FIG. 9 and FIG. 10 are a circuit diagram and a timing diagram, respectively, of a pixel circuit with a compensation circuit shared by two light emitting elements in the same column in accordance with one embodiment set forth in the disclosure. Compared with the exemplary direct-charging type pixel circuit 700 shown in FIG. 7, additional transistors and control signals (e.g., the reset signal Sn-1) are added to the pixel circuit 900 to form a compensation circuit 902, which eliminates the effect of non-uniformity of the mobility and threshold voltage Vth of the driving transistor. The two light emitting elements in this example may be adjacent OLEDs in the same column when the array of OLEDs is divided in the scan direction. In the pixel circuit 900, seven transistors and one capacitor (7T1C) are used for driving two subpixels. The average number of transistors per subpixel in the direct-charging type pixel circuit 900 is reduced compared with the known solution, e.g., the direct-charging type pixel circuit 4700. As a result, the layout area of the direct-charging type pixel circuit 900 is about half of the layout area of the direct-charging type pixel circuit 4700 for driving the same number of subpixels.

Figure 11:
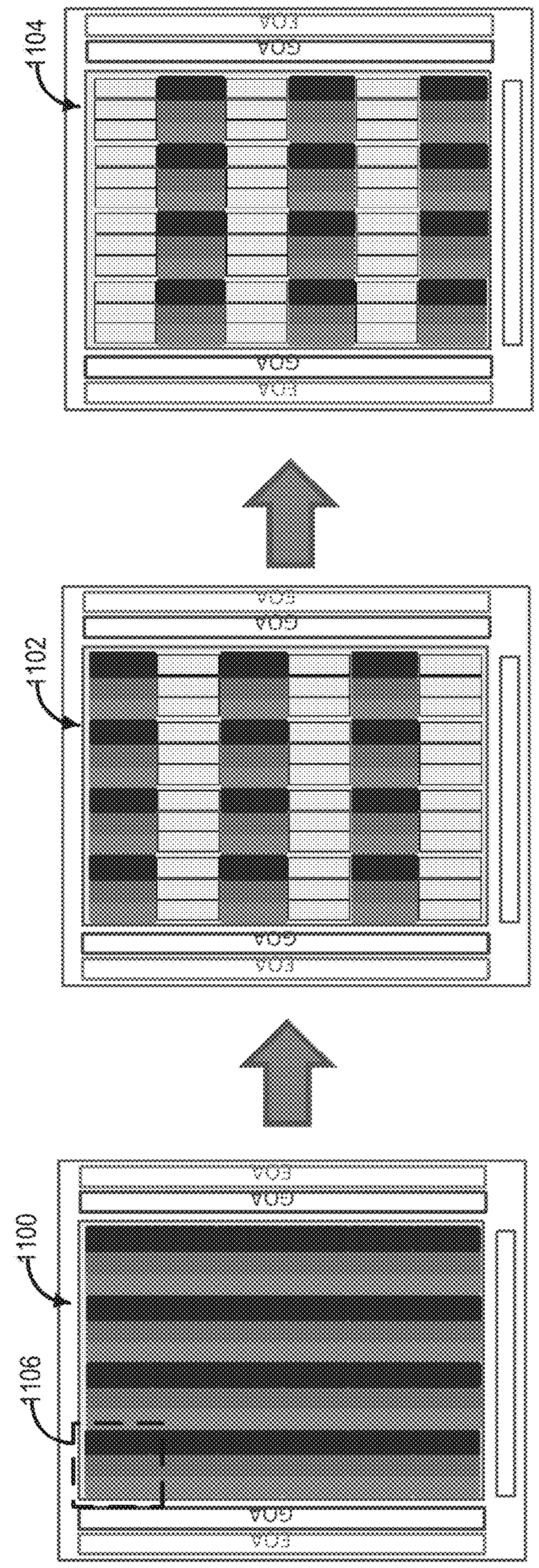
FIG. 11 is a depiction of an example of dividing a display frame into two sub-frames in the scan direction in accordance with one embodiment set forth in the disclosure.

FIG. 11 is a depiction of an example of dividing a display frame into two sub-frames in the scan direction in accordance with one embodiment set forth in the disclosure. In this example, a display frame 1100 having a resolution of 6×4 pixels is evenly divided into a first sub-frame 1102 and a second sub-frame 1104 in the scan direction. Each sub-frame period is one half of a frame period. In this example, each pixel 1106 consists of three adjacent subpixels in the same row (e.g., R, G, and B subpixels), each of which is a light emitting element. That is, a 6×12 array of subpixels is divided into two groups of subpixels in the scan direction. The first group of subpixels includes one half of the 6×12 subpixels, i.e., subpixels in the first, third, and fifth rows, and the second group of subpixels includes the other half of the 6×12 subpixels, i.e., subpixels in the second, fourth, and sixth rows. Taking the first column of pixels on the display frame 1100 as an example shown in FIG. 12, a 6×3 subpixel array is divided into two subpixel groups in the scan direction.

Figure 12:
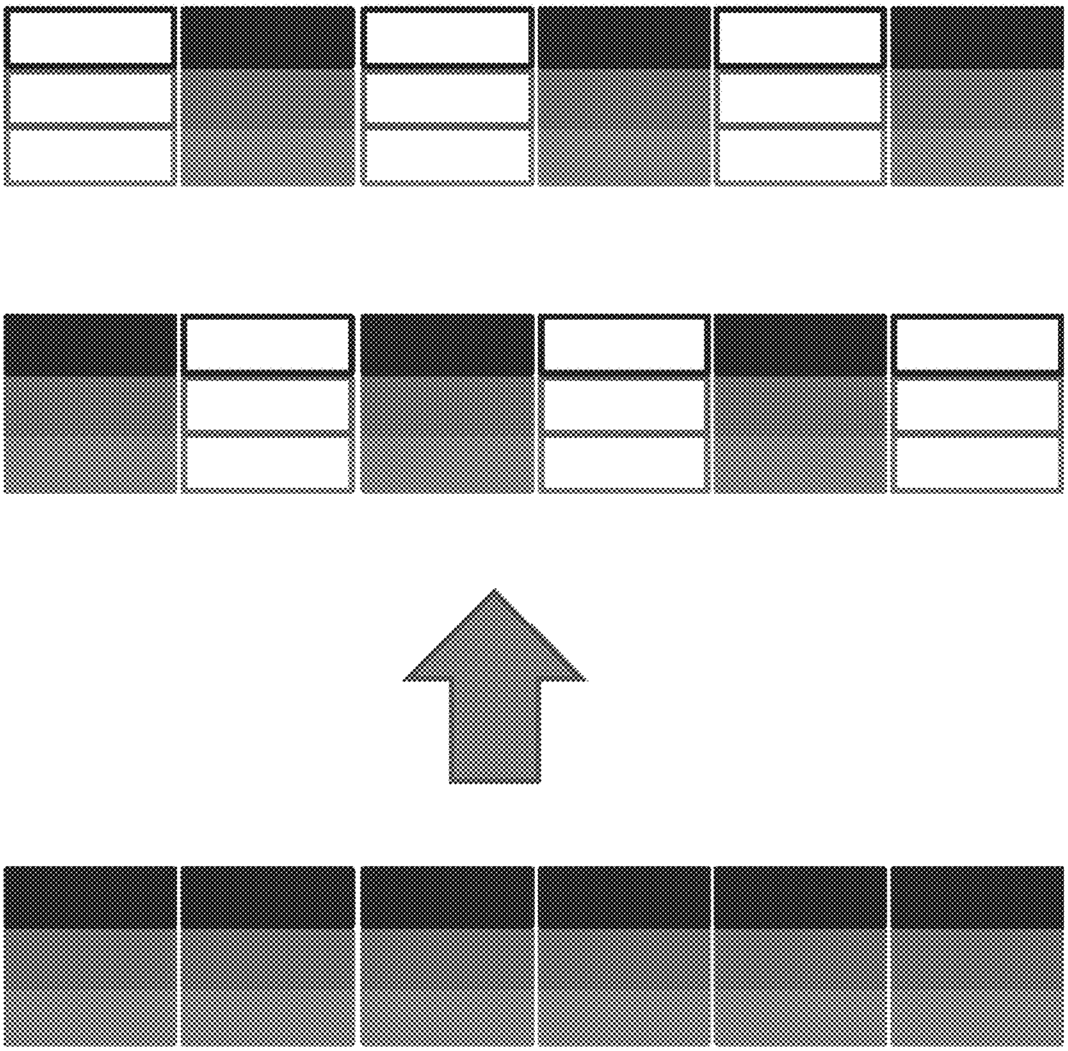
FIG. 12 is a depiction of an example of dividing a 6×3 subpixel array into two subpixel groups in the scan direction in accordance with one embodiment set forth in the disclosure.
Figure 13:
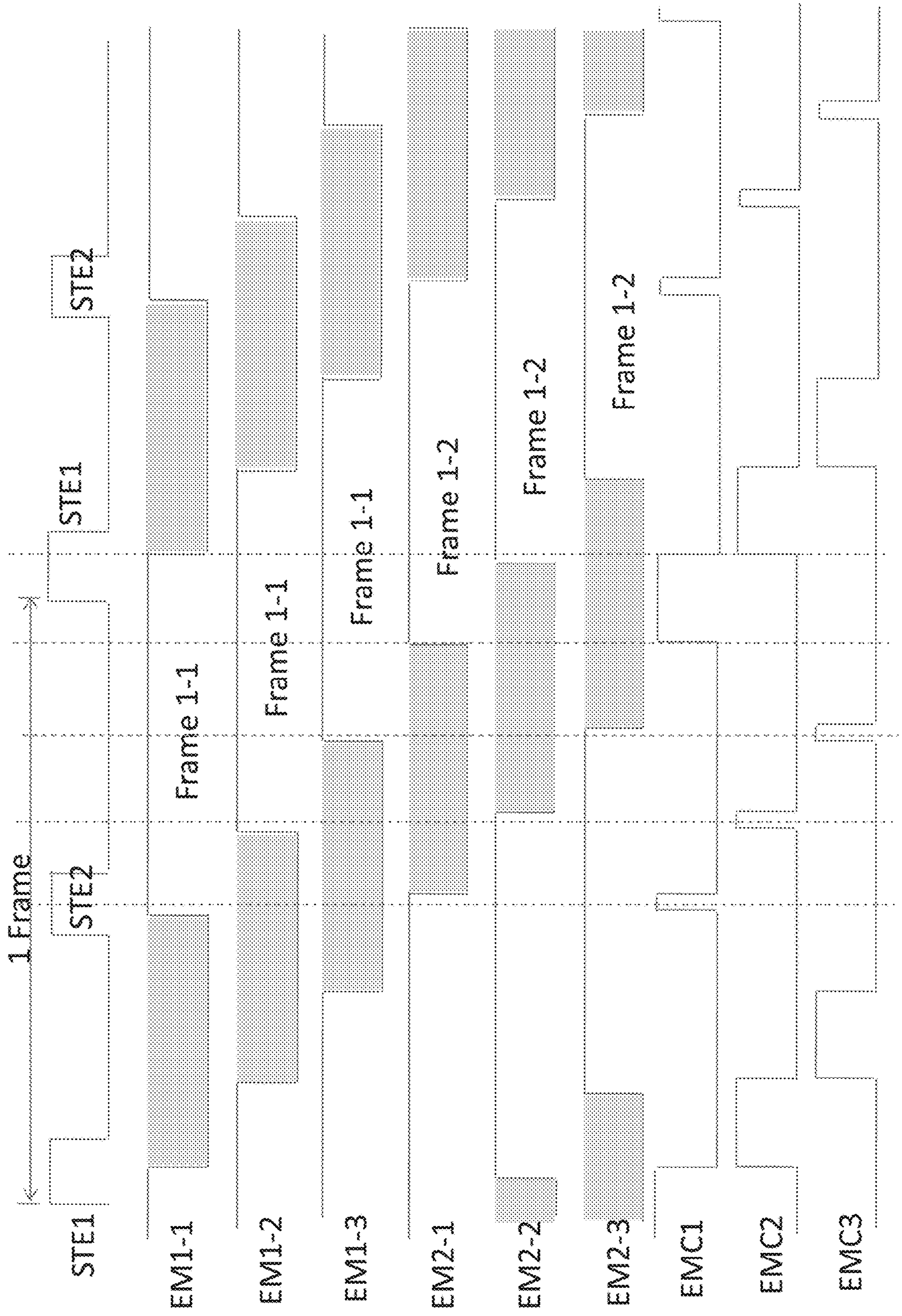
FIG. 13 is a timing diagram of pixel circuits for driving the 6×3 subpixel array shown in FIG. 12 in accordance with one embodiment set forth in the disclosure.

FIG. 13 is a timing diagram of pixel circuits for driving the 6×3 subpixel array shown in FIG. 12 in accordance with one embodiment set forth in the disclosure. In this example, the timings of light emitting control signals EMC1, EMC2, EMC3 and light emitting signals EM1-1, EM1-2, EM1-3, EM2-1, EM2-2, EM2-3 are illustrated. As the 6×3 subpixel array is divided into two subpixel groups in the scan direction, two sets of light emitting signals are provided: the first set of light emitting signals EM1-1, EM1-2, EM1-3 for controlling the light emission of subpixels in the first subpixel group, and the second set of light emitting signals EM2-1, EM2-2, EM2-3 for controlling the light emission of subpixels in the second subpixel group. Specifically, the light emitting signals EM1-1, EM1-2, EM1-3 in the first set control the subpixels in the first, third, and fifth rows, respectively, to emit lights during the first sub-frame period (Frame 1-1) and the light emitting signals EM2-1, EM2-2, EM2-3 in the second set control the subpixels in the second, fourth, and sixth rows, respectively, to emit lights during the second sub-frame period (Frame 1-2) subsequent to the first sub-frame period. As to the light emitting control signals EMC1, EMC2, EMC3, each of them controls the two subpixels sharing the same pixel circuit to sequentially emit a light in the respective sub-frame period (light emitting period) within a frame period. Specifically, the light emitting control signal EMC1 may control the subpixels from the first and second rows of subpixels, the light emitting control signal EMC2 may control the subpixels from the third and fourth rows of subpixels, and the light emitting control signal EMC3 may control the subpixels from the fifth and sixth rows of subpixels. As shown in FIG. 13, the light emitting control signal EMC1 coordinates with the light emitting signals EM1-1, EM2-1 so that the light emitting control signal EMC1 becomes low when any of the light emitting signals EM1-1, EM2-1 becomes low. Similarly, the light emitting control signal EMC2 coordinates with the light emitting signals EM1-2, EM2-2 so that the light emitting control signal EMC2 becomes low when any of the light emitting signals EM1-2, EM2-2 becomes low; the light emitting control signal EMC3 coordinates with the light emitting signals EM1-3, EM2-3 so that the light emitting control signal EMC3 becomes low when any of the light emitting signals EM1-3, EM2-3 becomes low.

Figure 14:
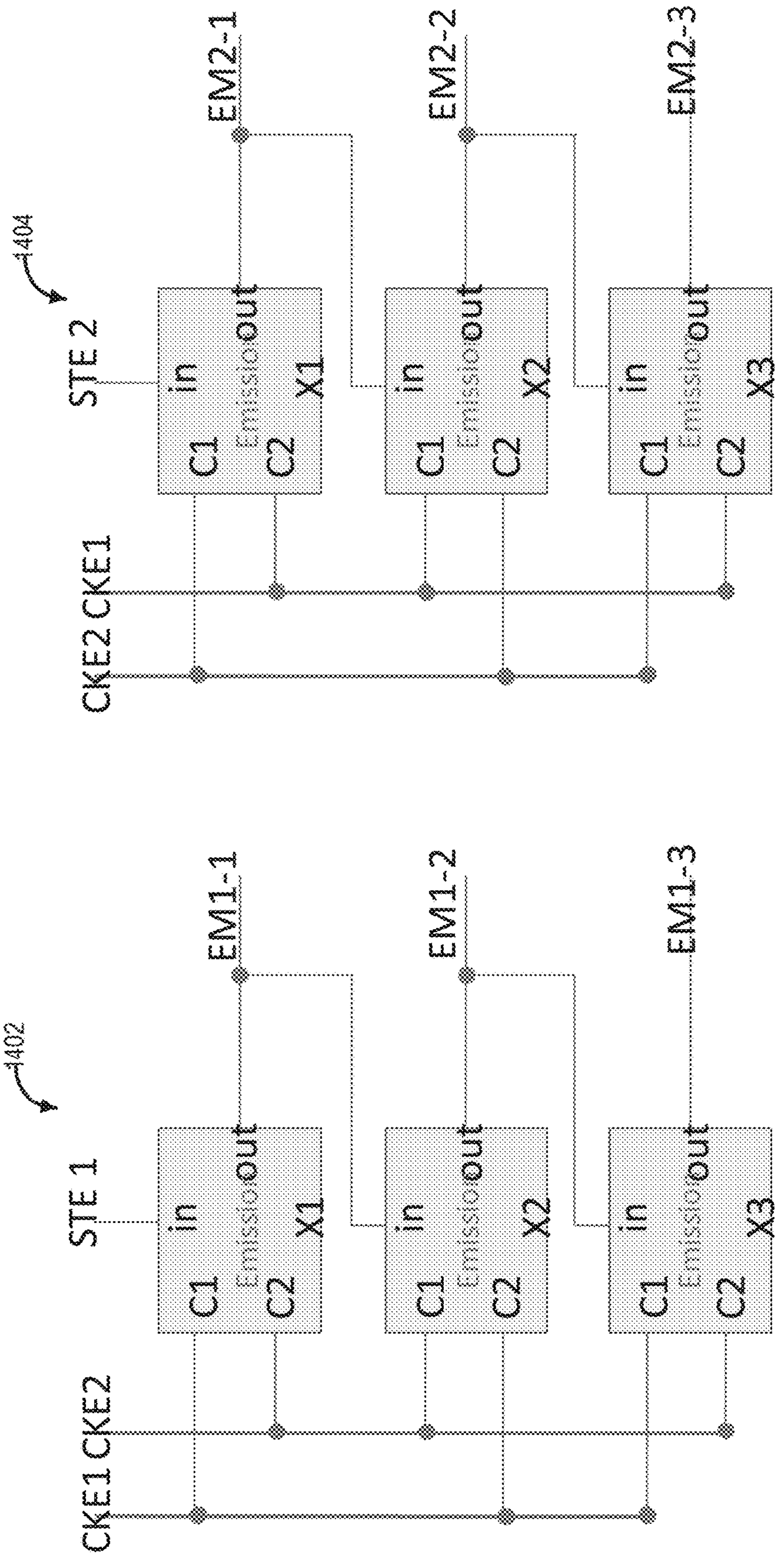
FIG. 14 is a circuit diagram illustrating a light emitting circuit for providing light emitting signals for driving the 6×3 subpixel array shown in FIG. 12 in accordance with one embodiment set forth in the disclosure.

FIG. 14 is a circuit diagram illustrating a light emitting circuit for providing light emitting signals for driving the 6×3 subpixel array shown in FIG. 12 in accordance with one embodiment set forth in the disclosure. In this example, the light emitting circuit 504 includes two shift registers 1402, 1404, each of which is configured to provide a respective set of light emitting signals. The first shift register 1402 includes three flip-flops providing the three light emitting signals EM1-1, EM1-2, EM1-3, respectively, in the first set of light emitting signals in response to the enable signal STE1 and clock signals CKE1, CKE2 provided by the control logic 104. The second shift register 1404 includes three flip-flops providing the three light emitting signals EM2-1, EM2-2, EM2-3, respectively, in the second set of light emitting signals in response to the enable signal STE2 and clock signals CKE1, CKE2 provided by the control logic 104. In this example, the clock signals CKE1, CKE2 are provided to the different clock inputs in the first and second shift registers 1402, 1404. The timings of the light emitting signals EM1-1, EM1-2, EM1-3, EM2-1, EM2-2, EM2-3 and enable signals STE1, STE2 are shown in FIG. 13. The light emitting circuit 504 in this example is provided for driving the 6×3 subpixel array shown in FIG. 12. For a display having an N×M subpixel array, when the display frame is evenly divided into k sub-frames (i.e., k groups of subpixels) in the scan direction, the number of shift registers needed in the light emitting circuit 504 is k. In other words, the light emitting circuit 504 includes k shift registers for providing k sets of light emitting signals, respectively, and each shift register includes N/k flip-flops for providing N/k light emitting signals, respectively, in each set of light emitting signals.

Figure 15A:
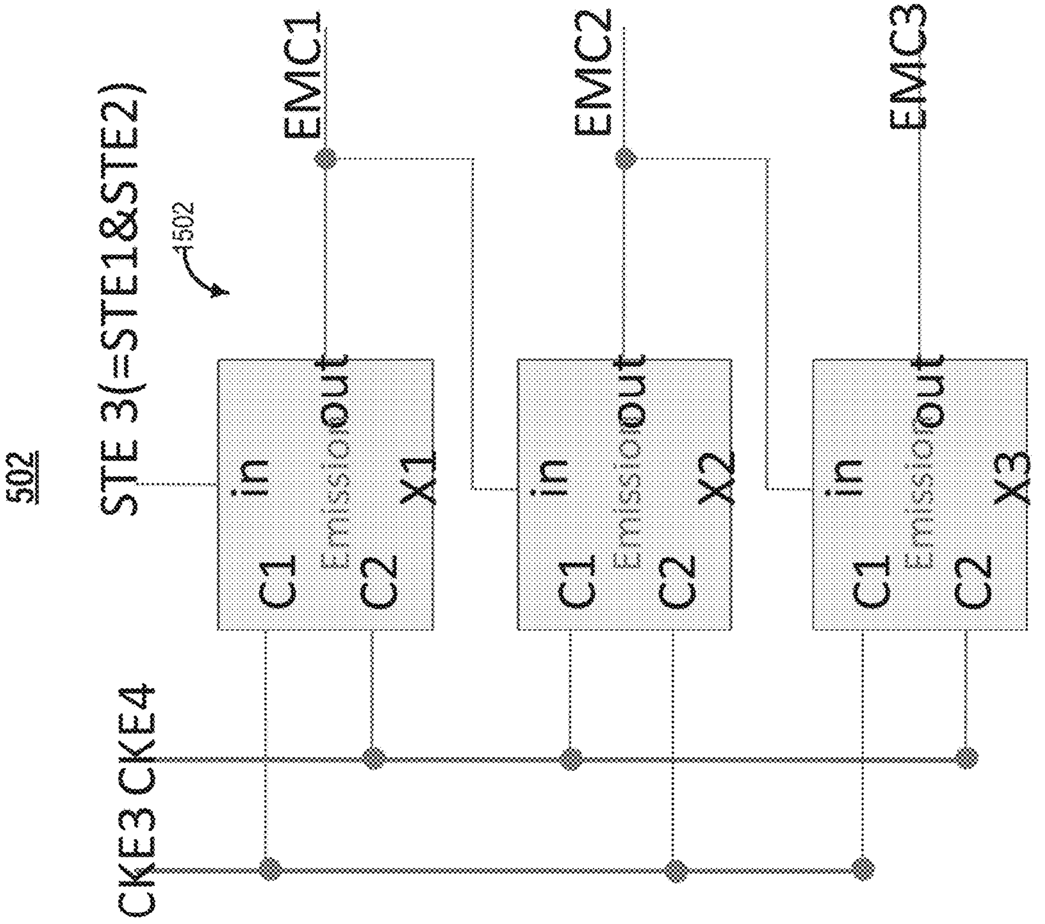
FIGS. 15A-15B are circuit diagrams illustrating various examples of a light emitting control circuit for providing light emitting control signals for driving the 6×3 subpixel array shown in FIG. 12 in accordance with various embodiments set forth in the disclosure.

FIG. 15A is a circuit diagram illustrating one example of a light emitting control circuit for providing light emitting control signals for driving the 6×3 subpixel array shown in FIG. 12 in accordance with one embodiment set forth in the disclosure. In this example, the light emitting control circuit 502 includes a shift register 1502 configured to provide the light emitting control signals EMC1, EMC2, EMC3 in response to the enable signal STE3 and clock signals CKE3, CKE4 provided by the control logic 104. In this example, the enable signal STE3 is a logical disjunction of the enable signals STE1, STE2 provided to the two shift registers 1402, 1404 in the light emitting circuit 504. For example, the enable signal STE3 is low when any of the enable signals STE1, STE2 is low. The timings of the light emitting control signals EMC1, EMC2, EMC3 and enable signals STE1, STE2 are shown in FIG. 13. The shift register 1502 in this example includes three flip-flops outputting three light emitting control signals EMC1, EMC2, EMC3 for driving the 6×3 subpixel array shown in FIG. 12. For a display having an N×M subpixel array, when the display frame is evenly divided into k sub-frames (i.e., k groups of subpixels) in the scan direction, the shift register in the light emitting control circuit 502 includes N/k flip-flops for providing N/k light emitting control signals, respectively.

Figure 15B:
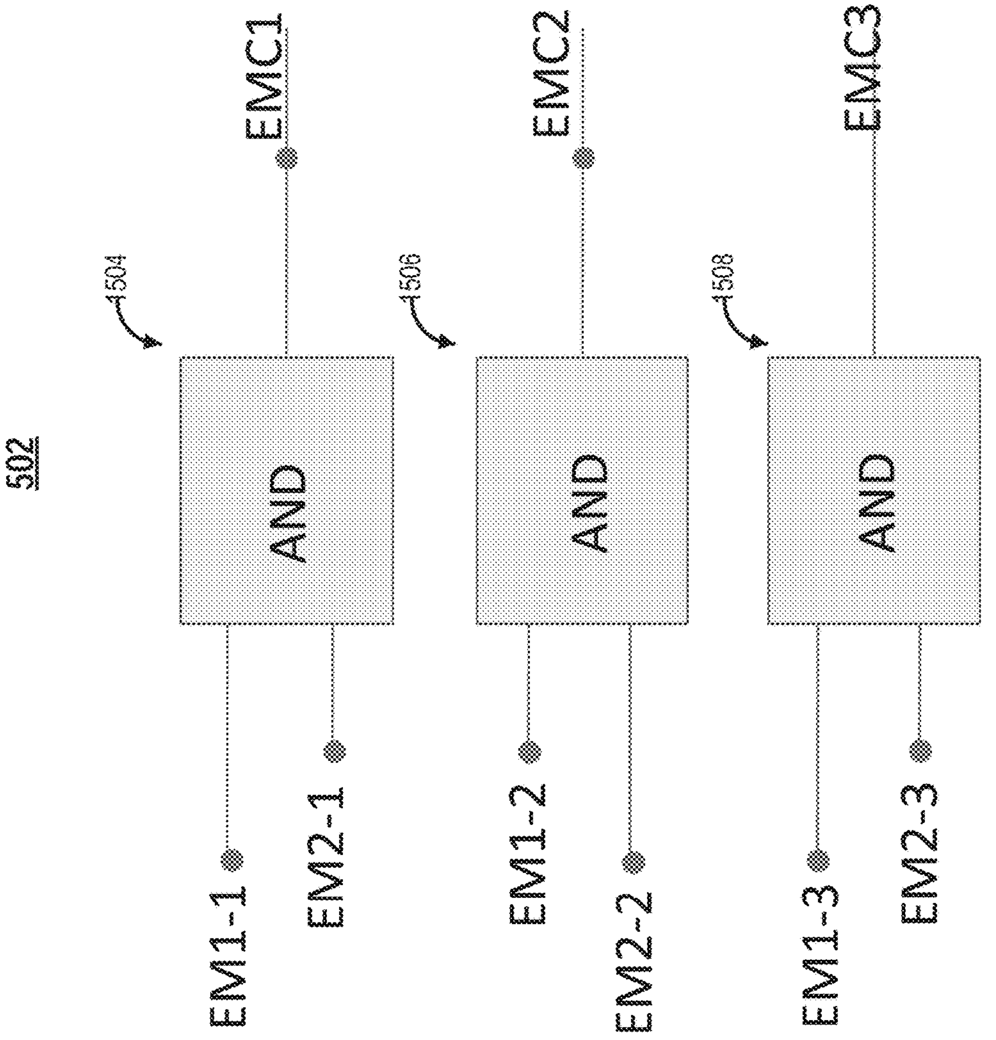

FIG. 15B is a circuit diagram illustrating another example of a light emitting control circuit for providing light emitting control signals for driving the 6×3 subpixel array shown in FIG. 12 in accordance with one embodiment set forth in the disclosure. In this example, the light emitting control circuit 502 includes three AND gates 1504, 1506, 1508, each of which is configured to provide one of the light emitting control signals EMC1, EMC2, EMC3. Each AND gate 1504, 1506, 1608 provides a light emitting control signal EMC1, EMC2, EMC3, respectively, based on two of the six light emitting signals EM1-1, EM1-2, EM1-3, EM2-1, EM2-2, EM2-3. For each AND gate 1504, 1506, 1508, one of the input light emitting signals is from the first set of light emitting signals EM1-1, EM1-2, EM1-3, and the other one of the input light emitting signals is from the second set of light emitting signals EM2-1, EM2-2, EM2-3. The two input light emitting signals of the same AND gate 1504, 1506, 1508 are used for controlling the two subpixels sharing the same pixel circuit. Specifically, the light emitting signal EM1-1 from the first set of light emitting signals and the corresponding light emitting signal EM2-1 from the second set of light emitting signals are the inputs of the first AND gate 1504, and the light emitting control signal EMC1 is the output of the first AND gate 1504; the light emitting signal EM1-2 from the first set of light emitting signals and the corresponding light emitting signal EM2-2 from the second set of light emitting signals are the inputs of the second AND gate 1506, and the light emitting control signal EMC2 is the output of the second AND gate 1506; the light emitting signal EM1-3 from the first set of light emitting signals and the corresponding light emitting signal EM2-3 from the second set of light emitting signals are the inputs of the third AND gate 1508, and the light emitting control signal EMC3 is the output of the third AND gate 1508.

The light emitting control circuit 502 shown in FIG. 15B is suitable for PMOS pixel circuits. When any of the two input light emitting signals is low, the output light emitting control signal is low. Because the two input light emitting signals control the two light emitting elements sharing the same pixel circuit, respectively, the corresponding light emitting control signal turns on the p-type light emitting control transistor during each of the two light emitting periods (i.e., when any of the two light emitting signals is low) within a frame period. The timings of the output light emitting control signals EMC1, EMC2, EMC3 and the input light emitting signals EM1-1, EM1-2, EM1-3, EM2-1, EM2-2, EM2-3 are shown in FIG. 13. It is understood that in other examples in which the pixel circuits are NMOS pixel circuits, three OR gates can replace the three AND gates 1504, 1506, 1508 in FIG. 15B. The corresponding light emitting signals with the reversed polarity are inputted to each OR gate, and the corresponding light emitting control signals with the reversed polarity are outputted from each OR gate. That is, when any of the two input light emitting signals is high, the output light emitting control signal is high. Because the two input light emitting signals control the two light emitting elements sharing the same pixel circuit, respectively, the corresponding light emitting control signal turns on the n-type light emitting control transistor during each of the two light emitting periods (i.e., when any of the two light emitting signals is high) within a frame period. For a display having an N×M subpixel array, when the display frame is evenly divided into k sub-frames (i.e., k groups of subpixels) in the scan direction, the light emitting control circuit 502 with AND gates or OR gates includes N/k AND or OR gates for providing N/k light emitting control signals, respectively. Each of the N/k AND or OR gates has k input light emitting used for controlling the k subpixels sharing the same pixel circuit.

Figure 16:
FIG. 16 is another timing diagram of pixel circuits for driving the 6×3 subpixel array shown in FIG. 12 in accordance with one embodiment set forth in the disclosure.
Figure 17:
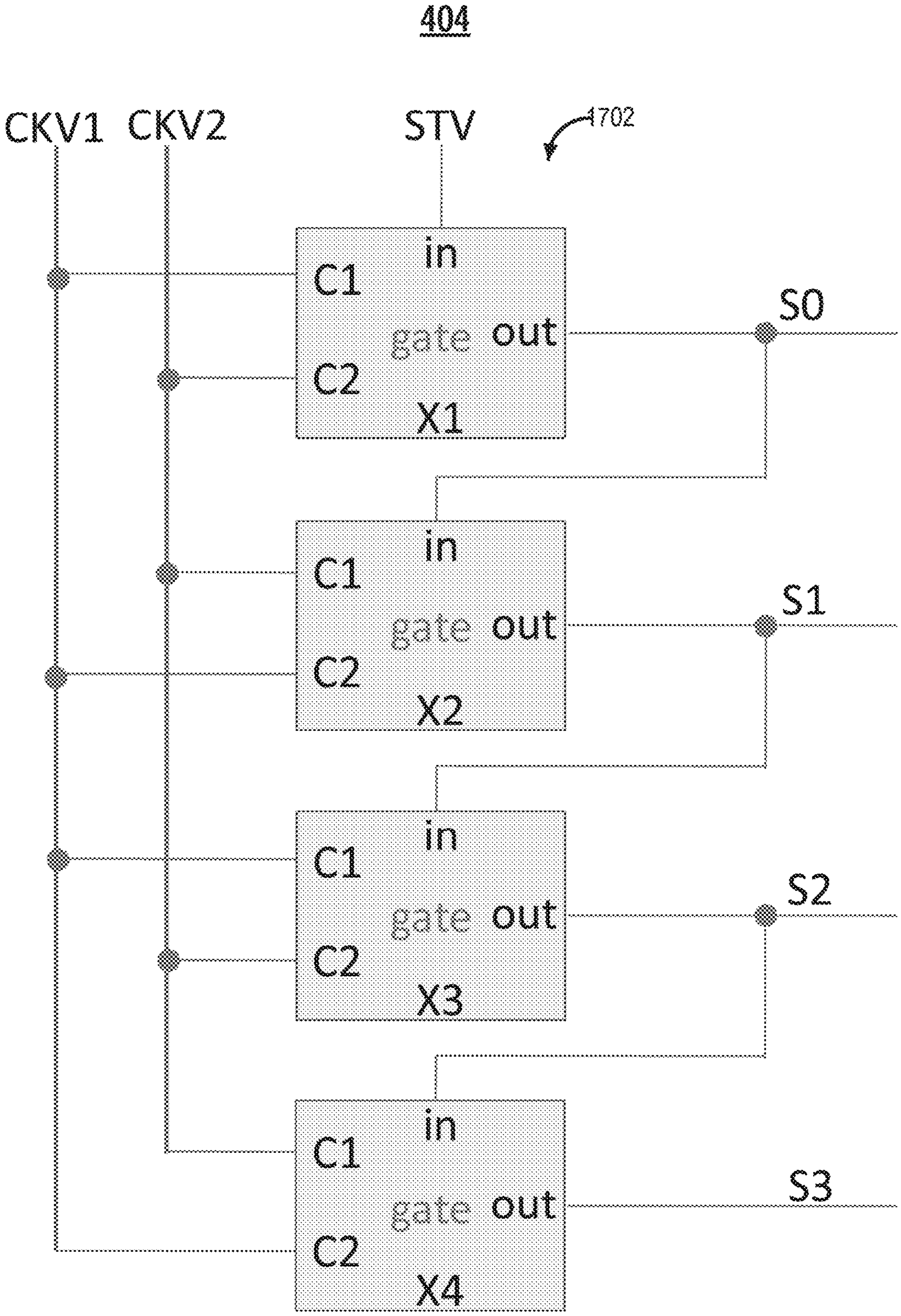
FIG. 17 is a circuit diagram illustrating a gate scanning driver for providing scan signals for scanning the 6×3 subpixel array shown in FIG. 12 in accordance with one embodiment set forth in the disclosure.

FIG. 16 is another timing diagram of pixel circuits for driving the 6×3 subpixel array shown in FIG. 12 in accordance with one embodiment set forth in the disclosure. The timings of the scan signals S1-0, S1-1, S2-0, S2-1 are provided in the timing diagram with respect to the light emitting signals EM1-1, EM2-1. FIG. 17 is a circuit diagram illustrating a gate scanning driver for providing scan signals for scanning the 6×3 subpixel array shown in FIG. 12 in accordance with one embodiment set forth in the disclosure. In this example, the gate scanning driver 404 includes a shift register 1702 configured to provide the scan signals S0, S1, S2, S3 in response to the enable signal STV and clock signals CKV1, CKV2 provided by the control logic 104. The shift register 1702 in this example includes four flip-flops outputting four scan signals S0, S1, S2, S3 to the pixel circuits 900 with compensation circuits shown in FIG. 9 for driving the 6×3 subpixel array shown in FIG. 12. For a display having an N×M subpixel array, when the display frame is evenly divided into k sub-frames (i.e., k groups of subpixels) in the scan direction, k rows of subpixels from the k subpixel groups can share the same scan line. Thus, the shift register in the gate scanning driver 404 includes N/k flip-flops for providing N/k scan signals, respectively, to pixel circuits without compensation circuits (e.g., the pixel circuit 700 in FIG. 7) or includes (N/k)+1 flip-flops for providing (N/k)+1 scan signals, respectively, to pixel circuits with compensation circuits (e.g., the pixel circuit 900 in FIG. 9 with the Sn-1 signal).

FIG. 18 is a depiction of an example of dividing a 6×3 subpixel array into three subpixel groups in the scan direction in accordance with one embodiment set forth in the disclosure. The first group of subpixels includes one third of the 6×3 subpixels, i.e., subpixels in the first and fourth rows, the second group of subpixels includes one third of the 6×3 subpixels, i.e., subpixels in the second and fifth rows, and the third group of subpixels includes the rest one third of the 6×3 subpixels, i.e., subpixels in the third and sixth rows.

FIG. 19 is a circuit diagram of a pixel circuit with a compensation circuit shared by three light emitting elements in the same column in accordance with one embodiment set forth in the disclosure. Compared with the exemplary pixel circuit 900 shown in FIG. 9, one more light emitting transistor is included in the pixel circuit 1900 to control the light emission of the third light emitting element in response to the third light emitting signal EM3-1. The three light emitting elements in this example may be adjacent OLEDs in the same column when the array of OLEDs is divided into three subpixel groups in the scan direction. In the pixel circuit 1900, eight transistors and one capacitor (8T1C) are used for driving three subpixels. The average number of transistors per subpixel in the pixel circuit 1900 is further reduced compared with the known solution, e.g., the direct-charging type pixel circuit 4700. As a result, the layout area of the direct-charging type pixel circuit 1900 is about one third of the layout area of the direct-charging type pixel circuit 4700 for driving the same number of subpixels.

FIG. 20 is a timing diagram of pixel circuits for driving the 6×3 subpixel array shown in FIG. 18 in accordance with one embodiment set forth in the disclosure. In this example, the timings of light emitting control signals EMC1, EMC2, and light emitting signals EM1-1, EM1-2, EM2-1, EM2-2, EM3-1, EM3-2 are illustrated. As the 6×3 subpixel array is divided into three subpixel groups in the scan direction, three sets of light emitting signals are provided: the first set of light emitting signals EM1-1, EM1-2 for controlling the light emission of subpixels in the first subpixel group, the second set of light emitting signals EM2-1, EM2-2 for controlling the light emission of subpixels in the second subpixel group, and the third set of light emitting signals EM3-1, EM3-2 for controlling the light emission of subpixels in the third subpixel group. Specifically, the light emitting signals EM1-1, EM1-2 in the first set control the subpixels in the first and fourth rows, respectively, to emit lights during the first sub-frame period (Frame 1-1), the light emitting signals EM2-1, EM2-2 in the second set control the subpixels in the second and fifth rows, respectively, to emit lights during the second sub-frame period (Frame 1-2) subsequent to the first sub-frame period, and the light emitting signals EM3-1, EM3-2 in the third set control the subpixels in the third and sixth rows, respectively, to emit lights during the third sub-frame period (Frame 1-3) subsequent to the second sub-frame period. As to the light emitting control signals EMC1, EMC2, each of them controls the three subpixels sharing the same pixel circuit to sequentially emit a light in the respective sub-frame period (light emitting period) within a frame period. Specifically, the light emitting control signal EMC1 may control the subpixels from the first, second, and third rows of subpixels, and the light emitting control signal EMC2 may control the subpixels from the fourth, fifth, and sixth rows of subpixels. As shown in FIG. 20, the light emitting control signal EMC1 coordinates with the light emitting signals EM1-1, EM2-1, EM3-1 so that the light emitting control signal EMC1 becomes low when any of the light emitting signals EM1-1, EM2-1, EM3-1 becomes low. Similarly, the light emitting control signal EMC2 coordinates with the light emitting signals EM1-2, EM2-2, EM3-2 so that the light emitting control signal EMC2 becomes low when any of the light emitting signals EM1-2, EM2-2, EM3-2 becomes low.

FIG. 21 is a circuit diagram illustrating a light emitting circuit for providing light emitting signals for driving the 6×3 subpixel array shown in FIG. 18 in accordance with one embodiment set forth in the disclosure. In this example, the light emitting circuit 504 includes three shift registers 2102, 2104, 2106, each of which is configured to provide a respective set of light emitting signals. The first shift register 2102 includes two flip-flops providing the two light emitting signals EM1-1, EM1-2, respectively, in the first set of light emitting signals in response to the enable signal STE1 and clock signals CKE1, CKE2 provided by the control logic 104. The second shift register 2104 includes two flip-flops providing the two light emitting signals EM2-1, EM2-2, respectively, in the second set of light emitting signals in response to the enable signal STE2 and clock signals CKE1, CKE2 provided by the control logic 104. The third shift register 2106 includes two flip-flops providing the two light emitting signals EM3-1, EM3-2, respectively, in the third set of light emitting signals in response to the enable signal STE3 and clock signals CKE1, CKE2 provided by the control logic 104. The timings of the light emitting signals EM1-1, EM1-2, EM2-1, EM2-2, EM3-1, EM3-2 and enable signals STE1, STE2, STE3 are shown in FIG. 20. The light emitting circuit 504 in this example is provided for driving the 6×3 subpixel array shown in FIG. 18. For a display having an N×M subpixel array, when the display frame is evenly divided into k sub-frames (i.e., k groups of subpixels) in the scan direction, the number of shift registers needed in the light emitting circuit 504 is k. In other words, the light emitting circuit 504 includes k shift registers for providing k sets of light emitting signals, respectively, and each shift register includes N/k flip-flops for providing N/k light emitting signals, respectively, in each set of light emitting signals.

FIG. 22A is a circuit diagram illustrating one example a light emitting control circuit for providing light emitting control signals for driving the 6×3 subpixel array shown in FIG. 18 in accordance with one embodiment set forth in the disclosure. In this example, the light emitting control circuit 502 includes a shift register 2202 configured to provide the light emitting control signals EMC1, EMC2 in response to the enable signal STE4 and clock signals CKE1, CKE2 provided by the control logic 104. In this example, the enable signal STE4 is a logical disjunction of the enable signals STE1, STE2, STE3 provided to the three shift registers 2102, 2102, 2104 in the light emitting circuit 504. For example, the enable signal STE4 is low when any of the enable signals STE1, STE2, STE3 is low. The timings of the light emitting control signals EMC1, EMC2 and enable signals STE1, STE2, STE3 are shown in FIG. 20. The shift register 2202 in this example includes two flip-flops outputting two light emitting control signals EMC1, EMC2 for driving the 6×3 subpixel array shown in FIG. 18. For a display having an N×M subpixel array, when the display frame is evenly divided into k sub-frames (i.e., k groups of subpixels) in the scan direction, the shift register in the light emitting control circuit 502 includes N/k flip-flops for providing N/k light emitting control signals, respectively.

FIG. 22B is a circuit diagram illustrating another example of a light emitting control circuit for providing light emitting control signals for driving the 6×3 subpixel array shown in FIG. 18 in accordance with one embodiment set forth in the disclosure. In this example, the light emitting control circuit 502 includes two AND gates 2204, 2206, each of which is configured to provide one of the light emitting control signals EMC1, EMC2. Each AND gate 2204, 2206 provides a light emitting control signal EMC1, EMC2, respectively, based on three of the six light emitting signals EM1-1, EM1-2, EM2-1, EM2-2, EM3-1, EM3-2. For each AND gate 2204, 2206, one of the input light emitting signals is from the first set of light emitting signals EM1-1, EM1-2, one of the input light emitting signals is from the second set of light emitting signals EM2-1, EM2-2, and the other one of the input light emitting signals is from the third set of light emitting signals EM3-1, EM3-2. The three input light emitting signals of the same AND gate 2204, 2206 are used for controlling the three subpixels sharing the same pixel circuit. Specifically, the light emitting signal EM1-1 from the first set of light emitting signals, the corresponding light emitting signal EM2-1 from the second set of light emitting signals, and the corresponding light emitting signal EM3-1 from the third set of light emitting signals are the inputs of the first AND gate 2204, and the light emitting control signal EMC1 is the output of the first AND gate 2204; the light emitting signal EM1-2 from the first set of light emitting signals, the corresponding light emitting signal EM2-2 from the second set of light emitting signals, and the corresponding light emitting signal EM3-2 from the third set of light emitting signals are the inputs of the second AND gate 2206, and the light emitting control signal EMC2 is the output of the second AND gate 2206.

The light emitting control circuit 502 shown in FIG. 22B is suitable for PMOS pixel circuits. When any of the three input light emitting signals is low, the output light emitting control signal is low. Because the three input light emitting signals control the three light emitting elements sharing the same pixel circuit, respectively, the corresponding light emitting control signal turns on the p-type light emitting control transistor during each of the three light emitting periods (i.e., when any of the three light emitting signals is low) within a frame period. The timings of the output light emitting control signals EMC1, EMC2, and the input light emitting signals EM1-1, EM1-2, EM2-1, EM2-2, EM3-1, EM3-2 are shown in FIG. 20. It is understood that in other examples in which the pixel circuits are NMOS pixel circuits, two OR gates can replace the two AND gates 2204, 2206 in FIG. 22B. The corresponding light emitting signals with the reversed polarity are inputted to each OR gate, and the corresponding light emitting control signals with the reversed polarity are outputted from each OR gate. That is, when any of the three input light emitting signals is high, the output light emitting control signal is high. Because the three input light emitting signals control the three light emitting elements sharing the same pixel circuit, respectively, the corresponding light emitting control signal turns on the n-type light emitting control transistor during each of the three light emitting periods (i.e., when any of the three light emitting signals is high) within a frame period. For a display having an N×M subpixel array, when the display frame is evenly divided into k sub-frames (i.e., k groups of subpixels) in the scan direction, the light emitting control circuit 502 with AND gates or OR gates includes N/k AND or OR gates for providing N/k light emitting control signals, respectively. Each of the N/k AND or OR gates has k input light emitting used for controlling the k subpixels sharing the same pixel circuit.

FIG. 23 is another timing diagram of pixel circuits for driving the 6×3 subpixel array shown in FIG. 18 in accordance with one embodiment set forth in the disclosure. The timings of the scan signals S1-0, S1-1, S2-0, S2-1, S3-0, S3-1 are provided in the timing diagram with respect to the light emitting signals EM1-1, EM2-1, EM3-1. FIG. 24 is a circuit diagram illustrating a gate scanning driver for providing scan signals for scanning the 6×3 subpixel array shown in FIG. 18 in accordance with one embodiment set forth in the disclosure. In this example, the gate scanning driver 404 includes a shift register 2402 configured to provide the scan signals S0, S1, S2 in response to the enable signal STV and clock signals CKV1, CKV2 provided by the control logic 104. The shift register 2402 in this example includes three flip-flops outputting three scan signals S0, S1, S2 to the pixel circuits 1900 with compensation circuits shown in FIG. 19 for driving the 6×3 subpixel array shown in FIG. 18. For a display having an N×M subpixel array, when the display frame is evenly divided into k sub-frames (i.e., k groups of subpixels) in the scan direction, k rows of subpixels from the k subpixel groups can share the same scan line. Thus, the shift register in the gate scanning driver 404 includes N/k flip-flops for providing N/k scan signals, respectively, to pixel circuits without compensation circuits (e.g., the pixel circuit 700 in FIG. 7) or includes (N/k)+1 flip-flops for providing (N/k)+1 scan signals, respectively, to pixel circuits with compensation circuits (e.g., the pixel circuit 1900 in FIG. 19 with the Sn-1 signal). FIG. 25 is still another timing diagram of pixel circuits for driving the 6×3 subpixel array shown in FIG. 18 in accordance with one embodiment set forth in the disclosure. The timings of the scan signals S1-0, S1-1, S1-2, S2-0, S2-1, S2-2, S3-0, S3-1, S3-2 and clock signals CKV1, CKV2 are provided in the timing diagram with respect to the light emitting signals EM1-1, EM2-1, EM3-1.

FIG. 26 is a depiction of an example of dividing a 6×3 subpixel array into six subpixel groups in the scan direction in accordance with one embodiment set forth in the disclosure. The first group of subpixels includes one sixth of the 6×3 subpixels, i.e., subpixels in the first row, the second group of subpixels includes one sixth of the 6×3 subpixels, i.e., subpixels in the second row, the third group of subpixels includes one sixth of the 6×3 subpixels, i.e., subpixels in the third row, the fourth group of subpixels includes one sixth of the 6×3 subpixels, i.e., subpixels in the fourth row, the fifth group of subpixels includes one sixth of the 6×3 subpixels, i.e., subpixels in the fifth row, and the sixth group of subpixels includes one sixth of the 6×3 subpixels, i.e., subpixels in the sixth row.

FIG. 27 is a circuit diagram illustrating a pixel circuit with a compensation circuit shared by six light emitting elements in the same column in accordance with one embodiment set forth in the disclosure. Compared with the exemplary pixel circuit 1900 shown in FIG. 19, three more light emitting transistors are included in the pixel circuit 2700 to control the light emission of the fourth, fifth, and sixth light emitting elements in response to the fourth light emitting signal EM4-1, fifth light emitting signal EM5-1, and sixth light emitting signal EM6-1, respectively. The six light emitting elements in this example may be adjacent OLEDs in the same column when the array of OLEDs is divided into six subpixel groups in the scan direction. In the pixel circuit 2700, 11 transistors and one capacitor (11T1C) are used for driving three subpixels. The average number of transistors per subpixel in the direct-charging type pixel circuit 2700 is further reduced compared with the known solution, e.g., the direct-charging type pixel circuit 4700. As a result, the layout area of the direct-charging type pixel circuit 2700 is about one sixth of the layout area of the direct-charging type pixel circuit 4700 for driving the same number of subpixels.

FIG. 28 is a timing diagram of pixel circuits for driving the 6×3 subpixel array shown in FIG. 26 in accordance with one embodiment set forth in the disclosure. In this example, the timings of light emitting control signal EMC and light emitting signals EM1-1, EM1-2, EM1-3, EM1-4, EM1-5, EM1-6 are illustrated. As the 6×3 subpixel array is divided into six subpixel groups in the scan direction, six sets of light emitting signals are provided: the first set of light emitting signals EM1-1 for controlling the light emission of subpixels in the first subpixel group, the second set of light emitting signals EM1-2 for controlling the light emission of subpixels in the second subpixel group, the third set of light emitting signals EM1-3 for controlling the light emission of subpixels in the third subpixel group, the fourth set of light emitting signals EM1-4 for controlling the light emission of subpixels in the fourth subpixel group, the fifth set of light emitting signals EM1-5 for controlling the light emission of subpixels in the fifth subpixel group, and the sixth set of light emitting signals EM1-6 for controlling the light emission of subpixels in the sixth subpixel group. Specifically, the light emitting signal EM1-1 in the first set controls the subpixels in the first row to emit lights during the first sub-frame period (Frame 1-1), the light emitting signal EM1-2 in the second set controls the subpixels in the second row to emit lights during the second sub-frame period (Frame 1-2) subsequent to the first sub-frame period, the light emitting signal EM1-3 in the third set controls the subpixels in the third row to emit lights during the third sub-frame period (Frame 1-3) subsequent to the second sub-frame period, the light emitting signal EM1-4 in the fourth set controls the subpixels in the fourth row to emit lights during the fourth sub-frame period (Frame 1-4) subsequent to the third sub-frame period, the light emitting signal EM1-5 in the fifth set controls the subpixels in the fifth row to emit lights during the fifth sub-frame period (Frame 1-5) subsequent to the fourth sub-frame period, and the light emitting signal EM1-6 in the sixth set controls the subpixels in the sixth row to emit lights during the sixth sub-frame period (Frame 1-6) subsequent to the fifth sub-frame period. The light emitting control signal EMC controls the six subpixels sharing the same pixel circuit to sequentially emit a light in the respective sub-frame period (light emitting period) within a frame period. Specifically, the light emitting control signal EMC may control the subpixels from the first to sixth rows of subpixels. As shown in FIG. 28, the light emitting control signal EMC coordinates with the light emitting signals EM1-1, EM1-2, EM1-3, EM1-4, EM1-5, EM1-6 so that the light emitting control signal EMC becomes low when any of the light emitting signals EM1-1, EM1-2, EM1-3, EM1-4, EM1-5, EM1-6 becomes low.

FIG. 29 is a circuit diagram illustrating a light emitting circuit for providing light emitting signals for driving the 6×3 subpixel array shown in FIG. 26 in accordance with one embodiment set forth in the disclosure. In this example, the light emitting circuit 504 includes six shift registers 2902, 2904, 2906, 2908, 2910, 2912, each of which is configured to provide a respective set of light emitting signals. The first shift register 2902 includes a flip-flop providing the light emitting signal EM1-1 in the first set of light emitting signals in response to the enable signal STE1 and clock signals CKE1, CKE2 provided by the control logic 104. The second shift register 2904 includes a flip-flop providing the light emitting signal EM2-1 in the second set of light emitting signals in response to the enable signal STE2 and clock signals CKE1, CKE2 provided by the control logic 104. The third shift register 2906 includes a flip-flop providing the light emitting signal EM3-1 in the third set of light emitting signals in response to the enable signal STE3 and clock signals CKE1, CKE2 provided by the control logic 104. The fourth shift register 2908 includes a flip-flop providing the light emitting signal EM4-4 in the fourth set of light emitting signals in response to the enable signal STE4 and clock signals CKE1, CKE2 provided by the control logic 104. The fifth shift register 2910 includes a flip-flop providing the light emitting signal EM5-1 in the fifth set of light emitting signals in response to the enable signal STE5 and clock signals CKE1, CKE2 provided by the control logic 104. The sixth shift register 2912 includes a flip-flop providing the light emitting signal EM6-1 in the sixth set of light emitting signals in response to the enable signal STE6 and clock signals CKE1, CKE2 provided by the control logic 104. The timings of the light emitting signals EM1-1, EM1-2, EM1-3, EM1-4, EM1-5, EM1-6 are shown in FIG. 28. The light emitting circuit 504 in this example is provided for driving the 6×3 subpixel array shown in FIG. 26. For a display having an N×M subpixel array, when the display frame is evenly divided into k sub-frames (i.e., k groups of subpixels) in the scan direction, the number of shift registers needed in the light emitting circuit 504 is k. In other words, the light emitting circuit 504 includes k shift registers for providing k sets of light emitting signals, respectively, and each shift register includes N/k flip-flops for providing N/k light emitting signals, respectively, in each set of light emitting signals.

FIG. 30A is a circuit diagram illustrating one example of a light emitting control circuit for providing light emitting control signals for driving the 6×3 subpixel array shown in FIG. 26 in accordance with one embodiment set forth in the disclosure. In this example, the light emitting control circuit 502 includes a shift register 3002 configured to provide the light emitting control signals EMC in response to the enable signal STE7 and clock signals CKE1, CKE2 provided by the control logic 104. In this example, the enable signal STE7 is a logical disjunction of the enable signals STE1, STE2, STE3, STE4, STE5, STE6 provided to the six shift registers 2902, 2904, 2906, 2908, 2910, 2912 in the light emitting circuit 504. For example, the enable signal STE7 is low when any of the enable signals STE1, STE2, STE3, STE4, STE5, STE6 is low. The timing of the light emitting control signal EMC is shown in FIG. 28. The shift register 3002 in this example includes a flip-flop outputting the light emitting control signal EMC for driving the 6×3 subpixel array shown in FIG. 26. For a display having an N×M subpixel array, when the display frame is evenly divided into k sub-frames (i.e., k groups of subpixels) in the scan direction, the shift register in the light emitting control circuit 502 includes N/k flip-flops for providing N/k light emitting control signals, respectively.

FIG. 30B is a circuit diagram illustrating another example of a light emitting control circuit for providing light emitting control signals for driving the 6×3 subpixel array shown in FIG. 26 in accordance with one embodiment set forth in the disclosure. In this example, the light emitting control circuit 502 includes one AND gate 3004 configured to provide the light emitting control signal EMC based on the six light emitting signals EM1-1, EM1-2, EM1-3, EM1-4, EM1-5, EM1-6. The six input light emitting signals EM1-1, EM1-2, EM1-3, EM1-4, EM1-5, EM1-6 of the AND gate 3004 are used for controlling the six subpixels sharing the same pixel circuit. The light emitting control circuit 502 shown in FIG. 30B is suitable for PMOS pixel circuits. When any of the six input light emitting signals is low, the output light emitting control signal is low. Because the six input light emitting signals control the six light emitting elements sharing the same pixel circuit, respectively, the corresponding light emitting control signal turns on the p-type light emitting control transistor during each of the six light emitting periods (i.e., when any of the six light emitting signals is low) within a frame period. The timings of the output light emitting control signal EMC and the input light emitting signals EM1-1, EM1-2, EM1-3, EM1-4, EM1-5, EM1-6 are shown in FIG. 28.

It is understood that in other examples in which the pixel circuits are NMOS pixel circuits, an OR gate can replace the AND gate 3004 in FIG. 30B. The corresponding light emitting signals with the reversed polarity are inputted to each OR gate, and the corresponding light emitting control signals with the reversed polarity are outputted from each OR gate. That is, when any of the six input light emitting signals is high, the output light emitting control signal is high. Because the six input light emitting signals control the six light emitting elements sharing the same pixel circuit, respectively, the corresponding light emitting control signal turns on the n-type light emitting control transistor during each of the six light emitting periods (i.e., when any of the six light emitting signals is high) within a frame period. For a display having an N×M subpixel array, when the display frame is evenly divided into k sub-frames (i.e., k groups of subpixels) in the scan direction, the light emitting control circuit 502 with AND gates or OR gates includes N/k AND or OR gates for providing N/k light emitting control signals, respectively. Each of the N/k AND or OR gates has k input light emitting used for controlling the k subpixels sharing the same pixel circuit.

FIG. 31 is another timing diagram of pixel circuits for driving the 6×3 subpixel array shown in FIG. 26 in accordance with one embodiment set forth in the disclosure. The timings of the scan signals S1-0, S1-1, S2-0, S2-1, S3-0, S3-1, S4-0, S4-1, S5-0, S5-1, S6-0 are provided in the timing diagram with respect to the light emitting signals EM1-1, EM2-1, EM3-1. FIG. 32 is a circuit diagram illustrating a gate scanning driver for providing scan signals for scanning the 6×3 subpixel array shown in FIG. 26 in accordance with one embodiment set forth in the disclosure. In this example, the gate scanning driver 404 includes a shift register 3202 configured to provide the scan signals S0, S1 in response to the enable signal STV and clock signals CKV1, CKV2 provided by the control logic 104. The shift register 3202 in this example includes two flip-flops outputting two scan signals S0, S1 to the pixel circuits 2700 with compensation circuits shown in FIG. 27 for driving the 6×3 subpixel array shown in FIG. 26. For a display having an N×M subpixel array, when the display frame is evenly divided into k sub-frames (i.e., k groups of subpixels) in the scan direction, k rows of subpixels from the k subpixel groups can share the same scan line. Thus, the shift register in the gate scanning driver 404 includes N/k flip-flops for providing N/k scan signals, respectively, to pixel circuits without compensation circuits (e.g., the pixel circuit 700 in FIG. 7) or includes (N/k)+1 flip-flops for providing (N/k)+1 scan signals, respectively, to pixel circuits with compensation circuits (e.g., the pixel circuit 2700 in FIG. 27 with the Sn-1 signal).

FIGS. 33A-33C are depictions of various examples of dividing a display frame into multiple sub-frames in the scan direction in accordance with various embodiments set forth in the disclosure. In addition to a display frame having each pixel consisted of real RGB subpixels as shown in FIGS. 11, 12, 18, and 26, the novel frame-division and pixel circuit-sharing scheme disclosed above is also applicable for any display frame having any subpixel arrangements as known in the art, including but not limited to, PenTile RGBG arrangement, PenTile RGBW arrangement, PenTile diamond pixels arrangement, Zigzag RGB arrangement (U.S. Pat. No. 8,786,645), RGBW arrangement (U.S. Pat. No. 9,165,526), Delta RGB arrangements (US Patent Application Publication No. 2015/0339969 and U.S. patent application Ser. No. 14/692,869), and other subpixel arrangements (e.g., PCT Patent Publication No. WO 2015/062110). In FIG. 33A, a display frame with a specific subpixel arrangement is divided into two sub-frames in the scan direction. In FIG. 33B, a display frame with a specific subpixel arrangement is divided into three sub-frames in the scan direction. In FIG. 33C, a display frame with a specific subpixel arrangement is divided into six sub-frames in the scan direction. The pixel circuits and drivers described above with respect to FIGS. 11-32 can also be applied to the examples shown in FIGS. 33A-33C.

FIGS. 34A-34C are depictions of various examples of dividing a 2×6 subpixel array into multiple subpixel groups in the data direction in accordance with various embodiments set forth in the disclosure. In FIG. 34A, the 2×6 subpixel array is evenly divided into two subpixel groups in the data direction. The first group of subpixels includes one half of the 2×6 subpixels, i.e., subpixels in the first, third, and fifth columns, and the second group of subpixels includes the other one half of the 2×6 subpixels, i.e., subpixels in the second, fourth, and sixth columns. In FIG. 34B, the 2×6 subpixel array is evenly divided into three subpixel groups in the data direction. The first group of subpixels includes one third of the 2×6 subpixels, i.e., subpixels in the first and fourth columns, the second group of subpixels includes one third of the 2×6 subpixels, i.e., subpixels in the second and fifth columns, and the third group of subpixels includes the rest one third of the 2×6 subpixels, i.e., subpixels in the third and sixth columns. In FIG. 34C, the 2×6 subpixel array is evenly divided into six subpixel groups in the data direction. The first group of subpixels includes one sixth of the 2×6 subpixels, i.e., subpixels in the first column, the second group of subpixels includes one sixth of the 2×6 subpixels, i.e., subpixels in the second column, the third group of subpixels includes one sixth of the 2×6 subpixels, i.e., subpixels in the third column, the fourth group of subpixels includes one sixth of the 2×6 subpixels, i.e., subpixels in the fourth column, the fifth group of subpixels includes one sixth of the 2×6 subpixels, i.e., subpixels in the fifth column, and the sixth group of subpixels includes the rest one sixth of the 2×6 subpixels, i.e., subpixels in the sixth column. The pixel circuits and drivers described above with respect to FIGS. 11-32 can also be applied to the data-direction-division examples in FIGS. 34A-34C. As mentioned above, for data-direction-division, because multiple subpixels share the same data line, the total number of data line and the scan/charging period are reduced compared with the known solutions and are depended on the number of sub-frames (groups of subpixels) and the number of subpixels forming a single pixel (e.g., the specific subpixel arrangement).

FIG. 35 is a depiction of an example of dividing a display frame into four sub-frames in the scan and data directions in accordance with one embodiment set forth in the disclosure. In this example, a display frame 3500 having a resolution of 6×4 pixels is evenly divided into a first sub-frame 3502, a second sub-frame 3504, a third sub-frame 3506, and a fourth sub-frame 3508 in the scan and data directions. Each sub-frame period is one fourth of a frame period. In this example, each pixel 3510, 3512 consists of two adjacent subpixels in the same row (e.g., R and G subpixels or G and B subpixels), each of which is a light emitting element. That is, a 6×8 array of subpixels is divided into four groups of subpixels in the scan and data directions. The first group of subpixels includes one fourth of the 6×8 subpixels, i.e., all the red subpixels, the second group of subpixels includes one fourth of the 6×8 subpixels, i.e., one half of all the green subpixels, the third group of subpixels includes one fourth of the 6×8 subpixels, i.e., one half of all the green subpixels, and the fourth group of subpixels includes one fourth of the 6×8 subpixels, i.e., all the blue subpixels. Taking the first column of pixels on the display frame 3500 as an example shown in FIG. 36, a 6×2 subpixel array is divided into four subpixel groups in the scan and data directions.

FIG. 37 is a circuit diagram illustrating a pixel circuit with a compensation circuit shared by four light emitting elements in a 2×2 subpixel block in accordance with one embodiment set forth in the disclosure. Compared with the exemplary pixel circuit 1900 shown in FIG. 19, one more light emitting transistor is included in the pixel circuit 3700 to control the light emission of the fourth light emitting element in response to the fourth light emitting signal EM4-1. The four light emitting elements in this example may be adjacent OLEDs in a 2×2 subpixel block when the array of OLEDs is divided into two subpixel groups in the scan and data directions. In the pixel circuit 3700, nine transistors and one capacitor (9T1C) are used for driving four subpixels. The average number of transistors per subpixel in the direct-charging type pixel circuit 3700 is further reduced compared with the known solution, e.g., the direct-charging type pixel circuit 4700. As a result, the layout area of the direct-charging type pixel circuit 3700 is about one fourth of the layout area of the direct-charging type pixel circuit 4700 for driving the same number of subpixels.

FIG. 38 is a timing diagram of pixel circuits for driving the 6×2 subpixel array shown in FIG. 36 in accordance with one embodiment set forth in the disclosure. In this example, the timings of light emitting control signals EMC1, EMC2, EMC3 and light emitting signals EM1-1, EM1-2, EM1-3, EM2-1, EM2-2, EM2-3 are illustrated. As the 6×2 subpixel array is evenly divided into four subpixel groups in the scan and data directions, two sets of light emitting signals are provided: the first set of light emitting signals EM1-1, EM1-2, EM1-3 for controlling the light emission of subpixels in the first and third subpixel groups and the second set of light emitting signals EM2-1, EM2-2, EM2-3 for controlling the light emission of subpixels in the second and fourth subpixel groups. Specifically, the light emitting signals EM1-1, EM1-2, EM1-3 in the first set control all the red subpixels to emit lights during the first sub-frame period (Frame 1-1) and one half of all the green subpixels to emit lights during the third sub-frame period (Frame 1-3); the light emitting signals EM2-1, EM2-2, EM2-3 in the second set control one half of all the green subpixels to emit lights during the second sub-frame period (Frame 1-2) subsequent to the first sub-frame period and all the blue subpixels to emit lights during the fourth sub-frame period (Frame 1-4) subsequent to the third sub-frame period. As to the light emitting control signals EMC1, EMC2, EMC3, each of them controls the four subpixels sharing the same pixel circuit (e.g., in each 2×2 subpixel block) to sequentially emit a light in the respective sub-frame period (light emitting period) within a frame period. As shown in FIG. 38, the light emitting control signal EMC1 coordinates with the light emitting signals EM1-1, EM2-1 so that the light emitting control signal EMC1 becomes low when any of the light emitting signals EM1-1, EM2-1 becomes low. Similarly, the light emitting control signal EMC2 coordinates with the light emitting signals EM1-2, EM2-2 so that the light emitting control signal EMC2 becomes low when any of the light emitting signals EM1-2, EM2-2 becomes low; the light emitting control signal EMC3 coordinates with the light emitting signals EM1-3, EM2-3 so that the light emitting control signal EMC3 becomes low when any of the light emitting signals EM1-3, EM2-3 becomes low.

FIG. 39 is a circuit diagram illustrating a light emitting circuit for providing light emitting signals for driving the 6×2 subpixel array shown in FIG. 36 in accordance with one embodiment set forth in the disclosure. In this example, the light emitting circuit 504 includes two shift registers 3902, 3904, each of which is configured to provide a respective set of light emitting signals. The first shift register 3902 includes three flip-flops providing the three light emitting signals EM1-1, EM1-2, EM1-3, respectively, in the first set of light emitting signals in response to the enable signal STE1 and clock signals CKE1, CKE2 provided by the control logic 104. The second shift register 3904 includes three flip-flops providing the three light emitting signals EM2-1, EM2-2, EM2-3, respectively, in the second set of light emitting signals in response to the enable signal STE2 and clock signals CKE1, CKE2 provided by the control logic 104. In this example, the clock signals CKE1, CKE2 are provided to the different clock inputs in the first and second shift registers 3902, 3904. The timings of the light emitting signals EM1-1, EM1-2, EM1-3, EM2-1, EM2-2, EM2-3 and enable signals STE1, STE2 are shown in FIG. 38. The light emitting circuit 504 in this example is provided for driving the 6×2 subpixel array shown in FIG. 36.

FIG. 40A is a circuit diagram illustrating one example of a light emitting control circuit for providing light emitting control signals for driving the 6×2 subpixel array shown in FIG. 36 in accordance with one embodiment set forth in the disclosure. In this example, the light emitting control circuit 502 includes a shift register 4002 configured to provide the light emitting control signals EMC1, EMC2, EMC3 in response to the enable signal STE3 and clock signals CKE3, CKE4 provided by the control logic 104. In this example, the enable signal STE3 is a logical disjunction of the enable signals STE1, STE2 provided to the two shift registers 3902, 3904 in the light emitting circuit 504. For example, the enable signal STE3 is low when any of the enable signals STE1, STE2 is low. The timings of the light emitting control signals EMC1, EMC2, EMC3 and enable signals STE1, STE2 are shown in FIG. 38. The shift register 4002 in this example includes three flip-flops outputting three light emitting control signals EMC1, EMC2, EMC3 for driving the 6×2 subpixel array shown in FIG. 36.

FIG. 40B is a circuit diagram illustrating another example of a light emitting control circuit for providing light emitting control signals for driving the 6×2 subpixel array shown in FIG. 36 in accordance with one embodiment set forth in the disclosure. In this example, the light emitting control circuit 502 includes three AND gates 4004, 4006, 4008, each of which is configured to provide one of the light emitting control signals EMC1, EMC2, EMC3. Each AND gate 4004, 4006, 4008 provides a light emitting control signal EMC1, EMC2, EMC3, respectively, based on two of the six light emitting signals EM1-1, EM1-2, EM1-3, EM2-1, EM2-2, EM2-3. For each AND gate 4004, 4006, 4008, one of the input light emitting signals is from the first set of light emitting signals EM1-1, EM1-2, EM1-3, and the other one of the input light emitting signals is from the second set of light emitting signals EM2-1, EM2-2, EM2-3. The light emitting control circuit 502 shown in FIG. 40B is suitable for PMOS pixel circuits. When any of the two input light emitting signals is low, the output light emitting control signal is low. The timings of the output light emitting control signals EMC1, EMC2, EMC3 and the input light emitting signals EM1-1, EM1-2, EM1-3, EM2-1, EM2-2, EM2-3 are shown in FIG. 38. It is understood that in other examples in which the pixel circuits are NMOS pixel circuits, three OR gates can replace the three AND 4004, 4006, 4008 in FIG. 40B. The corresponding light emitting signals with the reversed polarity are inputted to each OR gate, and the corresponding light emitting control signals with the reversed polarity are outputted from each OR gate. That is, when any of the two input light emitting signals is high, the output light emitting control signal is high.

FIG. 41 is another timing diagram of pixel circuits for driving the 6×2 subpixel array shown in FIG. 36 in accordance with one embodiment set forth in the disclosure. The timings of the scan signals S1-0, S1-1, S2-0, S2-1, S3-0, S3-1, S4-0, S4-1 are provided in the timing diagram with respect to the light emitting signals EM1-1, EM2-1. FIG. 42 is a circuit diagram illustrating a gate scanning driver for providing scan signals for scanning the 6×2 subpixel array shown in FIG. 36 in accordance with one embodiment set forth in the disclosure. In this example, the gate scanning driver 404 includes a shift register 4202 configured to provide the scan signals S0, S1, S2, S3 in response to the enable signal STV and clock signals CKV1, CKV2 provided by the control logic 104. The shift register 4202 in this example includes four flip-flops outputting four scan signals S0, S1, S2, S3 to the pixel circuits 3700 with compensation circuits shown in FIG. 37 for driving the 6×2 subpixel array shown in FIG. 36.

FIG. 43 is a circuit diagram illustrating another example of a pixel circuit shared by two light emitting elements in accordance with one embodiment set forth in the disclosure. The pixel circuit 4300 in this example is shared by two light emitting elements D1, D2 representing two subpixels from different groups of subpixels. The pixel circuit 4300 in this example includes a capacitor 4302, a light emitting control transistor 4304, a driving transistor 4306, two light emitting transistors 4308-1, 4308-2, and a switching transistor 4310. The light emitting elements D1, D2 may be OLEDs, such as top-emitting OLEDs, and each transistor may be a p-type transistor, such as a PMOS TFT. The pixel circuit 4300 may be operatively coupled to the gate scanning driver 404 via a scan line 4314 and the source writing driver 406 via a data line 4316. Additionally or optionally, a compensation circuit 4312 may be included in the pixel circuit 4300 to ensure the brightness uniformities between the light emitting elements D1, D2. The compensation circuit 4312 can be in any configurations as known in the art, which includes one or more transistors and capacitors. The pixel circuit 4300 is suitable for any configuration of the coupling type of pixel circuits because in the pixel circuit 4300 the data signal is coupled to the gate of the driving transistor 4306 via the capacitor 4302 when the switching transistor 4310 is turned on during the charging period.

In this example, the light emitting control transistor 4304 includes a gate electrode operatively coupled to a light emitting control signal EMC, a source electrode operatively coupled to a reference voltage Vref, and a drain electrode. The light emitting control signal EMC may be provided by the light emitting control circuit 502 of the light emitting driver 402. The light emitting control signal EMC in this example turns on the light emitting control transistor 4304 during each of the two light emitting periods for the two light emitting elements D1, D2 within a frame period. The reference voltage Vref is provided for compensating the variations of the threshold voltage Vth of driving transistors, and the value of the reference voltage Vref may be determined based on the threshold voltage Vth of the driving transistors. The driving transistor 4306 includes a gate electrode operatively coupled to one electrode of the capacitor 4302, a source electrode operatively coupled to the supply voltage Vdd, and a drain electrode. In each light emitting period (i.e., when the light emitting control transistor 4304 is turned on), the driving transistor 4306 provides a driving current to one of the light emitting elements D1, D2 at a level determined based on the voltage level currently at a storage capacitor. In some examples, the capacitor 4302 is the storage capacitor. In other examples, the capacitor 4302 is a coupling capacitor, and the pixel circuit 4302 includes another capacitor as the storage capacitor.

Each of the light emitting transistors 4308-1, 4308-2 includes a gate electrode operatively coupled to a respective light emitting signal EM1, EM2, a source electrode operatively coupled to the drain electrode of the driving transistor 4306, and a drain electrode operatively coupled to the respective light emitting element D1, D2. During a light emitting period (i.e., when the light emitting control transistor 4304 is turned on), a driving current path is formed through the supply voltage Vdd, driving transistor 4306, one of the light emitting transistors 4308-1, 4308-2, and one of the light emitting elements D1, D2. Each light emitting signal EM1, EM2 turns on the respective light emitting transistor 4308-1, 4308-2 during a respective one of the two light emitting periods within a frame period to cause the respective light emitting element D1, D2 to emit a light.

In this example, the switching transistor 4310 includes a gate electrode operatively coupled to the scan line 4314 transmitting a scan signal, a source electrode operatively coupled to the data line 4316 transmitting a data signal, and a drain electrode. The scan signal may turn on the switching transistor 4310 during each of the two charging periods within a frame period to cause the storage capacitor (e.g., the capacitor 4302 in some examples) to be charged at a respective level in the data signal for the respective light emitting element D1, D2. As described above, the timing of the display data has been re-arranged in the converted display data to accommodate the novel frame-division and pixel circuit-sharing scheme in the present disclosure. The storage capacitor (e.g., the capacitor 4302 in some examples) may be charged twice in one frame period for the two light emitting elements D1, D2, respectively. During each charging period, the light emitting control signal EMC turns off the light emitting control transistor 4304 to block the reference voltage Vref. The timings of various signals in the pixel circuit 4300, e.g., EMC, EM1, EM2, Sn, Data, are the same as those shown in the timing diagram of FIG. 8.

FIG. 44 is a circuit diagram illustrating one example a pixel circuit with a compensation circuit shared by multiple light emitting elements in accordance with one embodiment set forth in the disclosure. Compared with the exemplary coupling type pixel type circuit 4300 shown in FIG. 43, additional transistors and control signals (e.g., the reset signal Sn-1) are added to the pixel circuit 4400 to form a compensation circuit, which eliminates the effect of non-uniformity of the mobility and threshold voltage Vth of the driving transistor. The multiple light emitting elements D1, . . . , DN in this example may be adjacent OLEDs in the same column when the array of OLEDs is divided in the scan direction. In the coupling type pixel circuit 4400, for example, eight transistors and one capacitor (8T1C) are used for driving two subpixels, and nine transistors and one capacitor (9T1C) are used for driving three subpixels. The average number of transistors per subpixel and the layout area of the coupling type pixel circuit 4400 is reduced compared with the known solutions, e.g., the coupling type pixel circuit 4800. The timings of various signals in the pixel circuit 4400, e.g., EMC, EM1, . . . , EMN, Sn, Sn-1, Data, are the same as those shown in the timing diagrams of FIGS. 10, 13, 16, 20, 23, 25, 28, 31, 38, and 41.

FIG. 45 is a circuit diagram illustrating another example of a pixel circuit with a compensation circuit shared by multiple light emitting elements in accordance with one embodiment set forth in the disclosure. Compared with the exemplary coupling type pixel circuit 4300 shown in FIG. 43, additional transistors, capacitors (e.g., the storage capacitor Cst), and control signals (e.g., the reset signal Sn-1) are added to the pixel circuit 4500 to form a compensation circuit, which eliminates the effect of non-uniformity of the mobility and threshold voltage Vth of the driving transistor. The multiple light emitting elements D1, . . . , DN in this example may be adjacent OLEDs in the same column when the array of OLEDs is divided in the scan direction. In the coupling type pixel circuit 4500, for example, six transistors and two capacitors (6T2C) are used for driving two subpixels, and seven transistors and two capacitors (7T2C) are used for driving three subpixels. The average number of transistors per subpixel and the layout area of the coupling type pixel circuit 4500 is reduced compared with the known solutions, e.g., the coupling type pixel circuit 4900.

FIG. 46 is a flow chart of a method for driving a display having an array of subpixels in accordance with one embodiment set forth in the disclosure. It will be described with reference to the above figures. However, any suitable circuit, logic, unit, or module may be employed. Starting at 4602, original display data is received. At 4604, the original display data is stored in frames. 4602 and 4604 may be performed by the storing unit 612 of the data converting module 604 of the control logic 104. Proceeding to 4606, the original display data is converted into converted display data based on a manner in which an array of subpixels is divided into at least first and second groups of subpixels 4606. 4606 may be performed by the data reconstructing unit 614 of the data converting module 604 of the control logic 104. At 4608, in a first sub-frame period within a frame period, the first group of subpixels is scanned and caused to emit lights. At 4610, in a second sub-frame period within the frame period subsequent to the first sub-frame period, the second group of subpixels is scanned and caused to emit lights. 4608 and 4610 may be performed by the light emitting driver 402 and the gate scanning driver 404 in conjunction with the pixel circuits 700, 4300.

Also, integrated circuit design systems (e.g., work stations) are known that create wafers with integrated circuits based on executable instructions stored on a computer-readable medium such as but not limited to CDROM, RAM, other forms of ROM, hard drives, distributed memory, etc. The instructions may be represented by any suitable language such as but not limited to hardware descriptor language (HDL), Verilog or other suitable language. As such, the logic, units, and circuits described herein may also be produced as integrated circuits by such systems using the computer-readable medium with instructions stored therein.

For example, an integrated circuit with the aforedescribed logic, units, and circuits may be created using such integrated circuit fabrication systems. The computer-readable medium stores instructions executable by one or more integrated circuit design systems that causes the one or more integrated circuit design systems to design an integrated circuit. The designed integrated circuit includes a control signal generating module and a data converting module. The integrated circuit controls driving of an array of subpixels divided into k groups of subpixels, where k is an integer larger than 1. The control signal generating module is configured to provide a plurality of control signals to one or more drivers. The plurality of control signals control the one or more drivers to cause each of the k groups of subpixels to sequentially emit lights in a respective one of k sub-frame periods within a frame period. The data converting module is configured to convert original display data into converted display data based on a manner in which the array of subpixels is divided into the k groups of subpixels. The k groups of subpixels emit lights based on the converted display data.

The above detailed description of the disclosure and the examples described therein have been presented for the purposes of illustration and description only and not by limitation. It is therefore contemplated that the present disclosure cover any and all modifications, variations or equivalents that fall within the spirit and scope of the basic underlying principles disclosed above and claimed herein.

The invention claimed is:

1. An active array organic light emitting diode (AMOLED) display, comprising:

an array of OLEDs divided into k groups of OLEDs, where k is an integer larger than 1;

a plurality of pixel circuits connected to the array of OLEDs, wherein each of the plurality of pixel circuits is configured to drive k OLEDs from each of the k groups of OLEDs;

a light emitting driver connected to the plurality of pixel circuits and configured to cause each of the k groups of OLEDs to sequentially emit lights in a respective one of k sub-frame periods within a frame period; and a gate scanning driver connected to the plurality of pixel circuits and configured to sequentially scan each of the k groups of OLEDs in the respective sub-frame period within the frame period, wherein:

each of the plurality of pixel circuits comprises:

a capacitor, a light emitting control transistor comprising a gate electrode connected to a light emitting control signal provided by the light emitting driver, a source electrode connected to a supply voltage signal, and a drain electrode connected to a driving transistor, the driving transistor comprising a gate electrode connected to one electrode of the capacitor, a source electrode connected to the drain electrode of the single light emitting control transistor, and a drain electrode connected to k light emitting transistors of the k OLEDs, the k light emitting transistors, each of which comprising a gate electrode connected to a respective one of k light emitting signals provided by the light emitting driver, a source electrode connected to the drain electrode of the driving transistor, and a drain electrode connected to a respective one of the k OLEDs, and the light emitting driver comprises a light emitting circuit and a light emitting control circuit, the light emitting circuit comprises k first shift registers configured to provide k light emitting signals in response to k first enable signals, and the light emitting control circuit comprises a second shift register configured to provide the light emitting control signal in response to a second enable signal that is a logical disjunction of the k first enable signals.

2. The AMOLED display of claim 1, wherein each of the k light emitting signals turns on the respective light emitting transistor during a respective one of k light emitting periods within the frame period to cause the respective OLED to emit a light; and the light emitting control signal turns on the light emitting control transistor during each of the k light emitting periods within the frame period.

3. The AMOLED display of claim 1, wherein the light emitting control signal is configured to turn off the light emitting control transistor during a charging period of each of the k sub-frame periods and turn on the light emitting control transistor during each of the k sub-frame periods after a respective charging period, the light emitting control signal is configured to repeatedly turn off and on the single light emitting control transistor k times during the frame period.

4. The AMOLED display of claim 1, wherein each of the light emitting control transistor, the driving transistor, and the k light emitting transistors is a p-type TFT.

5. The AMOLED display of claim 1, wherein each of the OLEDs in the array of OLEDs is a top-emitting OLED.

6. The AMOLED display of claim 1, wherein each of the plurality of pixel circuits further comprises:

a switching transistor comprising a gate electrode operatively coupled to a scan line transmitting a scan signal, a source electrode operatively coupled to a data line transmitting a data signal, and a drain electrode.

7. The AMOLED display of claim 6, wherein the scan signal turns on the switching transistor during each of k charging periods within the frame period to cause the capacitor to be charged at a respective level in the data signal for a respective OLED.

8. The AMOLED display of claim 1, wherein the k groups of OLEDs being organized into either rows or columns.

9. The AMOLED display of claim 8, further comprising:

a plurality of scan lines connected to the array of OLEDs, wherein each of the plurality of scan lines is shared by k rows of OLEDs from each of the k groups of OLEDs when the k groups of OLEDs are organized into rows.

10. The AMOLED display of claim 8, further comprising:

a plurality of data lines connected to the array of OLEDs, wherein each of the plurality of data lines is shared by k columns of OLEDs from each of the k groups of OLEDs when the k groups of OLEDs are organized into columns.

11. The AMOLED display of claim 1, wherein the light emitting control circuit comprises one or more AND gates or OR gates, each of which being configured to provide one of the one or more light emitting control signals based on k light emitting signals from the k sets of light emitting signals.

12. The AMOLED display of claim 1, wherein the gate scanning driver is further configured to provide a plurality of scan signals to the plurality of pixel circuits, wherein each of the plurality of scan signals causes each of the k OLEDs to be sequentially charged in the respective sub-frame period within the frame period.

13. An apparatus for controlling driving of an array of subpixels divided into k groups of subpixels, where k is an integer larger than 1, the apparatus comprising:

a control signal generating module configured to provide a plurality of control signals to one or more drivers, wherein the plurality of control signals control the one or more drivers to cause each of the k groups of subpixels to sequentially emit lights in a respective one of k sub-frame periods within a frame period; and a data converting module configured to convert original display data into converted display data based on a manner in which the array of subpixels is divided into the k groups of subpixels, wherein the k groups of subpixels emit lights based on the converted display data, wherein the control signal generating module is configured to provide a first set of control signals of the plurality of control signals to a light emitting driver of the one or more drivers to control the light emitting driver to cause each of the k groups of subpixels to sequentially emit lights in the respective sub-frame period within the frame period, and wherein the first set of control signals comprises one or more clock signals, k light emitting enable signals, and a light emitting control enable signal that is a logical disjunction of the k light emitting enable signals.

14. The apparatus of claim 13, wherein the control signal generating module is configured to provide the one or more clock signals and the k light emitting enable signals to a light emitting circuit of the light emitting driver to control the light emitting circuit to provide k sets of light emitting signals for the k groups of subpixels, respectively, each of the k sets of light emitting signals causing the subpixels in the respective group of subpixels to emit lights in the respective sub-frame period within the frame period.

15. The apparatus of claim 13, wherein the control signal generating module is configured to provide the one or more clock signals and the light emitting control enable signal to a light emitting control circuit of the light emitting driver to control the light emitting control circuit to provide one or more light emitting control signals for the k groups of subpixels, each of the one or more light emitting control signals controlling each of k subpixels from each of the k groups of subpixels to sequentially emit a light in the respective sub-frame period within the frame period.

16. The apparatus of claim 13, wherein the control signal generating module is configured to provide a second set of control signals of the plurality of control signals to a gate scanning driver of the one or more drivers to control the gate scanning driver to sequentially scan each of the k groups of subpixels in the respective sub-frame period within the frame period.

17. The apparatus of claim 13, wherein the data converting module comprises:

a storing unit configured to receive the original display data and store the original display data in frames; and a data reconstructing unit operatively coupled to the storing unit and configured to reconstruct, in each frame, the original display data into the corresponding converted display data based on a sequence in which the k groups of subpixels emit lights within the frame period.

18. The apparatus of claim 13, wherein each of the k groups of subpixels comprises one or more rows of subpixels.

19. The apparatus of claim 13, wherein each subpixel of the array of subpixels is a top-emitting OLED.

20. A system, comprising:

a display panel comprising:

an array of OLEDs divided into k groups of OLEDs, where k is an integer larger than 1;

a plurality of pixel circuits connected to the array of OLEDs, wherein each of the plurality of pixel circuits is configured to drive k OLEDs from each of the k groups of OLEDs;

a light emitting driver connected to the plurality of pixel circuits and configured to cause each of the k groups of OLEDs to sequentially emit lights in a respective one of k sub-frame periods within a frame period; and a gate scanning driver connected to the plurality of pixel circuits and configured to sequentially scan each of the k groups of OLEDs in the respective sub-frame period within the frame period, wherein:

each of the plurality of pixel circuits comprises:

a capacitor, a light emitting control transistor comprising a gate electrode connected to a light emitting control signal provided by the light emitting driver, a source electrode connected to a supply voltage signal, and a drain electrode connected to a driving transistor, the driving transistor comprising a gate electrode connected to one electrode of the capacitor, a source electrode connected to the drain electrode of the light emitting control transistor, and a drain electrode connected to k light emitting transistors of the k OLEDs, the k light emitting transistors, each of which comprising a gate electrode connected to a respective one of k light emitting signals provided by the light emitting driver, a source electrode connected to the drain electrode of the driving transistor, and a drain electrode connected to a respective one of the k OLEDs, and the light emitting driver comprises a light emitting circuit and a light emitting control circuit, the light emitting circuit comprises k first shift registers configured to provide k light emitting signals in response to k first enable signals, and the light emitting control circuit comprises a second shift register configured to provide the light emitting control signal in response to a second enable signal that is a logical disjunction of the k first enable signals, a processor configured to convert original display data into converted display data based on a manner in which the array of OLEDs is divided into the k groups of OLEDs; and a control logic connected to the processor and configured to provide a plurality of control signals based on the converted display data.

* * * * *